Figure 1:
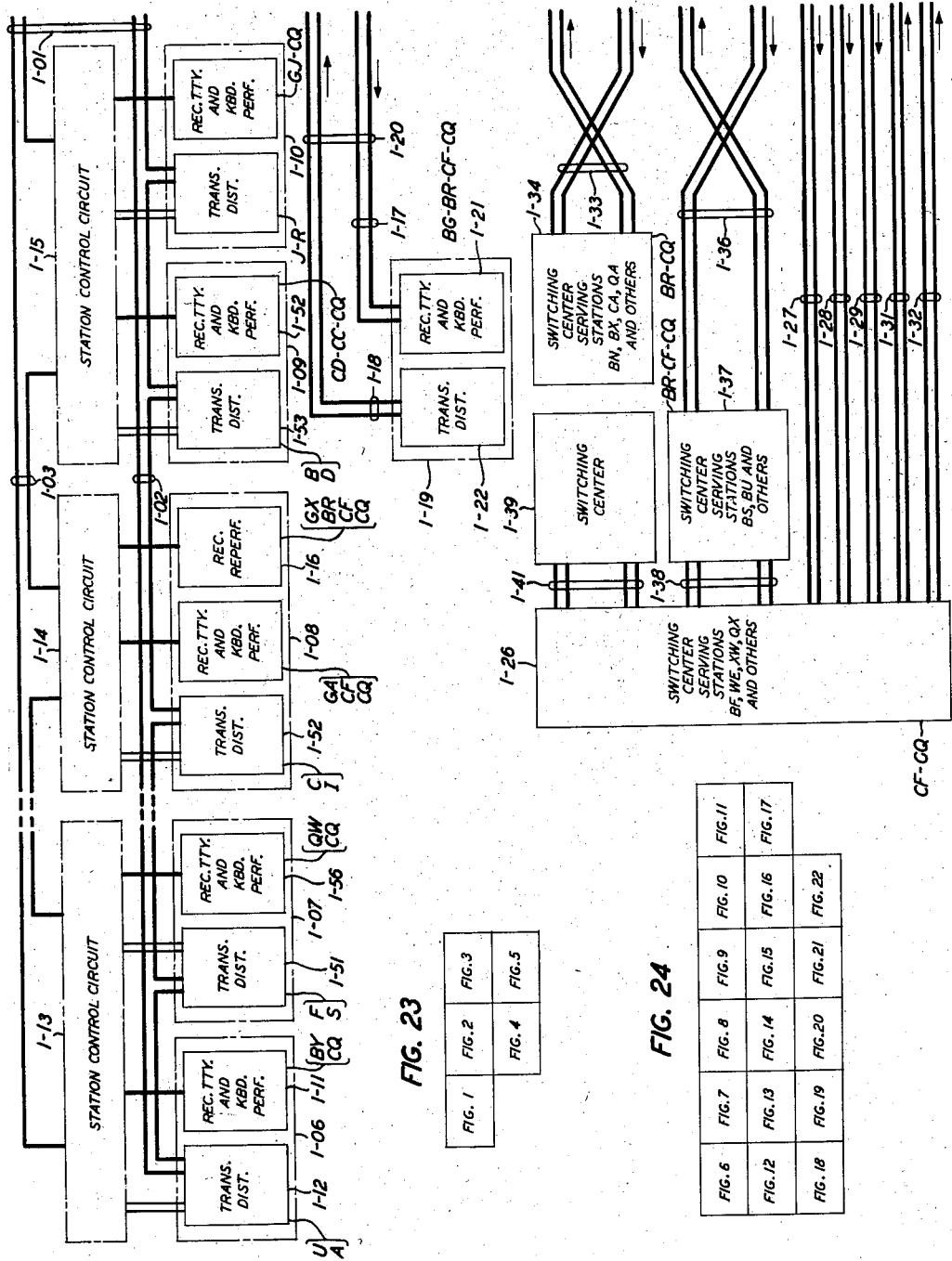

INVENTORS
W. M. BACON
D. E. BRANSON
G. J. KNANDEL
G. A. LOCKE

BY
R. C. Terry
ATTORNEY

INVENTORS W. M. BACON
D. E. BRANSON
G. J. KNANDEL
G. A. LOCKE
BY R.C. Terry
ATTORNEY

INVENTORS: W. M. BACON
D. E. BRANSON
G. J. KNANDEL
G. A. LOCKE

Jan. 27, 1959  W. M. BACON ET AL  2,871,286
MESSAGE TRANSMISSION SYSTEM
Filed Nov. 18, 1953  24 Sheets-Sheet 13

INVENTORS
W. M. BACON
D. E. BRANSON
G. J. KNANDEL
G. A. LOCKE

BY R. C. Terry
ATTORNEY

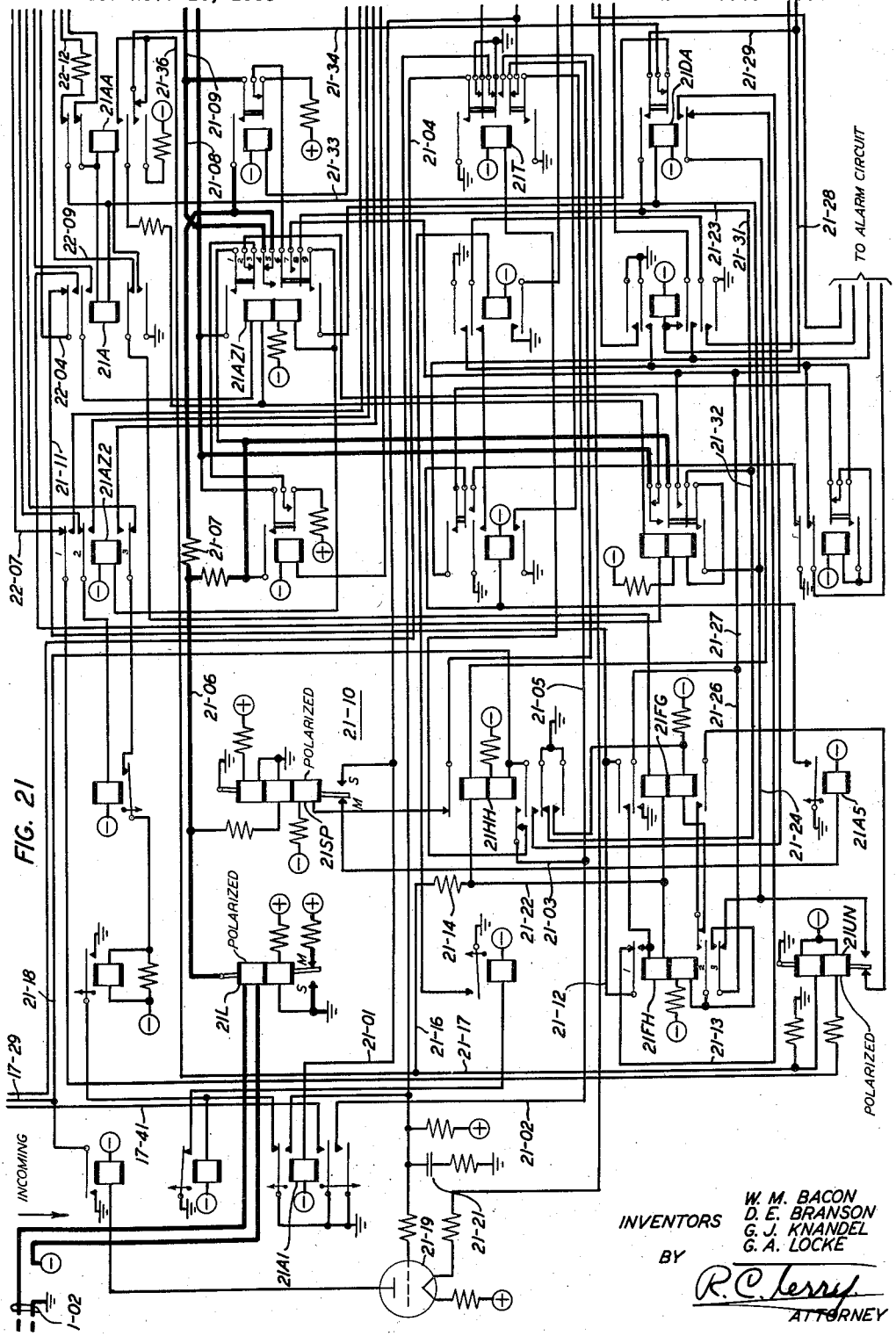

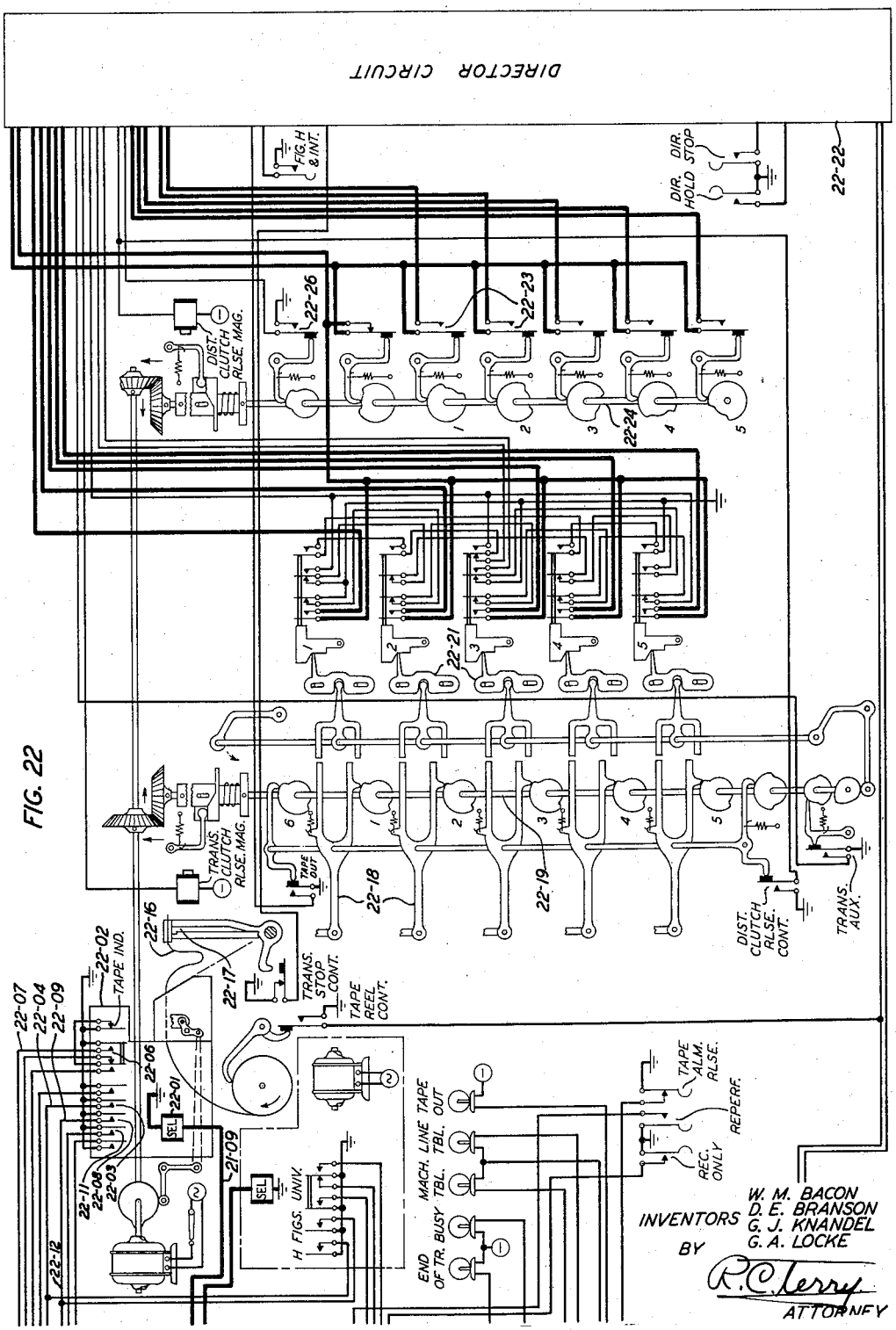

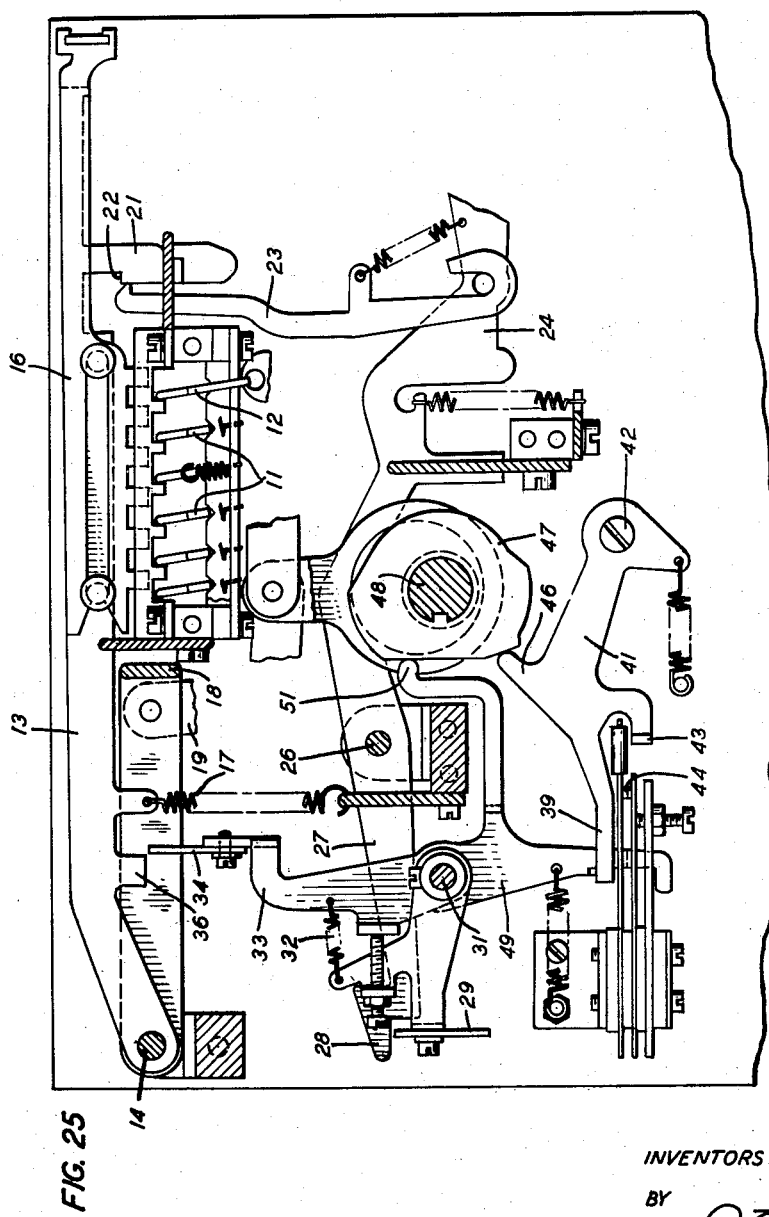

Jan. 27, 1959   W. M. BACON ET AL   2,871,286
MESSAGE TRANSMISSION SYSTEM

Filed Nov. 18, 1953   24 Sheets-Sheet 24

INVENTORS: W. M. BACON
D. E. BRANSON
G. J. KNANDEL
G. A. LOCKE

BY R. C. Terry
ATTORNEY

United States Patent Office 2,871,286
Patented Jan. 27, 1959

2,871,286

MESSAGE TRANSMISSION SYSTEM

Walter M. Bacon, New York, N. Y., and David E. Branson, Morristown, and George J. Knandel, Glen Rock, N. J., and George A. Locke, Glen Head, N. Y., assignors to Bell Telephone Laboratories, Incorporated, New York, N. Y., a corporation of New York Application November 18, 1953, Serial No. 392,789

25 Claims. (Cl. 178—2)

This invention relates to communication systems and particularly to telegraph systems including switching equipment for automatically directing and transmitting messages from a station of origin to a station of destination through one or more switching centers in accordance with and under the control of directing or address characters or code combinations preceding each message, and end-of-message characters of code combinations following each message.

A communication system answering to the above description is disclosed in Patent 2,430,447 granted November 11, 1947 to Branson, Kinkead, Krecek and Locke. An improved system of the same general type is shown in application Serial No. 119,184, filed October 1, 1949 by Bacon, Knandel, Krecek and Locke. The present invention is an improvement upon the system shown in the above-identified patent and application, and particularly upon the system shown in the latter. Accordingly, the disclosure of the application is incorporated herein by reference as part of the present specification, and it will be relied upon to a considerable extent in lieu of duplication of its entire disclosure herein.

In the system disclosed in the Bacon-Knandel-Krecek-Locke application there are a plurality of switching centers interconnected directly or in tandem by full duplex trunks and each having a plurality of full duplex lines terminating therewith. The lines may be single station lines or multistation lines.

The incoming channel of each line and trunk terminates in a typing reperforator which records messages preceded by call directing codes designating the destinations to which the messages are to be transmitted, and followed by disconnect signals designating the ends of the messages.

Each reperforator has a transmitter for retransmitting the call directing codes, the messages and the disconnect signals. Each of these transmitters has cooperating with it a director circuit for decoding the call directing codes preceding the messages and for operating a link circuit, specifically a crossbar switch, to establish a cross-office path from the transmitter to the outgoing line or trunk channel over which the message must be transmitted to reach the addressee station designated by the call directing codes.

With the exception of multichannel trunk groups, the outgoing channels of full duplex trunks, and the outgoing channels of full duplex lines are equipped with reperforator-transmitter units. Two such units are associated with each single trunk outgoing channel and with each outgoing line channel. The cross-office path established by a director circuit, as hereinbefore mentioned, connects the transmitter of an incoming line or trunk reperforator-transmitter unit to one or the other of two outgoing line or trunk reperforator-transmitter units of the outgoing channel selected by the director circuit, if such outgoing line or trunk reperforator is idle or when one becomes idle. A cross-office path having been established, the call directing codes are transmitted over that path followed by the body of the message and then the disconnect signal. All of this material is recorded by the reperforator, and the director circuit, decoding the disconnect signal, disconnects the cross-office path and restores to normal. The transmitters of the outgoing line or trunk reperforator-transmitter units have access alternately to the respective channels to transmit the messages that have been recorded by the associated reperforators.

When the outgoing channel, over which the message is retransmitted, is a trunk, the message is received at a remote switching center terminating that trunk channel, at which point the procedure just described is repeated, the message being switched across office and retransmitted, until it reaches a switching center serving the station to which the message is addressed. At such switching center the message is retransmitted over the line with which the addressed station is associated and is received by that station.

In the case of single station lines a message outgoing from a switching center over such line is received by the single station terminating that line. In the case of multistation lines, there are station control circuits which are in the nature of secondary switching centers controlling selectively the associated of receiving teletypewriters of the several stations with the transmission channel outgoing from the switching center. These station control circuits respond to the call directing codes preceding the messages transmitted over the channel and connect the addressed stations to receive the message.

One or more of the stations associated with a multistation line may have a tape transmitter for originating messages to be transmitted to the switching center. Since only one of these transmitters may transmit to the switching center at a time, the control of transmission from these transmitters is allocated to the switching center. The control is effected through a transmitter start circuit which is equipped to transmit signals for selectively starting individually the transmitters associated with a multistation line. Whenever the incoming channel of a multistation line is idle, the transmitter start circuit interrupts transmission then in progress on the outgoing channel and transmits a sequence of signals, the function of which is to start another of the transmitters associated with the line. The transmitter start sequence or pattern of signals operates through the station control circuits to blind any teletypewriter recorder that has been receiving a message over the outgoing channel, so that recorder will not receive the transmitter start pattern of signals. The station control circuits then respond to the transmitter start signals, and one of those circuits attempts to start the particular transmitter designated by the signals. If the transmitter has a message awaiting transmission, in the form of perforated tape in the transmitter, the transmission of the message will be started. Incident to reception of the end of the transmitter start pattern of signals by the station control circuits, the teletypewriter recorder that was blinded is unblinded and message transmisison on the outgoing channel is resumed.

If no message is awaiting transmission at the particular station, the incoming channel will remain idle and after a timed interval the transmitter start circuit will again be called upon to interrupt transmission over the outgoing channel and to transmit another transmitter start pattern of signals seeking to start another transmitter. If this transmitter has a message awaiting transmission, it will be started, otherwise the procedure will be repeated, the stations being polled in rotation for message business until one has been started or until all have been given the opportunity to transmit. If no transmitter is started, the switching center waits one or more minutes and again calls the roll of transmitters in succession to offer them an opportunity to transmit. When a transmitter that has been called has message material awaiting and begins transmission, the transmitter start circuit remains idle until the end of transmission from that station and in response to an end-of transmission signal that follows the disconnect signal the transmitter start circuit is set in operation to begin a roll call of stations beginning with the next station in the rotational order.

The present invention is directed particularly to the operation of a multistation line, and it is a fundamental object of this invention to expedite the transmission of messages from the stations of a multistation line to the switching center serving that line.

According to one aspect of the foregoing fundamental object, a specific object of this invention is to classify message business originating at the stations associated with a multistation line as being of either of two degrees of urgency, which degrees will be designated as priority and non-priority.

Another object of the invention is to cause the transmission of priority messages exclusively as long as any station has priority message business awaiting transmission.

Another object of the invention is to poll the stations of the multistation line in rotation for priority message business.

Another object of the invention is to indicate at the stations of the multistation line whether message business awaiting transmission is of priority or non-priority character.

Another object of the invention is to poll the stations for non-priority message business after all have been polled in rotation for priority messages and none has responded by initiating transmission of such messages.

Another object of the invention is to poll the stations of a multistation line for priority message business a predetermined interval after a poll of the stations for non-priority messages has elicited no message transmission from any of them.

Another object of the invention is to poll the stations of a multistation line for priority message business at the conclusion of message transmission from any of them, whether the transmission has been priority or non-priority message business.

Another object of the invention is to automatically poll the stations of a multistation line first for priority message business, and if none is elicited, for non-priority message business, at a predetermined interval after the stations have been so polled and no message transmission has resulted.

According to another aspect of the fundamental object of the invention hereinbefore recited, a specific object of the invention is to transmit those portions of the transmitter start sequence or pattern of signals that are concerned with blinding a teletypewriter recorder, conditioning the station control circuits to select transmitters to be started, and unblinding the teletypewriter recorder, only once in each roll call of one or more transmitters, the signals for specifically selecting the transmitters in rotation being transmitted in succession, without repetition of the other signals of the pattern in that roll call of transmitters.

According to still another aspect of the fundamental object of the invention hereinbefore recited, a specific object of the invention is to cause each transmitter, as it is called for the purpose of being started if it has message material awaiting transmission, to respond directly, either by initiating message transmission or by transmitting an acknowledgment signal.

Another object of the invention is to initiate the calling of successive transmitters by the transmitter start circuit in response to acknowledgment signals indicating that called transmitters have no message material awaiting transmission.

Another object of the invention is to generate the acknowledgment signal invariably, incident to an attempt at starting a transmitter, and to suppress the transmission of the generated acknowledgment signal if the transmitter responds with message transmission.

Another object of the invention is to employ the acknowledgment signal as an indication of proper operation of both channels of the multistation line as well as the station control circuits.

The invention features a transmitting instrumentality that is part of each station control circuit, and is independent of the message transmitters, for generating the acknowledgment signal.

The invention also features an arrangement by which one receiving station of a multistation line may be arranged to receive messages preceded by non-valid call directing codes in addition to the message addressed to that station.

Figure 26:
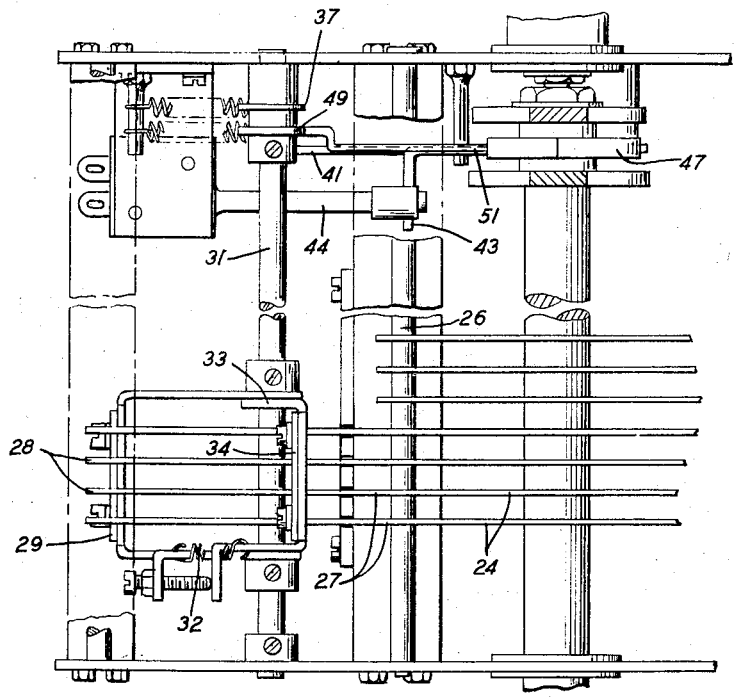
Figure 28:
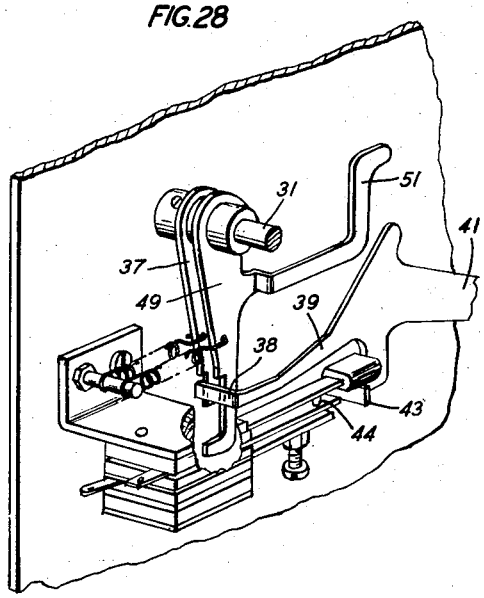
Figure 27:
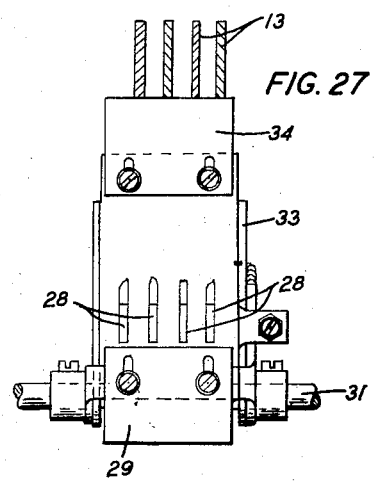

A system for accomplishing the foregoing objects and others that may hereinafter be set forth or become apparent, and embodying the foregoing features and others which may also be hereinafter set forth or become apparent, may be fully understood by reference to the following detailed description, to be interpreted in the light of the accompanying drawings wherein:

Figs. 1 to 5, when arranged in accordance with the pattern of Fig. 23, show, in general schematic form, a typical system comprising switching centers interconnected by trunks and each having lines which it serves;

Figs. 6 to 22, when arranged in accordance with the pattern of Fig. 24, show a full duplex multistation line, the termination for the incoming channel thereof at the switching center, the transmitter start circuit and a diagrammatic representation of the termination of the outgoing channel at the switching center, these being the portions of the system involved in the transmission of messages to and from the stations of the multistation lines; and Figs. 25, 26 and 27 show mechanical details of the acknowledgment signal transmitting instrumentality associated with the station control circuit.

In the diagrammatic and circuit figures of the drawings the reference numerals follow a plan in accordance with which each includes a dash, the numbers preceding the dash identifying the figure of the drawing in which the element identified appears, and in the case of a conductor extending through more than one figure, the figure of the drawings in which the conductor is first identified as a circuit path, the numbers following the dash being the individualistic portions of the reference numerals and identifying the elements or conductors. Relays are identified by letters instead of numerals. In the mechanical views comprising Figs. 25 to 27 simple reference numerals are employed having no specific reference to the numbers of the figures in which the elements appear.

GENERAL DESCRIPTION

The general features of the system will now be described with reference to Figs. 1 to 5, inclusive, when arranged as shown in Fig. 23. Fig. 1 shows in block diagrammatic form the stations and equipment connected to a typical full duplex party line or multiple station line 1–01. The full duplex party line 1–01 comprises a transmission channel or path 1–02 for transmitting signaling impulses from the outlying subscriber stations to the central switching station shown in Figs. 2 to 5, and a receiving channel 1–03 for transmitting signal impulses from the switching center to the outlying subscriber stations.

The party line 1–01 has been shown in the drawings as comprising two separate and distinct metallic transmission circuits. It is to be understood, however, that these lines or paths may include any of the usual types of transmission systems suitable for the transmission of telegraph permutation code pulses. These two channels may form the two paths of a bridge-type full duplex transmission system, in which case the impulses transmitted to and from the switching center are transmitted over a single line conductor, as is well understood in the art. These lines may also include telegraph channels of composite telephone and telegraph lines, channels of voice frequency carrier current, channels of high frequency carrier current, radio channels and time division multiplex channels, and the method of transmission over these channels may be in accordance with any of the well-known transmission systems, including pulses of current and no current, pulses of positive and negative current, pulses of currents of different magnitudes, pulses of carrier current and no carrier current, pulses of carrier currents of different frequencies, and pulses of current in some portions of the system may be represented by pulses of no current in other portions of the system, as is well understood in the various types of telegraph transmitting systems.

The full duplex telegraph line 1-01 extends to five outlying subscriber stations designated 1-06 through 1-10. Each of these subscriber stations is provided with a receiving teletypewriter and keyboard perforator, represented in the case of station 1-06 by the labeled rectangle 1-11, and is also provided with a tape transmitter-distributor represented, in the case of station 1-06, by the labeled rectangle 1-12. The function of the receiving teletypewriter 1-11 is to receive messages transmitted from the switching center. The function of the keyboard perforator associated with the receiving teletypewriter is to prepare tape by perforating it in accordance with messages to be transmitted from the station to the switching center. The function of the transmitter distributor 1-12 is to transmit messages under the control of the perforated tape.

While receiving apparatus and transmitting apparatus have been shown at each of the subscriber stations, it will be readily understood by those skilled in the art that receiving-only equipment may be provided at certain subscriber stations, and that transmitting apparatus only may be provided at other subscriber stations. Since the receiving and transmitting equipments operate substantially independently of each other, each station may be arranged to transmit or receive or both, in accordance with the subscriber's particular requirements.

Typical apparatus suitable for use on combination with the circuits of the system described herein for receiving messages and perforating tape and transmitting signals in accordance with the perforated tape are described in detail in United States Patents 1,965,572, granted July 10, 1934 to C. W. Burcky and A. H. Reiber; 1,965,602 granted July 10, 1934 to R. A. Lake and 1,969,891 granted August 14, 1934 to R. A. Lake and H. W. Stoelk, and the disclosures of these patents are incorporated herein by reference as part of the present specification.

The receiving and transmitting equipment at each of the subscriber stations is controlled by a secondary or a subordinate switching center or control selector which may be located in the immediate vicinity of or on the premises of one or more outlying subscriber stations.

In Fig. 1 three such secondary switching centers have been shown, the subordinate switching center 1-13, or station control circuit as it is also called, serving the subscriber stations 1-06 and 1-07, the station control circuit 1-14 serving only the one subscriber station 1-08, and the station control circuit 1-15 serving subscriber stations 1-09 and 1-10. The provision of the station control circuit 1-14 serving only the single subscriber station 1-08 is explained by the fact that this subscriber station is provided with two receiving recorders, namely a receiving printer and a tape reperforator, which are to receive messages on a selective basis, and the station control circuit is needed in order to effect the selection between them. The reperforator is designated by the reference numeral 1-16 and may be of the type shown in Patent 2,042,788 granted June 2, 1936 to H. L. Krum or Patent 2,255,794 granted September 16, 1941 to R. A. Lake, the disclosures of which are incorporated by reference as part of the present specification.

The station control circuits include a monitoring selector connected to the receiving channel 1-03 of multi-station line 1-01, which selector is provided with numerous contacts that are selectively actuated in response to various signals transmitted over the party line. These contacts are employed to control the switching apparatus for connecting the receiving equipment at the several subscriber stations to the receiving channel 1-03 and for controlling the operation of the tape transmitters to transmit signals over the transmission channel 1-02.

The monitoring selector which is employed as an element of the station control circuit may be characterized as a sequentially operated teletypewriter selector, and it is sometimes referred to as a Sotus unit, a name derived from the initial letters of its description as a "sequentially operated teletypewriter universal selector." It is arranged to receive permuation code telegraph signals and to operate selectable elements in response to the reception of the code combinations. It is provided with interlocking latches by means of which certain of the selectable elements may respond to their assigned code combinations only upon being unlatched or prepared for operation by the signal responsive operation of a selectable member in response to a different code combination or the same code combination, from which it follows that the first-mentioned selectable member is operable only in response to reception of the particular two code combinations in sequence. In the case of the control of transmitters, single code combinations are employed for effecting the desired controls, whereas the receivers, such as printers or the reperforator 1-16, are connected selectively to the receiving channel 1-03 by address codes comprising a sequence of two call directing code combinations. Typical address codes are shown in Fig. 1 for the receiving equipment associated with the receiving channel 1-03. Thus, the receiving teletypewriter 1-11 at station 1-06 is designated by the address code BY, the receiver at station 1-07 has the address code QW, the receiving teletypewriter at station 1-08 has the address code GA and the receiving reperforator at that station has the address code GX, and the receivers at stations 1-09 and 1-10 have the address codes CD and GJ, respectively.

Any subscriber station, in addition to being connectable by the station control circuit to the receiving channel 1-03 in response to its assigned address code, may also be connected in response to one or more group address codes. These are two-letter codes that are assigned in common to a plurality of stations to which messages of a particular type or character are frequently directed, and the group address code will cause the message to be transmitted to all of the stations, regardless of where located in the system, to which that group address code has been assigned. As disclosed in the Bacon et al. application, the group code circuit functions in cooperation with the multiple address circuit disclosed in that application. For example, it is indicated in Fig. 1 that the receiving teletypewriter 1-06 is selectable in response to the group address code CQ as well as in response to its individual address code BY. Similarly, the receiving teletypewriter at station 1-07 is selectable in response to group code CQ in addition to its individual address code QW. The receiving teletypewriter at station 1-08 is responsive to group codes CF and CQ, the receiving reperforator 1-16 is responsive to group codes BR, CF and CQ, the teletypewriter at station 1-09 is responsive to group codes CC and CQ in addition to the individual address code CD, and the teletypewriter at station 1-10 is responsive to group code CQ. The station control circuits are provided with properly coded combinations of interlocked first and second selectable members to connect the stations selectively to the receiving channel 1-03 in response to the assigned group codes.

In addition to assigning address codes to the receiving equipment at each of the stations connected to multiple station line 1-01, one or two codes may be assigned to each transmitter connectable thereto, to enable this transmitter to be controlled from the central switching station through the subordinate switching center or station control circuit. One of the two codes that may be assigned to any station represents selection of the station to transmit a priority message and the other represents selection of the station for transmission of a non-priority message. Ten individual codes are assigned for priority message pick-up, these being the codes for the characters B, C, F, G, J, M, P, U, W and Y. The corresponding codes for non-priority message pick-up are D, I, S, O, R, N, H, A, L and Z, respectively. If the priority transmitter start code U is assigned to transmitters 1-12 at station 1-06 then the non-priority code for that transmitter will be A. Correspondingly, if it be assumed that the priority codes F, C, B, and J be assigned for starting the transmitters at the stations 1-07, 1-08, 1-09 and 1-10, respectively, the non-priority start codes for those transmitters will be S, I, D and R, respectively. Each of the stations is provided with a key for indicating alternatively that a message tape placed in the transmitter and awaiting transmission is of priority or non-priority degree of urgency. A transmitter will be started in response to its priority start code only if the key has been operated to the priority indicating position.

Another full duplex channel appearing in Fig. 1 is designated by the reference numeral 1-20 and comprises receiving channel 1-17 and transmitting channel 1-18. The full duplex channel 1-20 terminates in a single station 1-19 which has exclusive use of the channel and comprises a receiving teletypewriter combined with a keyboard perforator, this unit being designated 1-21 and connected to receiving channel 1-17, and a tape transmitter 1-22 connected to transmitting channel 1-18. Since the tape transmitter 1-22 has sole and exclusive access to the transmitting channel 1-18, it has no transmitter start code assigned to it, as have the transmitters associated with the multistation line, because transmission from station 1-19 is not controlled from the switching cetner, and the station may transmit at any time. There is no station control circuit associated with the station 1-19 because the receiving teletypewriter 1-21 is always connected to the receiving channel 1-17 and will receive all signals incoming over that channel. It has been assumed that channel 1-17 is selectable at the switching center by the individual address code BG and by group codes BR, CF and CQ.

The full duplex party line 1-01 and the full duplex single station line 1-20 extend to the switching center which serves those lines, the circuits and apparatus of which are indicated diagrammatically in Figs. 2 to 5. The switching center, in addition to serving the lines indicated, also has connection directly and indirectly by means of trunk circuits with other switching centers. At the bottom of Fig. 1 a multiple channel trunk directly connects the switching center shown in Figs. 2 to 5 to a switching center 1-26. It has been assumed that there is sufficient traffic from the switching center at the right, comprising Figs. 2 to 5 to the switching center 1-26 to justify three transmission channels in that direction, and these three channels are designated by the reference numerals 1-27, 1-28 and 1-29. It has further been assumed that the volume of traffic in the opposite direction is lighter and that it may be accommodated by two channels designated 1-31 and 1-32. It has been assumed that the switching center 1-26 serves stations having the individual address codes BF, WE, XW, QX and others.

When there is still less traffic between two switching centers, a simple full duplex trunk, comprising a single transmission channel in each direction, may be provided, and two such trunks terminating at the switching center in Figs. 2 to 5 are shown, one designated by the reference numeral 1-33, extending to a switching center 1-34, represented merely by a labeled rectangle, and the other, designated by the reference numeral 1-36 extending to a similarly represented switching center designated by the reference numeral 1-37. As indicated in Fig. 1, it has been assumed that switching center 1-34 serves stations having the individual address codes BN, BX, CA and QA as well as others. With reference to the switching center 1-37, it has been assumed that stations served by that switching center have individual call directing codes BS and BU as well as others.

A full duplex trunk circuit designated 1-38 connects switching center 1-37 to 1-26. Another switching center 1-39, with reference to which no code assignments have been assumed, is connected to switching center 1-26 by full duplex trunk 1-41. In view of the fact that no other trunk circuits have been shown in association with switching centers 1-34 and 1-39, it is to be assumed that neither has direct connection with the other nor with the switching center 1-37, and the switching center 1-34 cannot directly reach the switching center 1-26 nor can the switching center 1-39 directly reach the switching center shown in Figs. 2 to 5. This arrangement of switching centers is typical of systems of this type.

The terminal equipment for the lines and trunks represented in Fig. 1 is shown in Figs. 2 to 5 which also show other circuits and equipment at the switching center. Considering first the terminal equipment of the party line 1-01, the transmitting channel 1-02 terminates in an incoming line circuit indicated generally by reference numeral 2-01. This incoming line circuit controls the reperforator 2-02 and the receiving-only teletypewriter 2-03. The incoming line circuit recognizes certain address codes preceding messages and causes those that are directed to the switching center as a destination to be recorded on the receiving-only teletypewriter 2-03. If the message is to be transmitted to another station in addition to being recorded on teletypewriter 2-03, it will be recorded also on the reperforator 2-02. If the message is not to be recorded for the use of the switching center, it will be recorded only on the reperforator 2-02. A transmitter 2-04 is combined with reperforator 2-03 to form a unit 2-06. Transmitter 2-04 is connected to a director circuit 2-07 which, under the control of transmitter 2-04, decodes the address portion of a message and then, under the supervision of a sequence circuit 4-01, operates a select magnet 3-01 individual to that director, and thereafter operates a hold magnet associated with the channel over which the message is to be transmitted.

The switching apparatus employed in the typical embodiment of this invention and described herein makes use of a switch having a plurality of groups of contacts arranged in a rectangular coordinate pattern. Switches of this type are frequently called cross-bar switches and are arranged so that any set of contacts may be selected and actuated by operating mechanisms representing coordinates of the group of contacts to be operated. For example, the usual arrangement is to provide the contacts in rows and columns and to select and operate any set of contacts by operating a select magnet which is common to a row of contacts and then to operate a hold magnet which is common to a column of contacts. Only those contacts which represent the intersection of the row and column will be operated.

Figure 3:
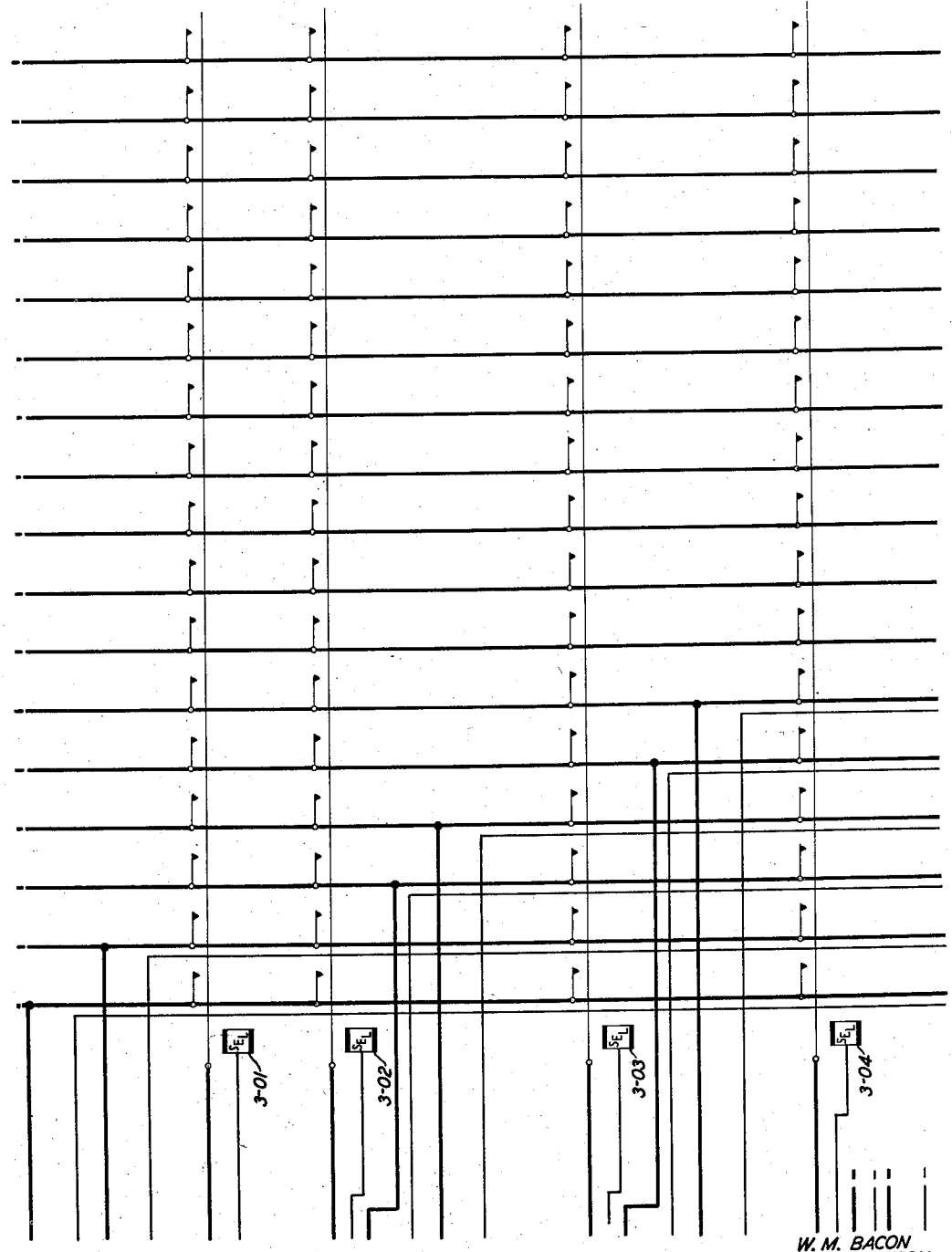
Figure 4:
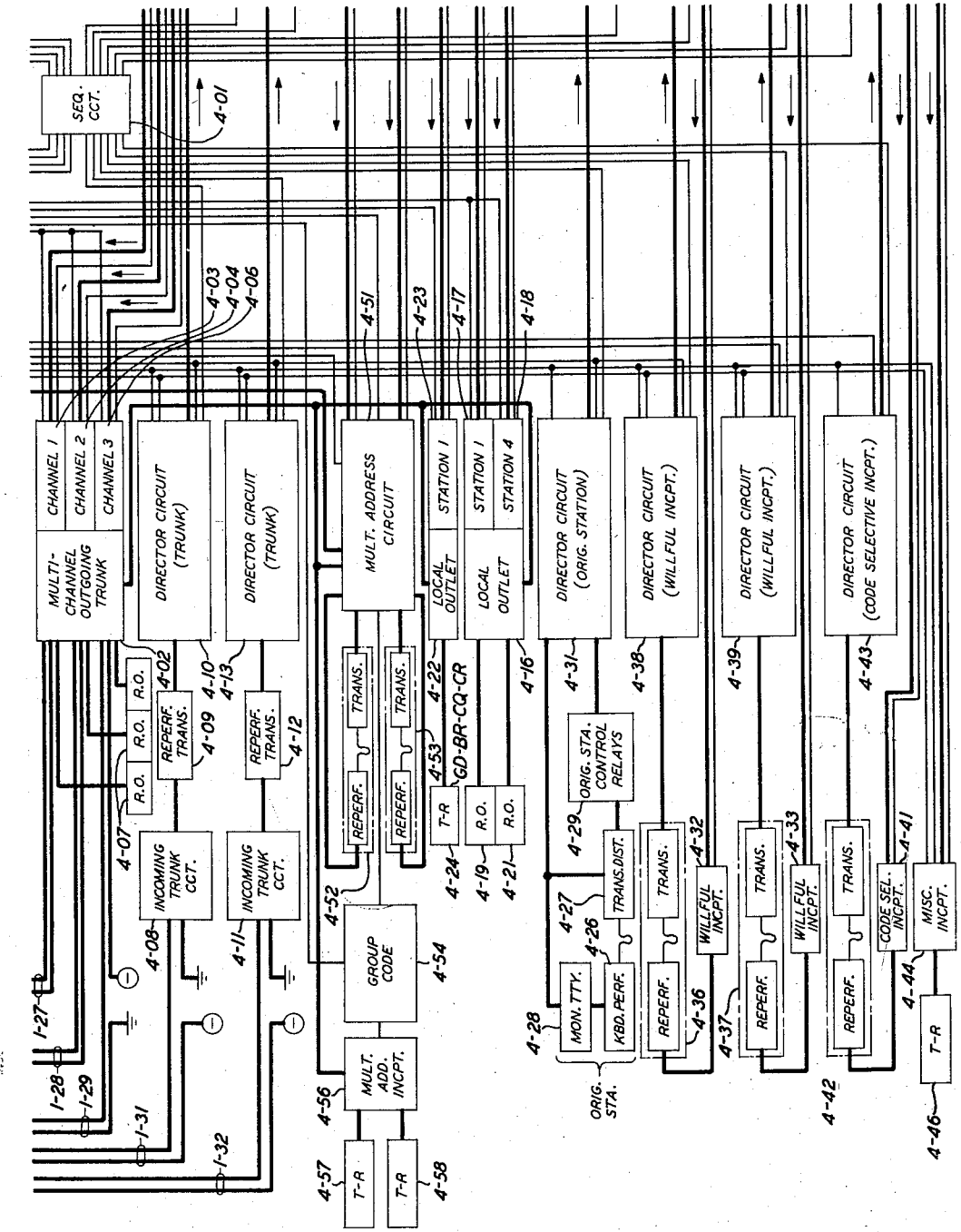
Figure 5:
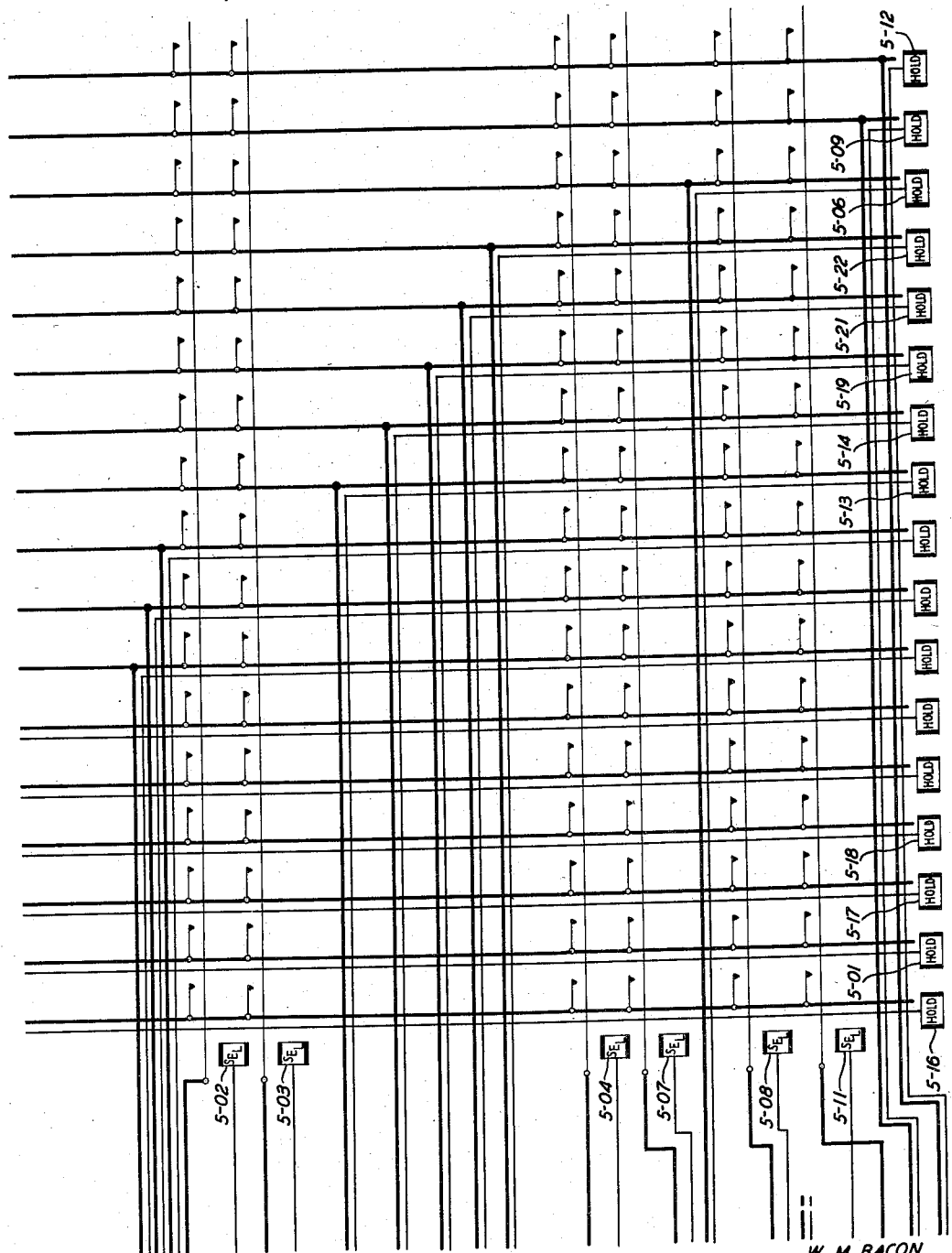

Figs. 3 and 5 contain a schematic representation of a cross-bar switch. The select magnets for the incoming channel of party line 1-01, single station line 1-20, trunk 1-33 and trunk 1-36 are shown in Fig. 3 and are identified by reference numerals 3-01, 3-02, 3-03 and 3-04, respectively. Select magnets for the incoming channels 1-31 and 1-32 of the multichannel trunk and select magnets of other sources of messages to be routed through the switching center are shown in Fig. 5.

Access to the receiving channel 1-03 of the full duplex party line 1-01, this being the channel over which the stations of that line receive messages from the switching center, is had through the instrumentality of two reperforator-transmitter units 2-08 and 2-09 which may be similar to the reperforator-transmitter unit 2-06. Each of the reperforator-transmitter units 2-08 and 2-09 has its own set of input control relays 2-11 and 2-12, respectively, and these sets of relays cooperate mutually with each other and individually with their respective reperforator-transmitter units to control the selective establishment of a connection to one or the other of the reperforators, if idle, through the cross-bar switch. Hold magnets 5-16 and 5-01, when operated, establish transmission paths to the reperforator units 2-08 and 2-09, respectively.

The transmitting portions of reperforator-transmitters 2-08 and 2-09 are associated with outgoing channel 1-03 which has hereinbefore been identified as the receiving channel from the standpoint of the subscriber stations of party line 1-01. These transmitters have sets of control relays 2-13 and 2-14, respectively, and there is also a common set of control relays 2-16, the three sets of relays cooperating to give one or the other of the transmitters access to the outgoing channel 1-03.

A transmitter start circuit, identified by reference numeral 2-17, and to be described in full hereinafter, cooperates with the incoming line circuit 2-01 and the set of control relays 2-16 to cause the transmission to the outgoing channel 1-03 of code signals for starting any of the transmitters associated with party line 1-01. Transmitter start circuit 2-17 is arranged for automatic operation, to cause the several transmitters associated with the party line to obtain access thereto in rotation.

Figs. 2, 3, 4 and 5 will not be further described in detail because they are identical with Figs. 9, 10, 11 and 12 of the Bacon et al. application. A complete understanding of the operation of the system as represented in Figs. 2, 3, 4 and 5 may be obtained from that portion of the Bacon et al. specification which describes Figs. 9, 10, 11 and 12. Reference numerals not specifically mentioned in the present specification identify corresponding parts of Figs. 9, 10, 11 and 12 of the Bacon et al. disclosure when account is taken of the fact that the last two digits identify specific elements and the first digit of the three-digit numbers and the first two digits of four-digit numbers identify the figure of location of such elements.

*Typical method of operation of the system*

In operating systems of this general class or type it is necessary for the subscribers to perforate tape in a particular manner, especially at the beginning and end of each message. It is also desirable for the subscriber to perforate special signals ahead of the message signals and the addresses thereof when transmission is first started, and after a number of messages have been perforated in the tape. In order to aid the subscriber in properly perforating the various addresses and other control signals in the tape various routines or operating procedures are usually specified.

It is to be understood that depending upon the requirements and traffic conditions various types of operating procedures may be established in accordance with the requirements to be satisfied. A typical operating procedure will be described for the system shown in the drawings. It is to be understood, however, that the system may be operated in other manners and that departures from the typical operating procedures may be employed to meet special conditions when they are encountered.

Although it is not absolutely necessary, it is desirable that a subscriber, in preparing a message tape on his keyboard perforator, first perforate a number of letters signals in the tape to provide a short length of tape ahead of the message which may be readily inserted in the tape transmitter and fitted to the tape feed mechanism thereof so that the tape will feed properly and bring the message address and text portions to the sensing position in a proper manner. Following the letters signals it is desirable for the subscriber to perforate a disconnect or end-of-message signal in the tape which, in the specific embodiment of the invention disclosed herein, is a figures signal, followed by an H signal, which in turn is followed by a letters signal. It is desirable that this be done in order to clear out any off-normal condition of the switching equipment and to condition it to receive and properly respond to the address and message signals. The letters signal following the H signal affords time for the switching apparatus to function properly at the switching center, and two or more letters signals may be inserted. Letters signals may be inserted at various times by the subscriber to provide sufficient time following or between various directing or control signals to insure that the equipment will respond properly, and fully establish the necessary circuits so that none of the message signals will be mutilated or lost. Following the letters signals the subscriber will perforate two characters in the tape which are assigned to the station for which the message is intended. These two character signals are sometimes designated as call directing codes or address codes. Following the address codes the subscriber will generally perforate a letters signal followed by the carriage return signal, the line feed signal and another letters signal, after which the message will be perforated in the tape. In order to facilitate the checking of the system and the messages transmitted therethrough, the address of the station to which the message is directed as well as the sender's address are generally included as a portion of the message. If it is considered desirable the two characters comprising the address code may be repeated, and under certain circumstances, the second appearance of the address code may be useful if the first one becomes lost or mutilated.

At the end of the message the subscriber will perforate another disconnect signal, comprising a figures signal, an H signal and a letters signal or several letters signals. If the subscriber has another message to transmit he may perforate the two characters comprising the address code of the message immediately following the letters signal or signals, it being unnecessary to repeat the figures and H signals to clear out off-normal conditions in the switching apparatus since the disconnect or end of message signal has just been transmitted. As in the case of the first message the subscriber will perforate, after the address code, the letters signal, the carriage return signal, the line feed signal, the letters signal and the body of the message. At the end of the message the subscriber again perforates the disconnect signal comprising the figures signal, the H signal and the letters signal. The subscriber may then perforate the address and text of another message, but if he has no other message to be transmitted at that time he will perforate following the end-of-message or disconnect signal a second H signal. This comprises an end-of-transmission signal signifying that the subscriber has no further messages to transmit at that time, and it is used only in transmission originating at the stations of a party line, to inform the transmitter start circuit that the subscriber has finished transmission and that the line is available to another station for message transmission.

A specific example of a typical message tape prepared in accordance with the suggested operating procedure will now be given. It will be assumed that station 1-07 has a message to transmit to station 1-09. The subscriber at station 1-07 will perforate several letters signals, a figures signal, an H signal, one or more letters signals, the signals for the characters CD, which is the address code for station 1–09, a letters signal, a carriage return signal, a line feed signal and a letters signal. After these the subscriber preferably perforates the full address of the station 1–09 as addressee and the full address of the station 1–07 as the sender. Thereafter the subscriber will perforate the tape in accordance with the message, followed by the disconnect or end-of-message signal comprising the figures signal, an H signal and the letters signal. It will also be assumed that the station 1–07 has no further transmission at this time and the subscriber will perforate, following the letters signal, an H signal and a letters signal, signifying end of transmission. After the subscriber at 1–07 has severed the perforated tape from the supply in the keyboard perforator he places the tape in the transmitter-distributor 1–51. It will be assumed that the message contained in the perforated tape is a priority message so that the subscriber operates a priority key which is associated with his transmitter-distributor 1–51. The subscriber is then free to direct his attention to other matters, as the transmission of the message will be controlled from the switching center without further attention on the part of the subscriber.

The manner in which messages are transmitted from the several stations associated with the party line to the switching center will now be described generally. As previously stated the switching center has, associated with the party line 1–01, a transmitter start circuit 2–17. The transmitter start circuit includes a set of skip keys. The skip keys are individual to the transmitting stations on the party line, and are provided to prevent the transmission of transmitter start signals to stations which are closed down, either intentionally or due to trouble conditions. If at least one of the skip keys is unoperated, and it will be assumed that the majority are unoperated, a master start key which is part of the transmitter start circuit may be operated to set the transmitter start circuit in operaion. Assuming that there is no incoming transmission on channel 1–02, as for example when the switching center is being set in operation at the beginning of a business day, the transmitter start circuit will seize control of the transmitter of one of the reperforator-transmitter units 2–08 and 2–09, interrupting transmission if that transmitter is in the process of sending a message, and will cause the transmission, by means of the seized transmitter of a sequence of signals comprising a blank, followed by a pause having a duration of approximately ½ second during which channel 1–03 remains in marking condition, after which the code combination for the space signal is transmitted. After the space signal the circuit transmits the priority message start code for the first station having its skip key unoperated, in the sequence following the station that last transmitted a priority message. The station control circuits 1–13, 1–14 and 1–15 respond to the blank-pause-space sequence of signals and to the priority start code following the space signal, but only the station control circuit serving the transmitter designated by that priority code will connect a transmitter to transmitting channel 1–02 and initiate operation thereof. If the particular transmitter thus given opportunity to transmit has a priority message awaiting transmission, the transmitter will be set in operation and the message will be transmited. The incoming line circuit 2–01, upon responding to the message transmission, suspends operation of the transmitter start circuit 2–17 which relinquishes control of outgoing channel 1–03, permitting resumption of message transmission over that channel if such transmission was interrupted.

If the transmitter selected in response to the transmitter start signal has no message awaiting transmission, the station control circuit which serves that transmitter generates an H signal and transmits it over transmitting channel 1–02 of the switching center. The incoming line circuit 2–01 responds to this acknowledgment signal by causing the transmitter start circuit to transmit the priority start signal for the next transmitter in the sequence having its skip key unoperated. If the transmitter selected in response to that signal has no message awaiting transmission, its station control circuit will return the H signal as an acknowledgment and indication of no message business and the transmitter start circuit will transmit the next transmitter selecting code in the sequence. This procedure continues until a transmitter having a priority message awaiting transmission is found, or until all of the transmitters have been polled for priority message transmission and all have returned the acknowledgment signal. Thereupon the transmitter start circuit transmits the non-priority transmitter selecting signal for the station next in the non-priority roll call sequence after the station that last transmitted a non-priority message. If the transmitter thus afforded an opportunity to transmit non-priority message material has no message to be transmitted, its station control circuit again generates the H signal which causes the transmitter start circuit to transmit the non-priority transmitter selecting code of the next transmitter in the sequence. The roll call continues, the transmitter start circuit retaining control of outgoing channel 1–03, until a station is found having a message awaiting transmission, and its transmitter will be set in operation to transmit the message. The transmitter will start transmitting and the incoming line circuit 2–01, responding to this transmission, will suspend operation of transmitter start circuit 2–17. The transmission of the message continues and the message is recorded on reperforator 2–02. When the end-of-transmission signal following the message is received the incoming line circuit responds to this signal to activate the transmitter start circuit which will initiate the transmission of priority start codes preceded by the sequence blank-pause-space, beginning with the station next in the priority roll call sequence after the station that last transmitted a priority message. Assuming that all of the transmitters are polled for priority message business without the initiation of message transmission from them and that all of the stations are polled for non-priority message business without the initiation of transmission from any of them, the transmitter start circuit suspends operation, and after an interval of the order of one to two minutes it again initiates a roll call of stations, first for priority business and then for non-priority business. This procedure continues until the transmitter start circuit is deactivated by restoration of the start key to the stop condition.

Assuming now that in the search for priority traffic awaiting transmission, the message for station 1–09 is transmitted to the switching center and is recorded in reperforator 2–02 the director circuit 2–07, cooperating with transmitter 2–04, decodes the call directing code CD preceding the message. Under the permissive control of sequence circuit 4–01, the director circuit 2–07 operates select magnet 3–01, and having tested reperforator-transmitter units 2–08 and 2–09 for busy or idle condition, and finding the reperforator of one of them idle, the director circuit operates hold magnet 5–16 or 5–01 to establish a transmission connection of the idle reperforator. The connection having been established, transmitter 2–04 is set in operation and the message is transmitted to the reperforator of unit 2–08 or 2–09 where it is recorded. In response to the disconnect signal at the end of the message, the director circuit 2–07 restores to normal and releases the operated hold magnet 5–16 or 5–01, thereby opening the crossbar switch contacts which had been closed under the control of select magnet 3–01, and disconnecting transmitter 2–04 from the reperforator.

With a message or a part thereof stored in the outgoing line reperforator, its associated transmitter seeks access to outgoing channel 1–03 under the control of its associated transmission control relays 2–13 or 2–14 and common control relays 2–16. If the other transmitter is then transmitting, the transmitter having all or part of a message for retransmission waits until the transmission of the message then in progress has been completed, whereupon it gains access to outgoing channel 1–03 and transmits the message for station 1–09. The transmitters of reperforator-transmitter units 2–08 and 2–09 are given access to outgoing channel 1–03 alternately for the transmission of single messages.

All of the station control circuits 1–13, 1–14 and 1–15 respond to the call directing code CD. Only the station control circuit 1–15 serves the station 1–09 having that call directing code and, in response thereto, it connects teletypewriter printer 1–52 to receive the message. The carriage return and line feed signals which follow the call directing code, in addition to performing their usual functions in teletypewriter printer 1–52, serve to deactivate the station control circuits 1–13, 1–14 and 1–15 so that those circuits will not connect any of the stations that they serve to transmission channel 1–03 in response to sequences of code signals appearing in the message that are the same as the call directing codes of the stations. The disconnect signal at the end of the message causes the disconnection of receiving teletypewriter 1–52 from transmission channel 1–03 and also activates the station control circuits so that they are capable of responding to call directing codes preceding the next message transmitted from the switching center over outgoing channel 1–03.

One of the station control circuits, in the specific disclosure the station control circuit 1–13, is provided with an arrangement whereby almost any sequence of two character code signals transmitted over channel 1–03 while the station control circuits are in the activated condition, which does not represent the call directing code or group code of any station associated with party line 1–01 (the transmitter start signals being excluded from consideration in this instance) will cause one of the receiving teletypewriters served by station control circuit 1–13 to be connected to channel 1–03 to receive whatever signals follow. The purpose of this arrangement is to prevent a loss of messages preceded by address codes which have become garbled after seizure of one of the reperforator-transmitter units 2–08 and 2–09 by one of the directors of the switching center. The fact that a particular outlet, such as the reperforator-transmitter unit 2–08 or 2–09, is seized is indicative of proper operation of the switching center in response to a proper call directing code. If this were not so the message would not reach a point, namely, reperforator-transmitter unit 2–08 or 2–09, at which it could be retransmitted over outgoing party line channel 1–03. A call directing code may possibly become garbled in cross-office transmission after the switching connection has been established or in retransmission over outgoing channel 1–03. The provision for recording of a message preceded by a garbled call directing code at one of the stations of the party line avoids loss of the message and enables corrective measures to be taken to effect the reintroduction of the message into the system preceded by a proper call directing code. It is considered preferable to provide for recording of such messages at a station served by the station control circuit which is most remote, from the standpoint of distance along transmission channel 1–03, from the switching center, since it may be supposed that a call directing code could become garbled at any point along the transmission channel due to a line hit or other trouble condition, and provision for interception of such messages at a point other than the station control circuit most remote from the switching center might well result in the loss of some messages.

*Initial condition of the system*

Figs. 6 to 22, inclusive, when arranged as shown in Fig. 24 show circuit details of typical circuits and equipment which cooperate to achieve or comprise a typical system in accordance with this invention. When power is first applied at the switching center after it has been installed or the first thing in the morning, if it has been shut down during the night, the relays and equipment of the portions shown in detail in Figs. 9 to 11, 15 to 17, 21 and 22 will assume the positions and conditions shown. It is to be understood that suitable driving motors are provided for the various devices and that these are all started into operation by connecting them to a suitable source of power. Numerous motors and sources of power have been shown in the drawings. However, a number of other devices employ motors which are not shown in the drawings because it is well understood by those skilled in the art that such devices require and will be supplied with driving motors. For example, the receiving teletypewriters shown at the outlying subscriber stations require a motor to drive them so that they will properly receive signals and record characters or perform functions corresponding thereto. In some cases the motor which drives the transmitter and operates the keyboard perforator is also employed to operate the receiving teletypewriter. Such an arrangement is shown in certain of the hereinbefore identified patents disclosing details of suitable equipment for use in the subscriber stations. In addition, the monitoring selector unit included in each of the station control circuits is provided with a driving motor. Similarly, receiving and transmitting equipment, such as reperforators and transmitter distributors at the switching center are provided with driving motors, it being understood that all of the motors are connected to sources of power and are continuously in operation when the system itself is in operation, so that the equipment is at all times ready to respond to received signals.

The relays and other equipment at the subscriber stations, at the secondary switching centers or station control circuits and at the primary switching center are in and remain in the condition shown in the drawings when power is applied, and until signals are transmitted over the system, for energizing the circuits as will be described hereinafter. All transmitters and all receiving devices including teletypewriter printers and printing reperforators are in the stop or rest condition. The selector magnets of receiving teletypewriters and printing reperforators and the selector magnets of the monitoring selector units are energized, which is the marking condition. All transmission circuits extending from point to point are in the marking condition and the receiving or repeating relays associated therewith have their armatures held in engagement with their marking contacts.

*Subscriber perforates tape*

Figure 6:
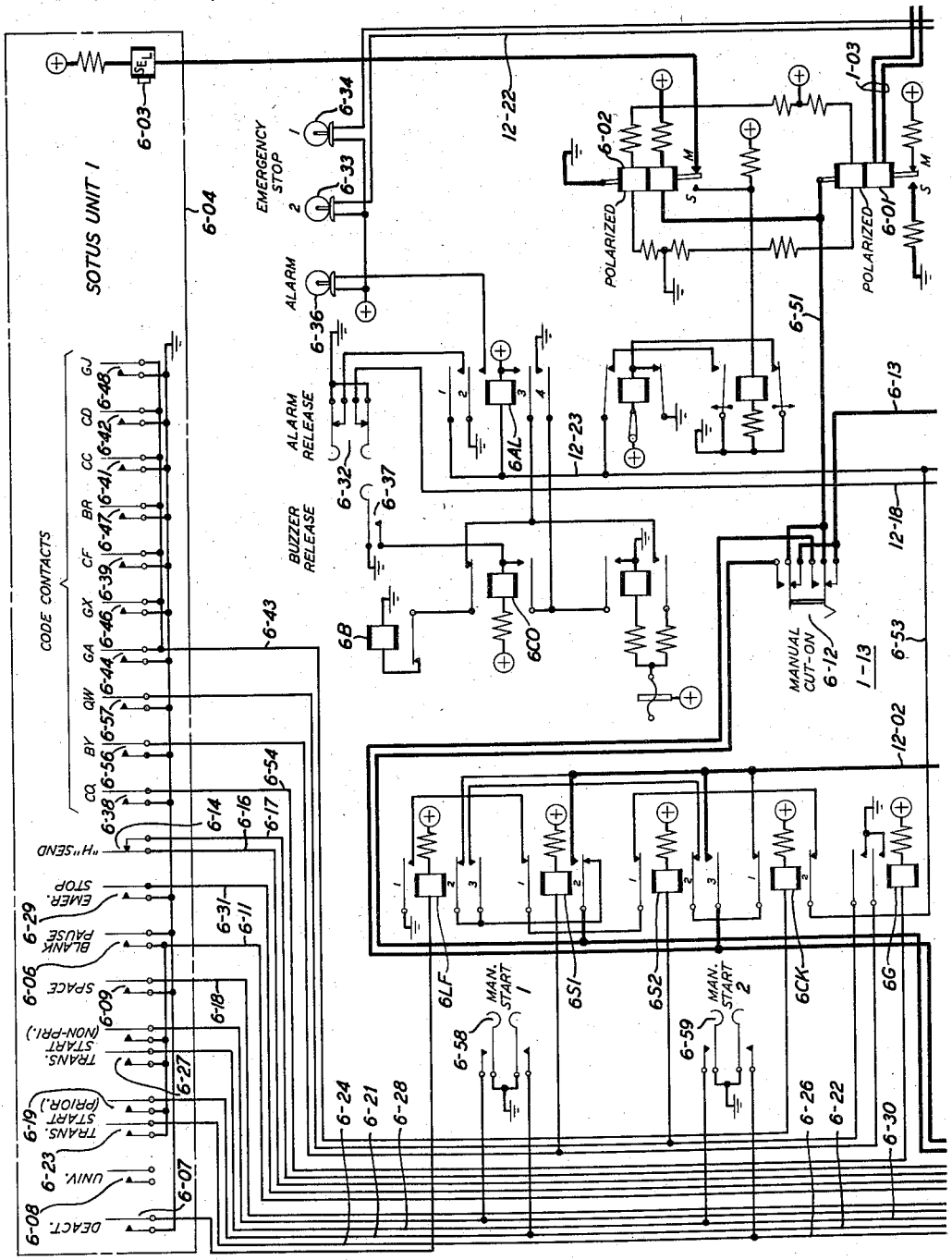
Figure 8:
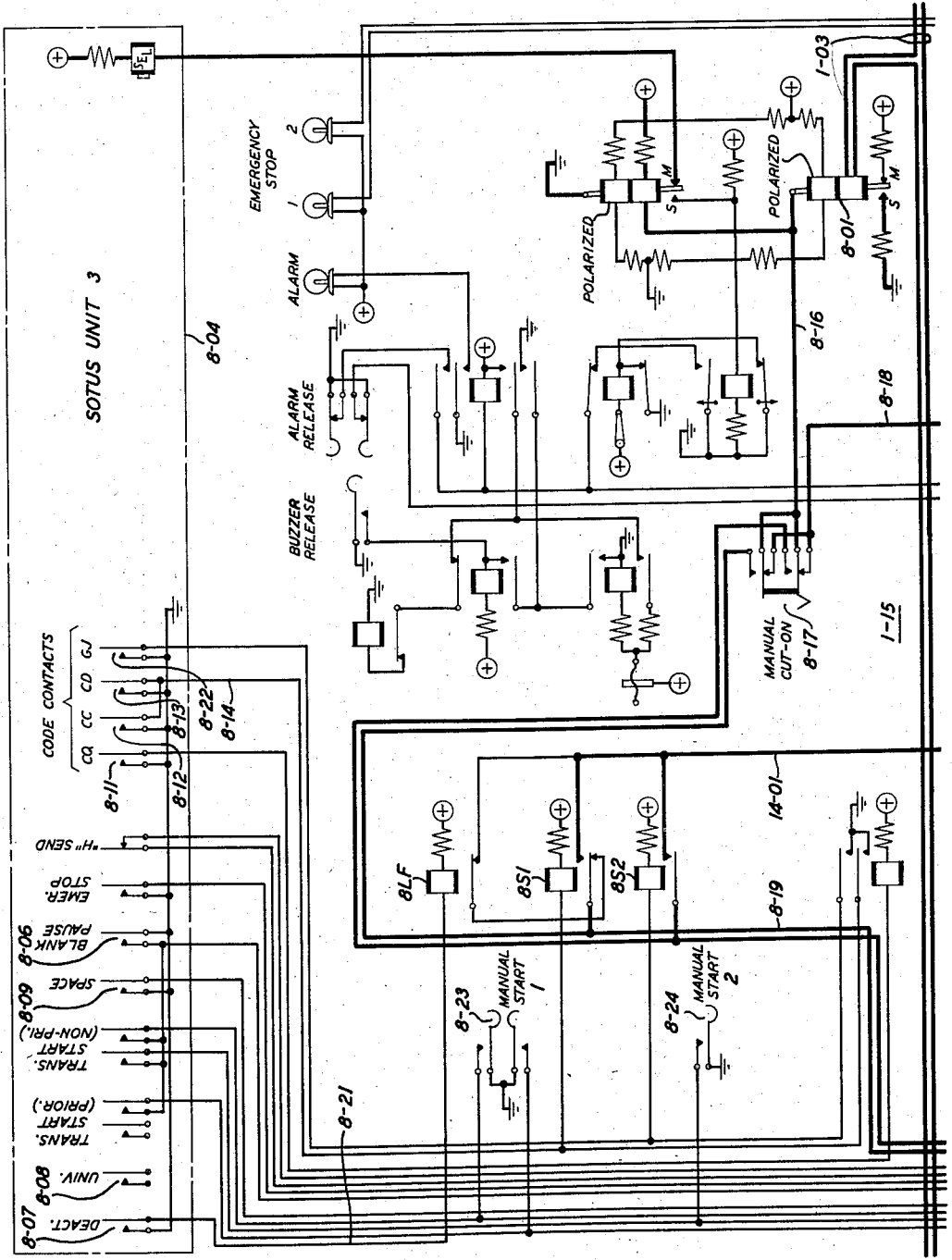
Figure 9:
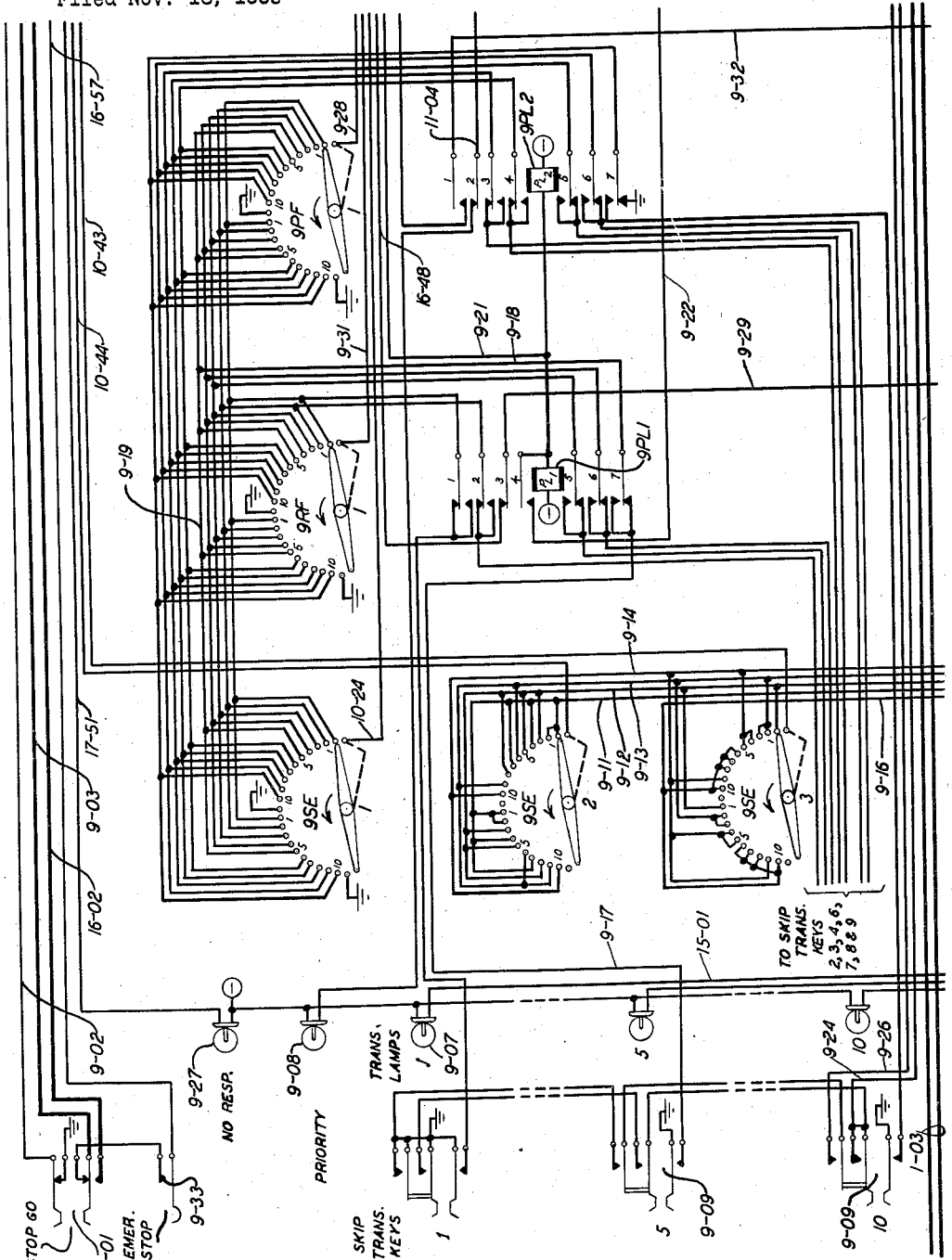
Figure 10:
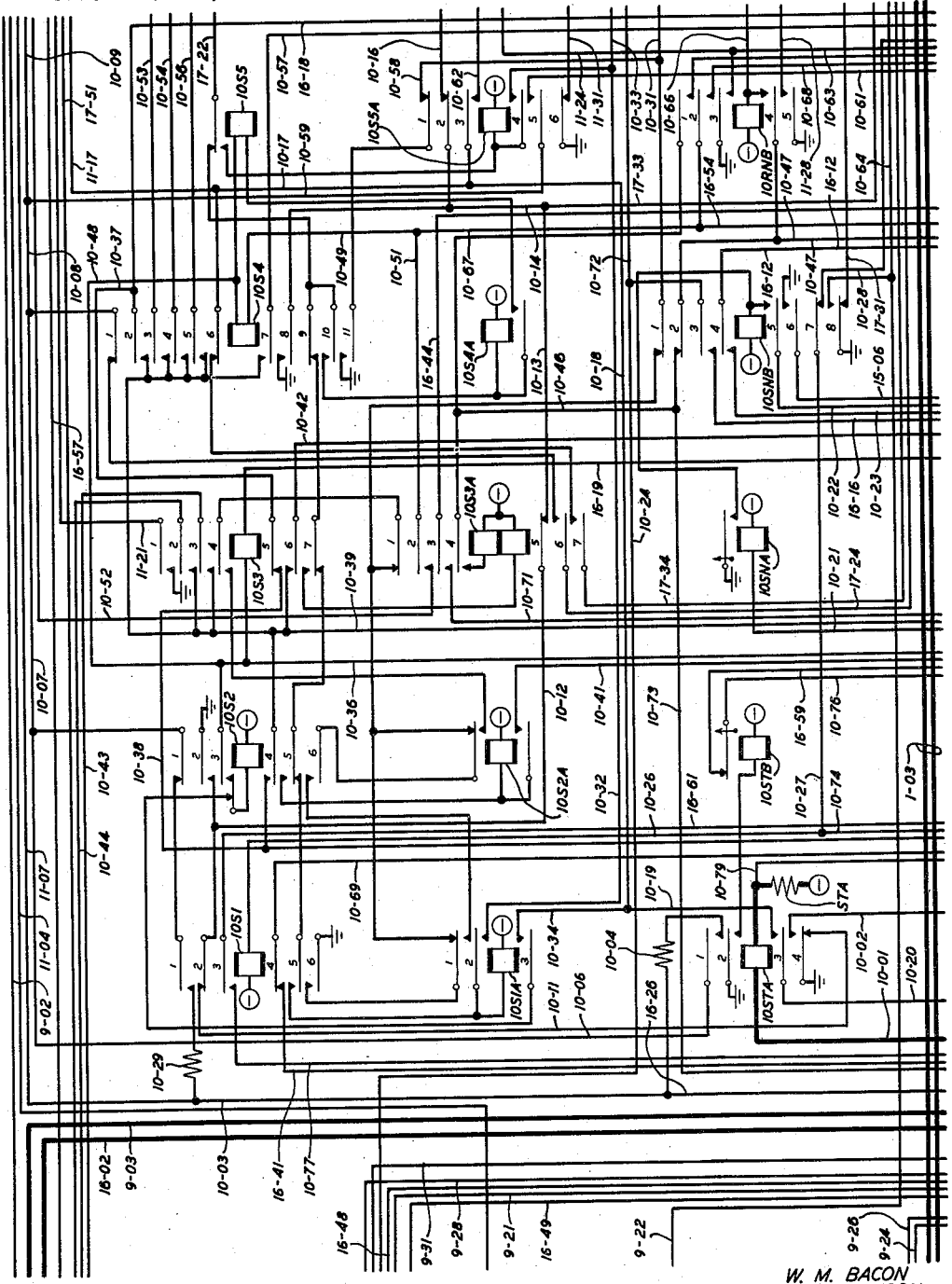
Figure 12:
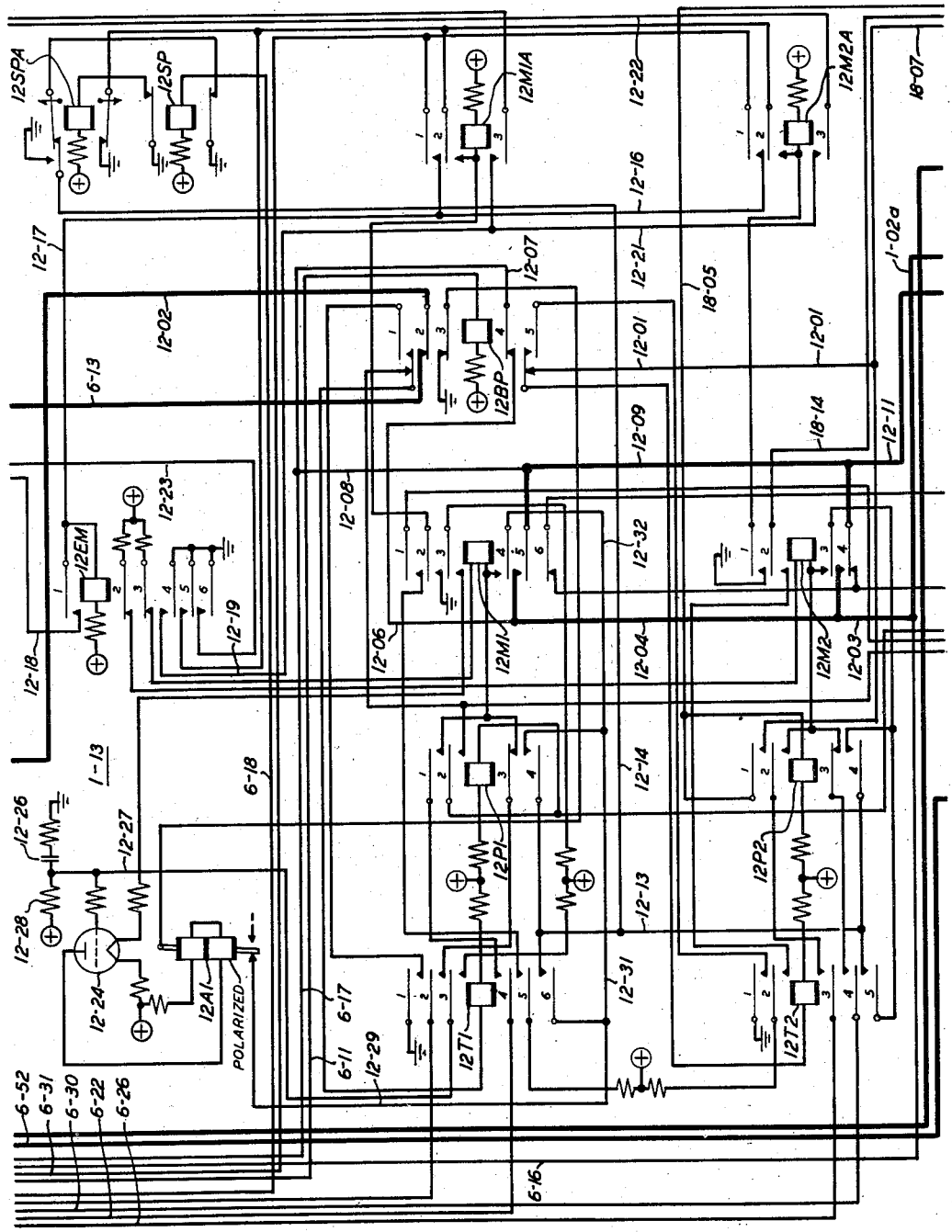
Figure 13:
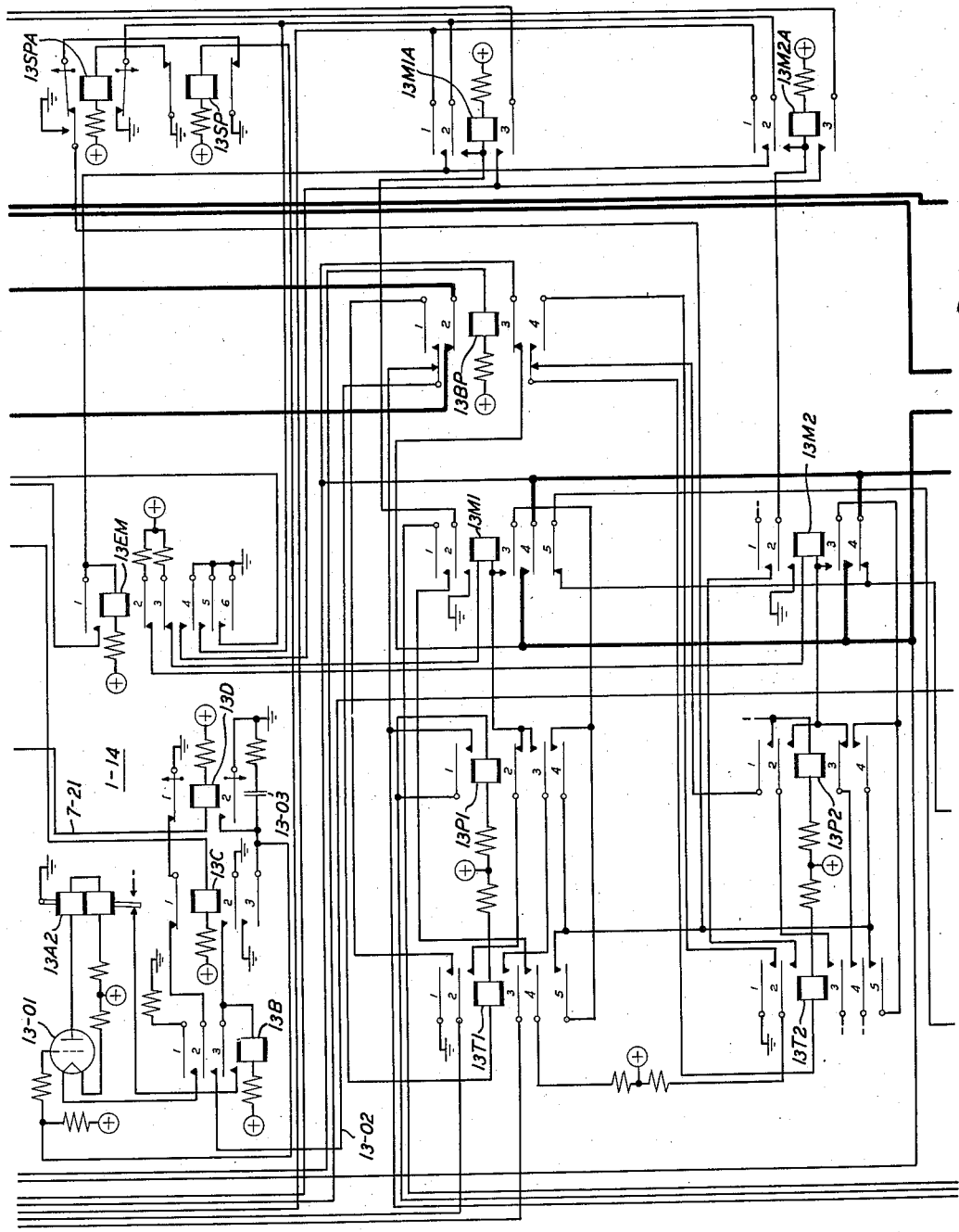
Figure 14:
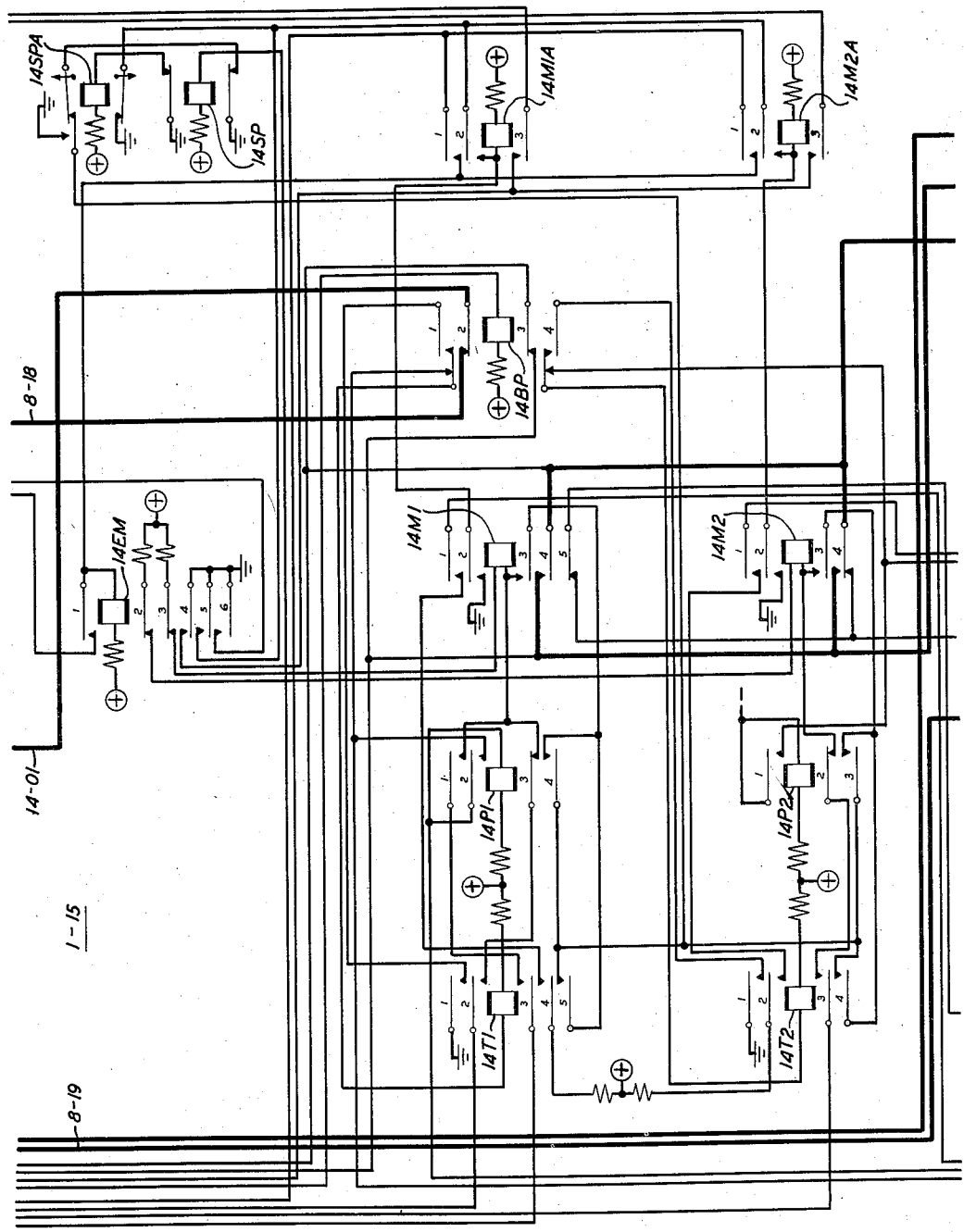
Figure 15:
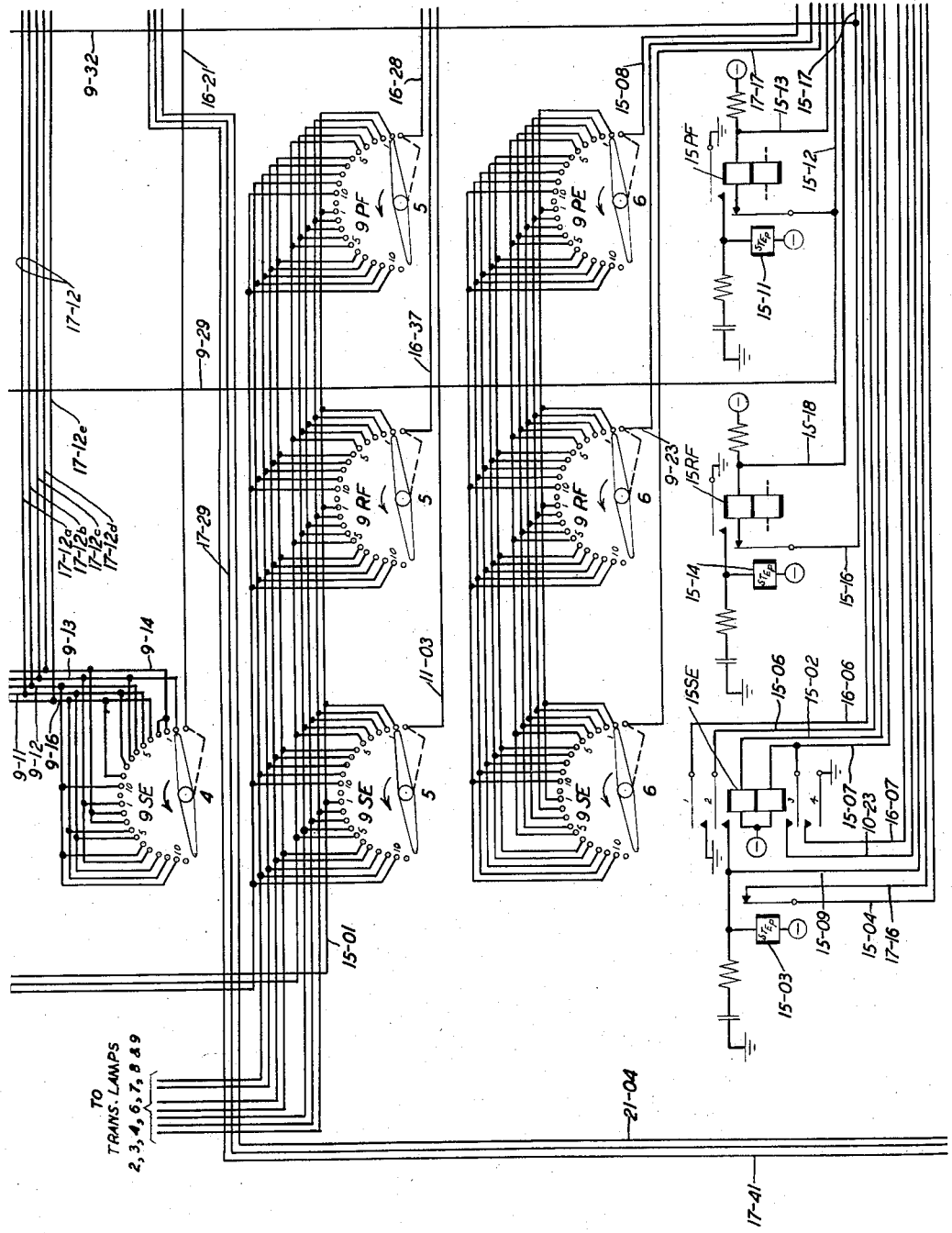
Figure 16:
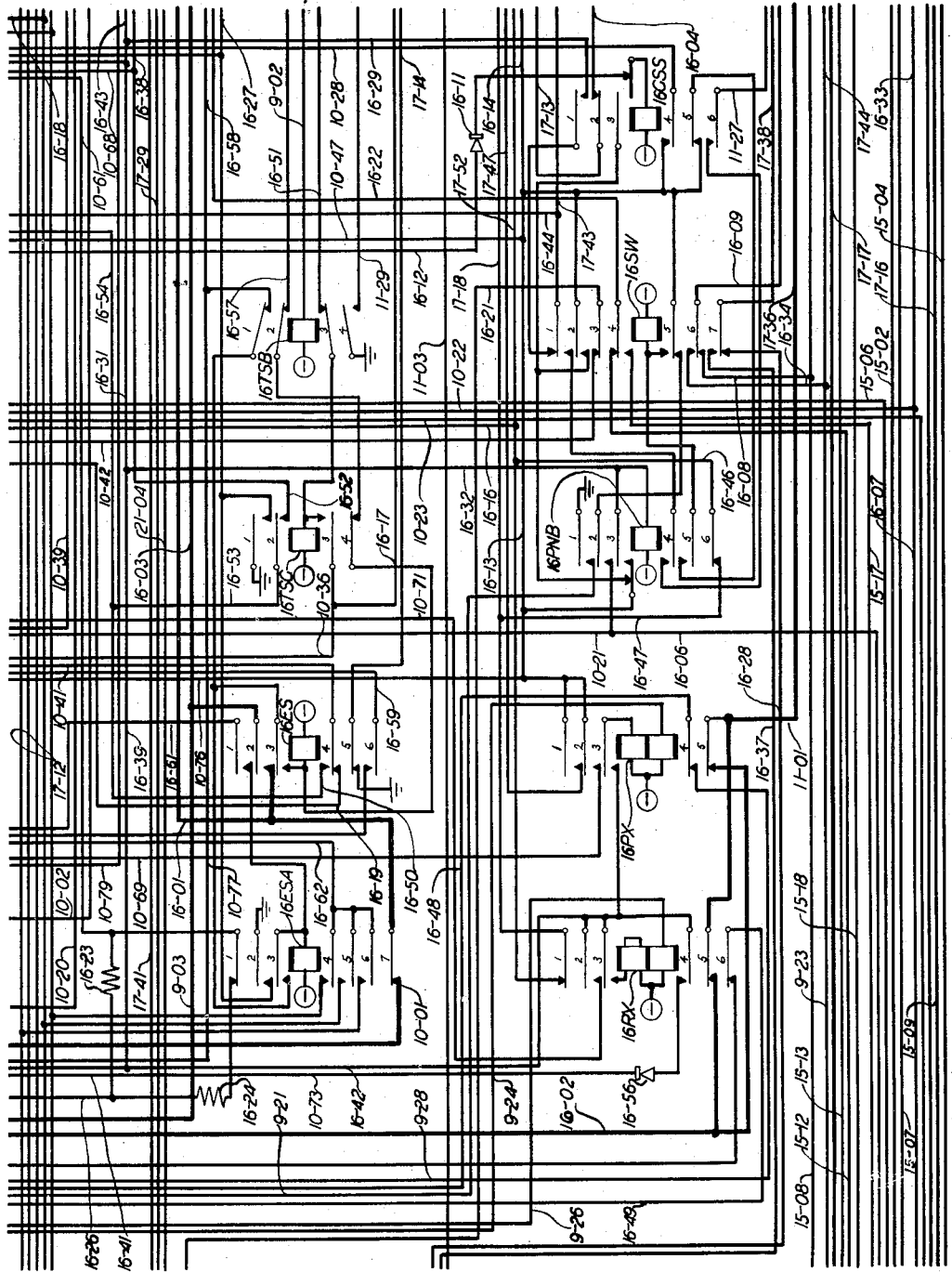
Figure 18:
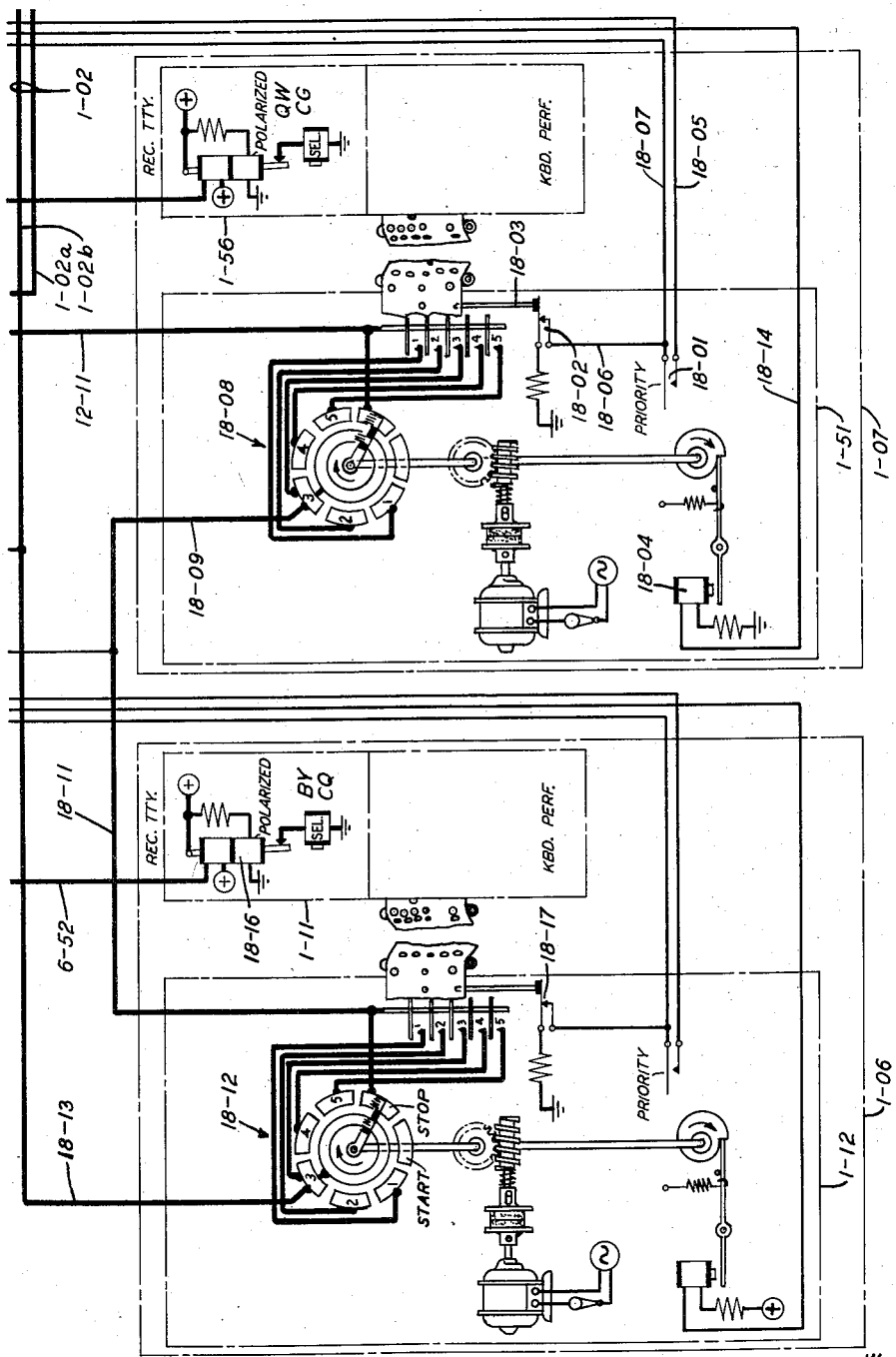
Figure 19:
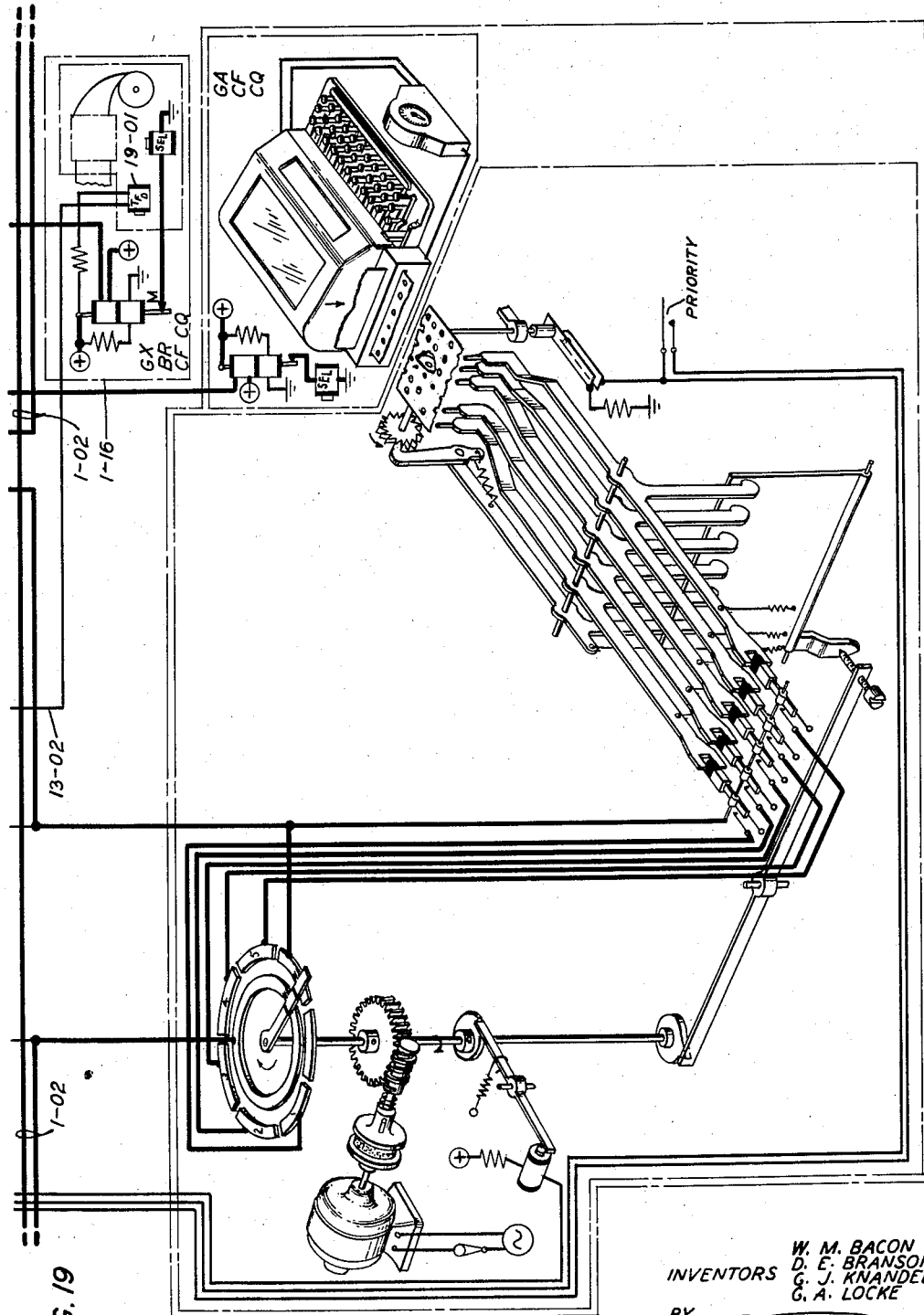
Figure 20:
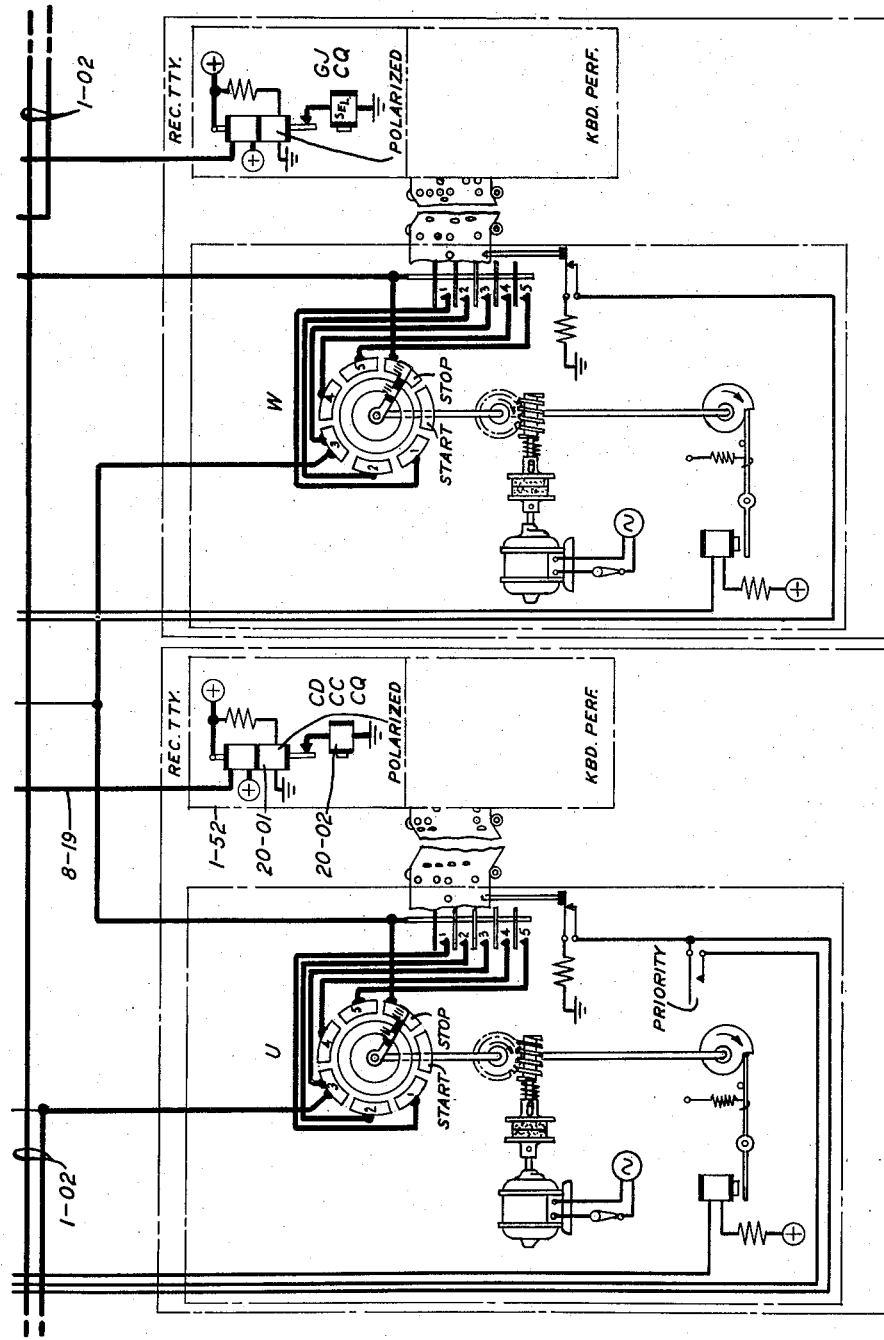

For purposes of illustration it will be assumed that the subscriber at station 1–07, shown in Figs. 6, 12 and 18, perforates a message in a tape, the message being as hereinbefore outlined, comprising first a series of several letters signals, the end-of-message code signals comprising figures, H and letters signals, to assure that all switching apparatus is in the normal condition before responding to call directing codes, the signals for the characters CD, this being the call directing code for station 1–09 shown in Figs. 8, 14 and 20, a letters signal, a carriage return signal, a line feed signal, a letters signal, signals representing the complete address of station 1–09 as addressee and the full address of the station 1–07 as sender, the body of the message, the disconnect signal comprising figures, H and letters and the end-of-transmission signal comprising the signals H and letters. The tape is then severed from the reperforator and is placed in transmitter-distributor 1–51. It has been assumed that the message has a priority rating so that the subscriber at station 1–07 operates priority key 18–01. With the message tape inserted in transmitter 1–51 contacts 18–02 are closed by feeler pin 18–03 to prepare an energizing circuit for the start magnet 18–04 of the transmitter. With contacts 18–02 closed a conductive path is traced from ground through the closed contacts, conductors 18–06, 18–07 and 12–01, break contacts controlled by armature 5 of relay 12BP and winding of relay 12T2 to battery and relay 12T2 operates. A circuit is also completed from ground through contacts 18-02, conductor 18-06, priority contacts 18-01, conductor 18-05 and winding of relay 12P2 to battery, and this relay operates. It locks to conductor 18-07 through its armature 1 and front contact, and conductor 12-12. Relays 12T2 and 12P2 prepare for the starting of transmitter 1-51 in response to its priority start code transmitted by the transmitter start circuit, as will be more fully described hereinafter.

*Starting transmission from a subscriber station*

The transmitter start circuit is shown in Figs. 9, 10, 11, 15, 16 and 17. It will be assumed that outgoing channel 1-03 and incoming channel 1-02 of the multistation line are idle and that power has been turned on at the switching center as the first step in beginning a day's operation. An attendant at the switching center operates key 9-01 to its off-normal position which is the start position of the key. At the upper or break contacts ground is disconnected from conductor 9-02, thereby releasing relay 16TSB, which has no significance at this time. At its lower or transfer contacts the key 9-01 completes an operating circuit for preliminary start relay 10STA, the circuit being traced from battery through the winding of that relay, conductor 10-01, back contact of armature 7 of relay 16ESA, conductor 16-01, armature 3 and back contact of relay 17BS, armature 1 and back contact of relay 17BSA, conductor 17-01, armature 5 and back contact of relay 11HDT, back contact and armature 7 of relay 11HD, conductor 11-01, armature 5 and back contact of either of the relays 16PX and 16RX, it being assumed for the present that both are released, conductor 16-02, lower make contacts of key 9-01, conductor 9-03, conductor 16-03 and armature 5 and back contact of start relay 17ST to ground. Relay 10STA operates over this circuit.

At its armature 4 and front contact relay 10STA connects ground over a path including conductors 10-02, 17-02 and 17-03 to the outgoing line circuit. This circuit is represented only by the labeled rectangle 17-07. The circuit is shown in Figs. 20 to 25 of Bacon et al. application Serial No. 119,184, filed October 1, 1949 and is described in the specification of that application. Conductor 17-03 terminates in the operating winding of a relay 17-10 corresponding to relay 20-01 of the Bacon et al. application. That relay is operable to suspend transmission over the outgoing channel 1-03 of multistation line 1-01 in order to make the outgoing channel available for transmission of the transmitter start signals. It is assumed that there is no outgoing transmission at this time and the operation of the relay associated with conductor 17-03 is not significant. The ground on conductor 17-02 is extended over conductor 17-04, back contact and armature 1 of relay 17BS, conductors 17-06 and 11-02, armature 2 and back contact of relay 11HDT and conductor 11-03 to the contactor associated with contact bank SE5 of selector stepping switch 9SE which has contact banks 1, 2 and 3 in Fig. 9 and contact banks 4, 5 and 6 in Fig. 15. The six contactors of switch 9SE may occupy any random position, it being understood that the six contactors always engage corresponding contacts. Each of the six contact banks has duplicate sets of ten connections to its contacts. It will be assumed that the contactors occupy the positions shown in Figs. 9 and 15 with the first contact of the first set of connections of each contact bank engaged by its contactor. The ground connection is thus extended from conductor 11-03 through contact bank 5 to conductor 15-01 and through transmitter lamp 9-07 to negative battery conductor, and this lamp lights. The lighting of lamp 9-07 is an indication of the position of the contactors of switch 9SE and is also an indication of the particular station that will be called and the transmitter start signal that will be transmitted, since each of the ten contacts of the set is identified with a different one of ten stations and their transmitter starting codes.

The ground connection on conductor 17-06 is extended over conductor 11-04, armature 2 and back contact of relay 9PL2 and priority lamp 9-08 to negative battery, and this lamp lights. The lighting of lamp 9-08 serves as an indication that the transmitter start circuit is conditioned for the transmission of priority transmitter start signals.

At its armature 2 and front contact relay 10STA completes the circuit of relay 10STB which operates. This relay has a function in the emergency stop cycle which will be described later.

Figure 11:
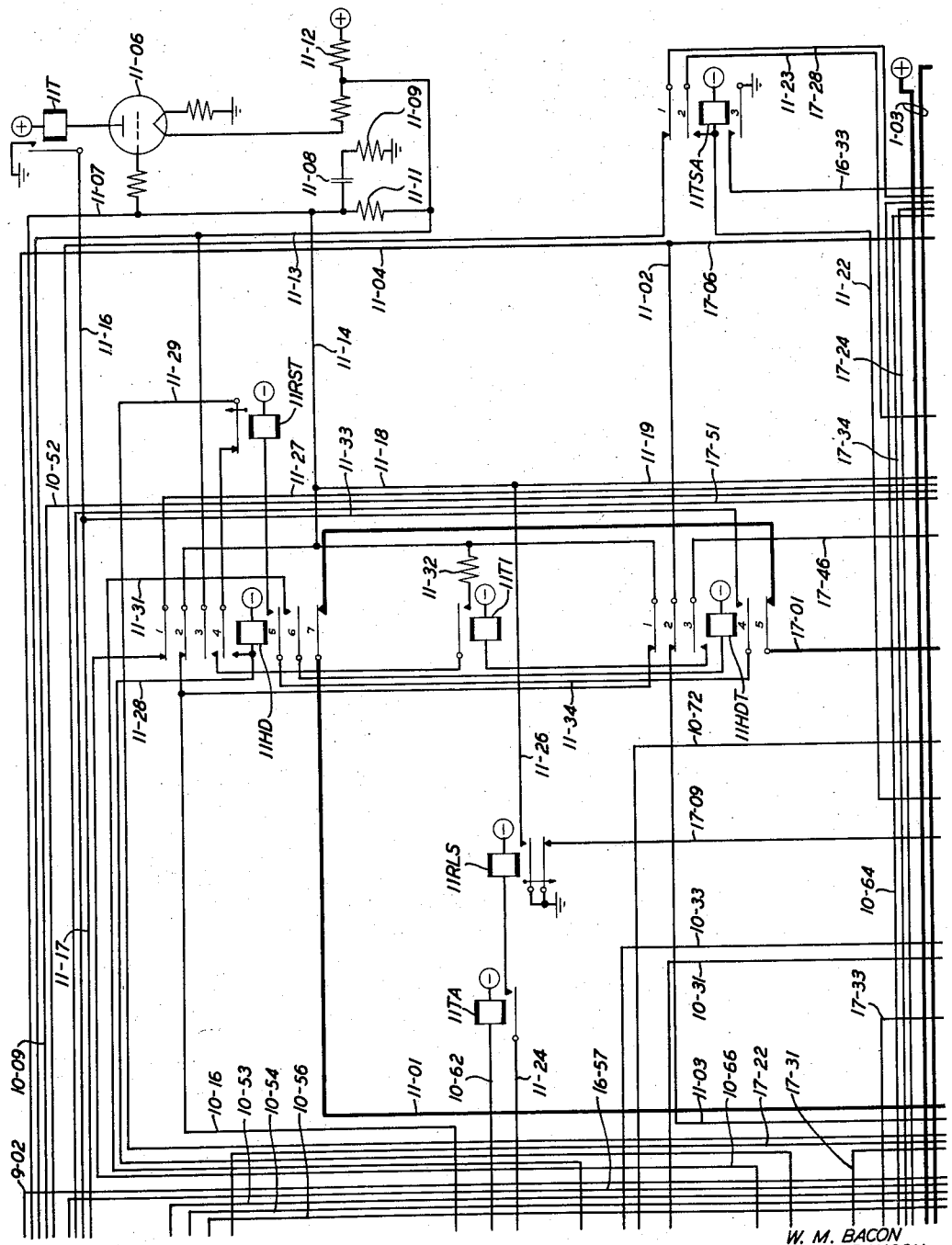

Fig. 11 includes a timing circuit comprising a vacuum tube 11-06 which has relay 11T included in its plate circuit and which has its grid connected to conductor 11-07. A connection from conductor 11-07 through condenser 11-08 and resistor 11-09 to ground provides a timing circuit for controlling the operation of vacuum tube 11-06, and a path from conductor 11-07 through resistors 11-11 and 11-12 to battery provides a charging circuit for condenser 11-08. A number of resistors are arranged to be associated with the charging circuit for condenser 11-08 in various ways to vary the timing of operation of relay 11T and among these is resistor 10-04, the association of which with the timing circuit is controlled by relay 10STA, hereinbefore described as having operated. Conductor 11-07, to which the grid of tube 11-06 is connected, is traced to Fig. 10 where the path is extended over conductor 10-03, resistor 10-04, front contact and armature 1 of relay 10STA, conductors 10-06, 10-07, 10-08, 10-09 and 11-13 to the junction of resistors 11-11 and 11-12. Resistor 10-04 is thus placed in parallel with resistor 11-11. In addition to associating resistor 10-04 with the charging circuit for condenser 11-08, the relay 10STA also activates that charging circuit by disconnecting ground at its armature 4 from a path traced through the associated back contact, conductor 10-11, back contact and armature 2 of relay 10S1, conductor 10-12, armature 5 and back contact of relay 10S3A, conductors 10-13, 10-14, armature 2 and back contact of relay 10S5A, conductor 10-16, back contact and armature 2 of relay 11HD and in parallel therewith, back contact and armature 1 of relay 11HDT and conductor 11-14 to conductor 11-07 to which the grid of tube 11-06 and the grid controlling terminal of condenser 11-08 are connected. With the disconnection of ground from that terminal of the condenser, the charging of the condenser begins, and the time constant provided by resistors 11-11 and 10-04 in parallel is such that tube 11-06 is rendered conductive in 300 milliseconds.

When tube 11-06 becomes conductive relay 11T operates and connects ground over a path including conductors 11-16, 11-17, 10-17, 10-18 and 10-19, front contact and armature 3 of relay 10STA, conductor 10-20 and winding of relay 17ST to battery and that relay operates. It locks in a path traced from its winding through its front contact and armature 7, conductors 17-08 and 17-09 and back contact and outer armature of relay 11RLS to ground.

At its armature 8 and front contact the relay 17ST connects ground over conductors 17-02 and 17-03 to the outgoing line circuit 17-07 to maintain operated the relay 17-10 which has the function of suspending outgoing transmission. This ground connection also holds priority lamp 9-08 lighted over the path including conductors 17-04, 17-06, 11-04 and the armature 2 and back contact of relay 9PL2 as previously traced. At its armature 11 and front contact the relay 17ST connects ground over conductor 17-11 which extends into outgoing line circuit 17-07 to operate a relay 17-15 corresponding to the relay 21-02 or 21-01 in Fig. 21 of the Bacon et al. application, the function of which is to associate transmitter contacts of either of two transmitter-distributor units in the outgoing line circuit with five conductors of the transmitter start circuit, these being the conductors identified herein as a group by the reference numeral 17–12. At its armature 5 and back contact relay 17ST disconnects ground from the energizing circuit for relay 10STA, thereby releasing it. This relay in turn releases relay 10STB and reconnects ground over a path previously traced from the back contact associated with its armature 4 to conductor 11–07 and condenser 11–08, to discharge the condenser, thereby cutting off tube 11–06 and releasing relay 11T. Transmitter lamp 9–07 remains lighted after relay 10STA releases because the circuit of that lamp has previously been traced to conductor 17–02 which is now receiving ground through the armature 8 and front contact of relay 17ST. With relay 17ST operated an energizing circuit for relay 17SCS is completed from battery through the winding of that relay, conductor 17–13, armature 2 and back contact of relay 16CSS, conductor 16–04, front contact and armature 4 of relay 17ST, conductor 17–14 and armature 5 and back contact of relay 16ES to ground.

Relay 17SCS completes the energizing circuit for the upper winding of relay 15SE, the circuit being traced from battery through that winding, conductor 15–02, armature 6 and back contact of relay 17NB, conductor 17–16, break contacts operable by the stepping magnet 15–03 of stepping switch 9SE, conductor 15–04 and armature 1 and front contact of relay 17SCS to ground. Relay 15SE operates and completes the energizing circuit for relay 10SNA, the circuit being traced from battery through the winding of that relay, conductors 10–21 and 16–06 and armature 1 and front contact of relay 15SE to ground. Relay 10SNA operates and through its single armature and front contact completes the circuit of relay 10SNB which operates and locks through its front contact and armature 5, conductors 10–22 and 16–07 and front contact and armature 4 of relay 15SE to ground. Relay 10SNB completes the energizing circuit for stepping magnet 15–03 in a path traced from battery through the winding of that magnet, front contact and armature 2 of relay 15SE, conductor 15–06 and armature 6 and front contact of 10SNB to ground. Stepping magnet 15–03 operates and interrupts at its break contacts the energizing circuit for relay 15SE which releases, unless the contactor associated with contact bank 6 of stepping switch 9PF is on the same relative contact as the contactor of contact bank 6 of stepping switch 9SE. The stepping switch 9PF may be comprised of the same number of contact banks as switch 9SE, which is six, but only three are used, the contact bank 1 contained in Fig. 9 and contact banks 5 and 6 contained in Fig. 15. With the contactors of contact bank 6 of the two stepping switches occupying corresponding positions, an alternate energizing circuit for relay 15SE is traced from battery through its lower winding, conductor 15–07, front contact and armature 3 of relay 17SCS, conductor 17–17, the contactor associated with contact bank 6 of stepping switch 9SE and the first contact in the first of the two groups of connections of that contact bank, the corresponding contact bank 6 of switch 9PF and its contactor, conductors 15–08 and 16–08, back contact and armature 6 of relay 16SW, conductor 16–09 and armature 2 and front contact of relay 17SCS to ground. Assuming for the moment that the sixth contactors of the two stepping switches are not in corresponding positions, the circuit just traced through the lower winding of relay 15SE will be open. Relay 15SE will, therefore, release when the circuit through its upper winding is interrupted at the break contacts of stepping magnet 15–03. When relay 15SE releases, the energizing circuit for stepping magnet 15–03 is interrupted and this magnet releases, advancing the contactors of stepping switch 9SE to the next position, these stepping switches being arranged to advance their contactors on the back or release etroke. The relay 15SE also interrupts at its armature 1 the energizing circuit for relay 10SNA but that relay has a slow-release characteristic and does not immediately release. With stepping magnet 15–03 released the circuit of the upper winding of relay 15SE is again completed at the break contacts of the stepping magnet and the relay operates, in turn completing the energizing circuit of stepping magnet 15–03 which reoperates. Again the magnet interrupts the circuit through the upper winding of relay 15SE unless the advancement of its sixth contactor one step has completed the previously traced circuit through the lower winding of relay 15SE. Assuming that relay 15SE again releases, it releases stepping magnet 15–03, thereby advancing the contactors controlled by that magnet another step. This procedure continues until the sixth contactor of stepping switch 9SE comes into the same relative position as the sixth contactor of stepping switch 9PF and completes the circuit through the lower winding of relay 15SE to prevent the release of that relay. The release time of relay 10SNA is sufficiently long to cause that relay to hold operated during the released intervals of relay 15SE while the contactors of switch 9SE are being advanced step-by-step.

Following the advancement of the contactors of switch 9SE to the position in which the circuit through the lower winding of relay 15SE is completed, the stepping magnet 15–03 reoperates, or in the event that the contactors of switches 9SE and 9PF already occupy corresponding positions and relay 15SE does not release, relay 16CSS operates, the circuit being traced from battery through its winding, the make-before-break contacts controlled by its armature 3, unidirectional current carrying device 16–11, conductor 16–12, armature 3 and front contact of relay 10SNB, conductor 10–23 and front contact and armature 3 of relay 15SE, to ground on conductor 15–07 over which the lower winding of relay 15SE is energized, the winding of relay 16CSS thus being connected in parallel with the lower winding of relay 15SE to battery. Unidirectional current carrying device 16–11 is included in the energizing circuit for relay 16CSS to prevent a slow driving of stepping switch 9SE when it is being driven toward a matching position with stepping switch 9PF, due to the parallel relation of the winding of relay 16CSS to the lower winding of relay 15SE.

Relay 16CSS locks in a circuit traced through the front contact associated with its armature 3, break contacts controlled by armature 3 of relay 16PNB, conductors 16–13 and 16–14 and armature 10 and front contact of relay 17ST to ground. Relay 16CSS interrupts at its armature 2 and back contact the energizing circuit of relay 17SCS which releases. With relay 17SCS released the circuits through both windings of relay 15SE are interrupted and this relay releases, thereby interrupting the circuit of stepping magnet 15–03 which advances the contactors of stepping switch 9SE a step. With relay 17SCS now released and relay 10SNB operated and locked, an energizing circuit for the upper winding of relay 15SE may be traced over conductor 15–02, armature 6 and back contact of relay 17NB, conductor 17–16, break contacts of stepping magnet 15–03, conductor 15–04, armature 1 and back contact of relay 17SCS, conductor 17–18, back contact and armature 6 of relay 16PNB and in parallel therewith through armature 1 and back contact of relay 16RX, conductor 16–16, front contact and armature 3 of relay 10SNB, conductor 10–24, the contactor associated with contact bank 1 of stepping switch 9SE, any one of the ten contacts in either of the contact groups of that stepping switch bank, any one of the ten conductors connected to the contacts of that group, any one of the armatures 1, 2, 5, 6 and 7 of relay 9PL1 or any one of the armatures 3, 4, 5, 6 and 7 of relay 9PL2 to the lowermost contact of the associated transmitter skip key 9–09, of which the first, fifth and tenth keys are shown in the drawings. If the particular skip key to which the path is extended has been operated to prevent the transmission of transmitter start signals for the station represented by the key, the path will terminatte at ground through the lowermost contact of the key and the grounded switch spring engaging the lowermost contact, the circuit of the upper winding of relay 15SE will thereby be completed to cause the completion of the energizing circuit of stepping magnet 15-03, the release of relay 15SE, the release of stepping magnet 15-03 and advancement of the contactors of stepping switch 9SE. If the contactor of contact bank 1 again engages a contact receiving ground from the next transmitter skip key the cycle will be repeated and the contactors will be advanced until they reach a contact associated with an unoperated skip key. The contactors will advance no farther and relay 15SE and stepping magnet 15-03 will remain released.

When relay 15SE has remained released for a sufficient interval to permit relay 10SNA to release that relay will release relay 10SNB, its locking circuit having been interrupted at the armature 4 and front contact of relay 15SE. Upon the release of relay 10SNB a circuit for relay 10S1 is completed in the path traced from battery through the winding of that relay, conductors 10-26 and 10-27, armature 7 and back contact of relay 10SNB, conductor 10-28, armature 4 and front contact of relay 16CSS, conductor 16-14 and armature 10 and front contact of relay 17ST to ground. Relay 10S1 disconnects ground, at its back contact and armature 2, from the grid of tube 11-06 and condenser 11-08, and at its armature 1 and front contact it connects resistor 10-29 in parallel with resistor 11-11. Condenser 11-08 now charges through resistors 11-11 and 10-29 and with these resistors in the charging circuit an interval of 500 milliseconds is required to render tube 11-06 conductive. At its armature 6 relay 10S1 extends a ground connection through the associated front contact, armature 1 and back contact of relay 10S1A, back contact and armature 1 of relay 10SNB, now released, conductor 10-31, armature 3 and front contact of relay 17ST and conductor 17-19 to outgoing line circuit 17-07. This ground connection operates the distributor clutch release magnet of the transmitter-distributor which has had its distributor contacts extended into the transmitter start circuit by way of conductors 17-12 as previously stated. Magnet 17-20 corresponds to magnet 22-01 or magnet 23-17 of the Bacon et al. application. The distributor operates to transmit a code combination over outgoing channel 1-03 of the party line. It may be stated at this point without actually tracing the circuits that no connections are as yet established to conductors 17-12 in the transmitter start circuit to apply any potentials thereto representing a marking element of the code combination, so that the five elements of the code combination transmitted will be of spacing nature and the code combination thus transmitted is the one customarily designated as "blank." As the distributor rotates to transmit the blank code combination its cam-operated auxiliary contacts 17-25, corresponding to contacts 22-26 of the transmitter-distributor associated with the incoming line circuit and to contacts 22-05 in the Bacon et al. application, close and extend a ground connection from the outgoing line circuit over conductor 17-21, front contact and armature 9 of relay 17ST, conductor 17-22, armature and back contact of relay 10S5, armature 9 and back contact of relay 10S4, armature 7 and back contact of relay 10S3, armature 5 and back contact of relay 10S2, armature 5 and front contact of relay 10S1 and winding of relay 10S1A to battery and this relay operates, locking in a path traced through its armature 2 and front contact, conductors 10-32 and 10-33, and armature 1 and front contact of relay 17ST to ground.

Relay 10S1A, being operated, interrupts at its armature 1 and back contact the previously traced energizing circuit for the distributor clutch release magnet of the transmitter-distributor in the outgoing line circuit, described as being connected to conductor 17-19, and the magnet is thus released so that the distributor will be stopped after a single revolution during which it transmits the blank code combination. Before the distributor comes to rest its auxiliary contacts 17-25 open. At the end of the 500-millisecond interval that is being timed by vacuum tube 11-06, relay 11T again operates and completes the circuit of relay 10S2 in a path traced from battery through the winding of that relay, break contacts controlled by its armature 3, armature 3 and front contact of relay 10S1A and conductors 10-34, 10-18, 10-17, 11-17, 11-16 and the armature and front contact of relay 11T to ground. Relay 10S2 locks through its front contact and armature 3, conductors 10-36 and 16-17, and armature 2 and front contact of relay 17ST to battery. At its armature 2 the relay 10S2 connects ground to conductor 10-12 which is included in a path previously traced to the grid of tube 11-06 and the left-hand terminal of condenser 11-08, thus discharging the condenser, cutting off tube 11-06 and releasing relay 11T. At its armature 1 the relay 10S2 disconects resistor 10-29 from the charging circuit of condenser 11-08. At its armature 4 and front contact it sets up the code combination for "space" on the contacts of the distributor in the outgoing line circuit. That code combination has the first, second, fourth and fifth elements of spacing nature and the third element of marking nature. As previously stated, the group of five conductors 17-12, are connected in the outgoing line circuit to the transmitting contacts of the transmitter that the transmitter start circuit has seized for the purpose of transmitting the transmitter start signals. The middle one of these conductors is the one associated with the third element of the code combination and a connection is established from it over conductor 16-18 which begins in the upper right-hand corner of Fig. 16 and extends into Fig. 10, in which the path continues over conductor 10-37, armature 5 and back contact of relay 10S3, conductor 10-38, front contact and armature 4 of relay 10S2 to conductor 10-39 which extends into outgoing line circuit 17-07 and is there connected to ground and through the normally closed stop or rest contacts of the distributor to one side of outgoing party line channel 1-03, the other side of which terminates in battery. When the distributor clutch release magnet is energized to initiate the operation of the distributor, and the normally closed rest contacts have opened, only the middle one of the five code element distributor contacts, upon engaging the common bus, will provide a marking or closed and conductive condition of channel 1-03, so that only the third element of the five code elements will be of marking nature. At its armature 5, the relay 10S2 disconnects the winding of relay 10S1A from the distributor auxiliary contact path comprising conductors 17-22 and 17-21, and extends the path through the associated front contact to the winding of relay 10S2A. At its armature 6 and front contact the relay 10S2 completes the energizing circuit for the distributor clutch release magnet, the path being traced from ground through the armature 6 and front contact of relay 10S1, armature 1 and front contact of relay 10S1A, front contact and armature 6 of relay 10S2, upper armature and back contact of relay 10S2A, back contact and armature 1 of relay 10SNB, conductor 10-31 and armature 3 and front contact of relay 17ST to conductor 17-19 which terminates in the outgoing line circuit at the winding of a distributor clutch release magnet 17-20. With this magnet energized, the distributor transmits the "space" signal coded on conductors 17-12. The distributor auxiliary contacts 17-25 close incident to the operation of the distributor and complete the circuit of relay 10S2A which locks through its lower armature and front contact, conductor 10-41, armature 4 and back contact of relay 16ES, conductor 16-19, winding of relay 10S3, conductors 10-36 and 16-17 and armature 2 and front contact of relay 17ST to ground. Relay 10S3 does not operate immediately because it has ground connected to both terminals of its winding. At its upper armature the relay 10S2A interrupts an energizing circuit for the distributor clutch release magnet 17–20 and this magnet releases in preparation for arresting the distributor at the end of one cycle. Before the distributor completes the cycle, it disconnects the ground over which relay 10S2A was operated, thereby permitting relay 10S3 to operate in the locking circuit for relay 10S2A.

The relay 10S3, at its armature 6 and front contact connects conductor 10–39, which has previously been traced to ground in the outgoing line circuit, over conductor 10–42, back contact and armature 3 of relay 16SW, conductor 16–21 to the contactor associated with contact bank 4 of stepping switch 9SE. At its armature 3 it connects the same conductor 10–39 through the front contact associated with that armature, conductor 10–43 to the contactor associated with contact bank 3 of stepping switch 9SE. A connection is also established by relay 10S3 from conductor 10–39 through its front contact and armature 2 and conductor 10–44 to the contactor associated with contact bank 2 of stepping switch 9SE. The purpose of these connections is to set up a code combination on the contacts of the outgoing line distributor, this being the priority start code for one of the transmitters associated with the party line. Assuming that the contactors of this stepping switch are in the positions shown, a path will be traced from conductor 10–44 over conductor 9–11 to one of the distributor conductors 17–12, namely conductor 17–12a. A path is extended from conductor 10–43 to conductor 9–12 which is connected to another of the distributor conductors 17–12, namely, conductor 17–12b. A path is extended over conductor 16–21 to conductor 9–13 which is connected to conductor 17–12c. Conductors 17–12a, 17–12b and 17–12c represent elements 1, 2 and 3 of the code combinations and with paths extended to these conductors, as above described, the code combination set up on the distributor contacts will have elements 1, 2 and 3 of marking nature and elements 4 and 5 of spacing nature and this is the code combination for the letter U which is the priority start code for transmitter 1–12 of station 1–06.

At its armature 5, the relay 10S3 interrupts the previously traced path from conductor 10–39 to conductor 17–12c which included the armature 4 and front contact of relay 10S2 and conductors 10–37 and 16–18, and which was used for setting up the "space" code combination on the distributor contacts. At its armature 7 and front contact the relay 10S3 connects the lower winding of relay 10S3A through the previously traced path extending to the distributor auxiliary contacts 17–25, thereby disconnecting the winding of relay 10S2A from that path. At its armature 4 and front contact the relay 10S3 connects ground to the energizing circuit for the distributor clutch release magnet 17–20. The distributor begins the transmission of the code combination for the character code U set up on its contacts. When the distributor auxiliary contacts 17–25 close they complete the circuit of relay 10S3A which locks in a path through its upper winding, front contact and armature 4, conductor 10–46, back contact and armature 2 of relay 10SNB and conductors 10–47 and 16–14 to ground at the armature 10 and front contact of relay 17ST. Relay 10S3A interrupts the energizing circuit for the distributor clutch release magnet which arrests the distributor at the end of one cycle.

At its armature 6 and front contact relay 10S3A connects resistor 17–23 in parallel with resistor 11–11, the path being traced from the upper terminal of resistor 11–11, which is the one connected to the grid of tube 11–06, over conductors 11–14, 11–18 and 11–19, resistor 17–23, back contact and armature 7 of relay 17BS, conductor 17–24, armature 6 and front contact of relay 10S3A, back contact and armature 1 of relay 10S4 and conductors 10–08, 10–09 and 11–13, to the lower terminal of resistor 11–11. At its armature 5 and back contact relay 10S3A interrupts a path from ground to the left-hand terminal of condenser 11–08, the path being traced from armature 2 and front contact of relay 10S2, conductor 10–12, armature 5 and back contact of relay 10S3A, conductors 10–13 and 10–14, armature 2 and back contact of relay 10S5A, conductor 10–16, back contact and armature 2 of relay 11HD and in parallel therewith, back contact and armature 1 of relay 11HDT and conductor 11–14 to the condenser. This enables the condenser to charge, and with resistor 17–23 connected in parallel with resistor 11–11, an interval of 5 seconds is required to render tube 11T conductive. This interval provides time for the station control circuits associated with the party line to respond to the signal U transmitted for starting transmitter 1–12 at station 1–06. At the end of the 5-second interval tube 11–06 becomes conductive and operates relay 11T which connects ground to conductor 11–16. Only under the circumstance that there is a trouble on one or the other of the channels of the party line, or in apparatus associated therewith, will the 5-second interval expire before a response is received from a party line, either as an acknowledgment indicating that the called transmitter has not been conditioned to transmit, or as transmission from a message tape at that station. It will be assumed that there is no trouble condition on the line, and attention will be turned to the station control circuits and to the response thereof to the transmitter start signal during the timing of the 5-second interval.

*Station control circuits respond to transmitter start signals*

Signals transmitted over outgoing party line channel, beginning with the blank code combination, which is the first signal of the transmitter start pattern, operate line relays 8–01, 7–01 and 6–01 at secondary switching centers 1–15, 1–14 and 1–13, respectively. Referring particularly to Fig. 6, the armature of line relay 6–01, which engages the marking contact having battery connected to it, is connected through the lower or operating winding of repeating relay 6–02 to battery so that no current flows in the operating winding of the latter relay. Current in the biasing winding of relay 6–02 holds the armature in engagement with its marking contact. The armature is connected to ground and the marking contact is connected through the selector magnet 6–03 of monitoring selector 6–04 to battery. The selector magnet is thereby held energized. When line relay 6–01 responds to the start pulse of the blank signal, or of any other code combination, the start pulse being of spacing nature, the armature of the relay engages its grounded spacing contact, thereby energizing the operating winding of repeating relay 6–02 and driving its armature to spacing. The control of repeating relay 6–02 by line relay 6–01 is of a type ordinarily called inverse neutral, in that there is no current in the operating winding of repeating relay 6–02 for its marking condition and the relay is positively driven to spacing by current through its operating winding in response to a spacing pulse. When repeating relay 6–02 operates to spacing it interrupts the energizing circuit of selector magnet 6–02 and in this way repeats the signals received by line relay 6–01 to the selector magnet.

As is described in detail in the specification of the hereinbefore identified Bacon et al. application, and in greater detail in Patent 2,543,174, granted February 27, 1951 to G. G. Keyes et al., which also contains reference, for the purpose of amplifying the disclosure of that patent, to Patent 2,568,264, granted September 18, 1951 to W. J. Zenner, the selector magnet of the monitoring selector unit controls the setting, in their marking or spacing positions, of selector or code members corresponding in number to the significant or selecting impulses of telegraph code combinations, and these in turn control the selection of individual selectable elements assigned to be selected in response to the code combinations. Some of the selectable elements of the monitoring selector unit operate contacts and certain of the contacts are shown in Figs. 6 to 9. Thus each has contacts identified as Blank-Pause, these contacts being designated by the reference numerals 6–06, 7–06 and 8–06. Each has Deactivate contacts, designated by the reference numerals 6–07, 7–07 and 8–07, respectively, each has Universal contacts, designated by the reference numerals 6–08, 7–08 and 8–08, respectively, and each has Space contacts designated 6–09, 7–09 and 8–09. In addition, each monitoring selector unit includes priority and non-priority transmitter start contacts, responsive to individual start codes and designated by the letter characters corresponding to those codes, and code contacts for selecting the subscriber stations to receive messages transmitted over channel 1–03 from the switching center.

Typical circuits external to the monitoring selector unit and controlled thereby will be described with reference to Figs. 6, 12 and 18. As is fully described in the Bacon et al. application, the monitoring selector unit includes a mechanical timing arrangement including a shaft driven through a friction clutch, cams carried by the shaft, and cooperating latches, levers and contacts for causing a particular selective operation to occur only if a predetermined interval or pause occurs between transmissions of two code signal combinations that are involved in the selection of that operation. It is further disclosed that the mechanical timer is tripped off for a timing cycle of operation by a selectable member which responds to the blank code combination in each of the monitoring selector units. The contacts 6–06 are under the control of the timing mechanism and are operated early in the 500-millisecond timing interval which follows the blank code signal. Contacts 6–06 connect ground over conductor 6–11 to operate relay 12BP. At its armature 2 and back contact the relay 12BP interrupts a path traced from the armature of line relay 6–01 through break contacts of manual cut-on key 6–12, conductor 6–13, back contact and armature 2 of relay 12BP, conductor 12–02 to back contacts, hereinafter to be identified, of relays 6LF and 6CK and front contacts of relays 6S1 and 6S2. These are transmission paths over which signals are transmitted from line relay 6–01 to the teletypewriter recorders of the subscriber stations when those recorders have been selected for a response to a message. The purpose in interrupting these paths at the back contact and armature 2 of relay 12BP is to prevent those recorders from responding to the transmitter start signals. It has been assumed that there has been no outgoing message transmission on channel 1–03 so that the relays 6LF, 6CK, 6S1 and 6S2 are in the condition shown in the drawings and the interruption of the transmission path is of no significance. Relay 12BP interrupts, at its break contacts controlled by its armature 5, the circuit over which relay 12T2 was operated but it establishes in make-before-break manner a locking circuit for relay 12T2 traced from ground through the armature 1 and front contact of the latter relay, armature 5 and front contact of relay 12BP and winding of relay 12T2 to battery. Similarly, at its armature 1 it interrupts the energizing circuit for relay 12T1, providing a locking circuit for that relay if it is at this time operated. At its armature 4 and back contact the relay 12BP interrupts a short circuit across contacts 6–14, the path being traced from the left-hand contact of that pair over conductor 6–16 and conductors 12–03, 12–04 and 12–06 to the back contact associated with armature 4 of relay 12BP, and the path from the right-hand contact being traced over conductor 6–17 and conductor 12–07 to the armature 4 of relay 12BP. The contacts 6–14 are employed in sending the acknowledgment signal when the transmitter has no message material to transmit, as will be described.

At about the end of the 500-millisecond interval, the timing mechanism mechanically unblocks a normally blocked selectable member that is responsive to the space signal combination to operate contacts 6–09. When the space signal is received at the end of the 500-millisecond interval the contacts 6–09 close, extending ground over conductor 6–18 to operate relay 12SP. At its upper armature this relay interrupts the circuit of relay 12SPA which has a slow-release characteristic. At its lower armature the relay 12SPA interrupts the locking circuit of relays 12M1A and 12M2A if either of those relays has been operated as a result of previous transmission. It has been assumed that the system is being set in operation at the beginning of a business day so that neither of the relays 12M1A and 12M2A is operated. The operating member for the Space signal latches operated, and also latches operated the member that operated the Blank-Pause contacts.

Following the spacing signal a code combination for the character U is received, this being the priority start code for transmitter 1–12. Monitoring selector unit 6–04 responds to this signal by momentarily closing contacts 6–19. These contacts extend ground over conductors 6–21 and 6–22 to armature 4 of relay 12T1. Since this relay is not operated because it has been assumed that no message tape has been placed in transmitter 1–12, no relay circuit is completed as a result of the closure of contacts 6–19. Accordingly, the acknowledgement signal should be transmitted to the switching center. Incident to reception of the code combination for operating contacts 6–19, a mechanism shown in Figs. 25 and 27 fully described hereinafter, and comprising a cam power-driven through a clutch, for opening and closing contacts 6–14 in accordance with the code elements of the signal for the character H, is set in operation by the tripping of the clutch. The cam executes one revolution and in so doing generates the H signal by its control of contacts 6–14. As previously stated, the relay 12BP, upon operating, interrupts a short circuit across contacts 6–14. In the upper right-hand corner of Fig. 18 the two conductors of transmitting channel 1–02 have been individually identified by letters 1–02a and 1–02b, and conductor 1–02a is traced into Fig. 12, from which a path is extended over conductor 6–16 through contacts 6–14, conductors 6–17, 12–08, 12–09, 12–11, the rest segments of the distributor 1808 of transmitter 1–51, conductors 18–09, 18–11 and the rest segments of the distributor 18–12 of transmitter 1–12 and conductor 18–13, to transmitting channel conductor 1–02b. Contacts 6–14 are thus connected into the transmitting channel in series with the distributor faces of the transmitters at stations 1–06 and 1–07, and the opening of contacts 6–14 for the spacing elements of the code for the character H will result in the opening of the transmission channel 1–02 because the shunt around contacts 6–14, traced from the junction of conductors 6–17 and 12–08, over conductor 12–07 to the armature 4 of relay 12BP, is open because that relay is operated, the remainder of the path being traced from the associated back contact over conductors 12–06, 12–04 and 12–03 to the junction conductors 6–16 and 1–02a.

The H signal thus transmitted to the switching center is received by receiving relay 21L of the incoming line circuit. The operating winding of repeating relay 21SP is connected to the armature of receiving relay 21L so that, in response to the start pulse of that code combination, the armature of relay 21SP operates to spacing and connects ground through its spacing contact and conductor 21–01 to the winding of relay 21A1 which operates. Relay 21SP locks through its lower winding, back contact and armature 1 of relay 21HH, break contacts controlled by the lower armature of relay 21T, and conductor 21–10 to the spacing contact of relay 21SP. At its outer lower armature, relay 21A1 connects ground over conductor 21–02, conductor 21–03, break contacts controlled by armature 2 of relay 21HH and winding of relay 21T to battery and this relay operates. It locks to the ground on its lower armature through the front contact and conductors 21–05 and 21–03. At its upper armature relay 21T connects ground over conductor 21–04 and conductor 17–26 to the winding of relay 17BS. This relay operates and locks in a path through its front contact and armature 5, conductor 17–28, armature 1 and back contact of relay 11TSA, conductor 11–21 and armature 1 and front contact of relay 10S3 to ground. At its armature 7 and front contact relay 17BS connects resistor 17–27 in parallel with resistor 11–11, the path being traced from the upper terminal of resistor 11–11 over conductors 11–14, 11–18, 11–19, resistor 17–27, front contact and armature 7 of relay 7BS, conductor 17–24, armature 6 and front contact of relay 10S3A which was previously described as having been operated and locked, back contact and armature 1 of relay 10S4 and conductors 10–08, 10–09 and 11–31 to the lower terminal of resistor 11–11. Resistor 17–23 was connected in parallel with resistor 11–11 to initiate the timing of an interval of 5 seconds beginning with the transmission of the transmitter start signal U. The substitution of resistor 17–27 for resistor 17–23 reduces the timing interval from 5 seconds to 300 milliseconds.

Following the operation and locking of relay 17BS in response to the start element of the H signal, the significant elements of the code are received and repeated, together with the start element, by relay 21L over conductor 21–06, resistor 21–07, conductor 21–08, break contacts 4 and 5 of relay 21AZ1, conductors 21–08 and 21–09 and winding of selector magnet 22–01 of reperforator 22–02 of the incoming line circuit. Relay 21SP follows these code elements because its locking circuit was interrupted by relay 21T. Contacts 22–03 of the reperforator operate in response to the received signal for the character H and connect ground over conductor 22–04, armature 1 and back contact of relay 21A, conductors 21–11 and 21–12, armature 1 and back contact of relay 21FH, conductor 21–13, back contact and lower armature of relay 21DA, upper winding of relay 21HH, resistor 21–14, conductors 21–16 and 21–17 and upper winding of relay 21UN to battery. Universal contacts 22–06 of reperforator 22–02 also close momentarily, incident to response of the reperforator to the H signal, and connect ground over conductor 22–07, back contact and armature 1 of relay 21AZ2 and lower winding of relay 21UN to ground. The current through the lower winding of relay 21UN tends to operate the armature of that relay to its right-hand contact, but the current through the upper winding in series with the upper winding of relay 21HH predominates and holds the armature of relay 21UN in engagement with its left-hand contact, relay 21HH operating by virtue of the current through its upper winding. This relay locks in a circuit traced from battery through its lower winding, armature 2 and front contact, conductors 21–03 and 21–02 and the front contact, and the outer lower armature of relay 21A1 to ground.

Relay 21HH interrupts, at the back contact controlled by armature 2, the energizing circuit for relay 21T, which releases and interrupts the circuit that it had completed for relay 17BS. The latter relay remains energized through its locking circuit. Relay 21HH also operates relay 17NB over a circuit traced from battery through the winding of relay 17NB, front contact and armature 6 of relay 17ST, back contact and armature 6 of relay 17BSA, front contact and armature 4 of relay 17BS, conductors 17–29, 21–18, and then in common with the locking circuit for the lower winding of relay 21HH, comprising the armature 2 and front contact of relay 21HH, conductors 21–03, 21–02, front contact and outer lower armature of relay 21A1 to ground. Relay 17NB locks in a circuit traced from its winding through the front contact and armature 4, conductor 17–21, and back contact and armature 8 of relay 10SNB to ground.

Contacts 22–03 of the reperforator are closed only momentarily and return to their normal open condition. Since no more signals follow the H signal, relay 21SP returns to marking and remains in that condition. This permits relay 21A1 to release after the delay interval due to its slow-release characteristic. Relay 21A1 interrupts, at its outer lower armature, the locking circuit for relay 21HH which releases.

Relay 17NB completes an energizing circuit for relay 15SE, the circuit being traced from ground through the front contact and armature 6 of relay 17NB, conductor 15–02 and the upper winding of relay 15SE to battery. Relay 17NB also completes an energizing circuit for stepping magnet 15–03 independently of the armature of relay 15SE, the circuit being traced from battery through the winding of stepping magnet 15–03, conductor 15–09 and armature 7 and front contact of relay 17NB to ground. Relay 17NB completes the energizing circuit for relay 11TSA, traced from battery through the winding of that relay, conductor 11–22 and front contact and armature 5 of relay 17NB to battery. Relay 11TSA locks through its front contact and armature 2, conductors 11–23 and 17–32 and front contact and armature 6 of relay 17BS to ground. Relay 11TSA interrupts, at its armature 1 and back contact, the locking circuit for relay 17BS. The original energizing circuit for relay 17BS was interrupted at the upper armature and front contact of relay 21T when that relay was released by relay 21HH, as previously described. Accordingly, the relay 17BS releases and interrupts the locking circuit for relay 11TSA. Relay 11TSA does not release at this time, but remains energized over its energizing circuit including armature 5 and the front contact of relay 17NB. A further operation performed by relay 17NB is the grounding of the grid of tube 11–06 and the discharging of condenser 11–08. The path over which the condenser is discharged is traced from ground through the front contact and armature 1 of relay 17NB, conductors 17–33, 10–14, armature 2 and back contact of relay 10S5A, conductor 10–16, back contact and armature 2 of relay 11HD and conductor 11–14 to the condenser.

Relay 15SE, operated under the control of relay 17NB, completes the operating circuit of relay 10SNA by extending a ground connection over conductors 16–06 and 10–21, as previously described. Relay 10SNA operates relay 10SNB which locks over a circuit also previously traced. Relay 10SNB interrupts, at its armature 7 and back contact, the energizing circuit for relay 10S1 which releases. It also interrupts, at its back contact and armature 2, the locking circuit for relay 10S3A and that relay releases. Relay 10SNB interrupts, at its armature 8 and back contact, the locking circuit for relay 17NB, which releases. Relay 17NB interrupts the energizing circuit for relay 11TSA, which also releases. Relay 10SNB completes a previously traced path from ground through its front contact and armature 6, conductor 15–06 and armature 2 and front contact of relay 15SE to the winding of stepping magnet 15–03, thereby placing the release of stepping magnet 15–03 under the control of relay 15SE. With relay 17NB released, the direct energizing circuit for stepping magnet 15–03 is interrupted, and the energizing circuit for the upper winding of relay 15SE is interrupted and this relay releases, in turn releasing stepping magnet 15–03 to cause the advancement of the contactors of stepping switch 9SE to the next contact, which is the second contact of the first set of connections to the several contact banks. With the contactors in the second position, a path will be traced from conductor 10–44 over conductor 9–11 to distributor-conductor 17–12a. A path is extended from conductor 10–43, over conductor 9–13 to distributor-conductor 17–12c. A path is extended over conductor 16–21 to conductor 9–14, which is connected to conductor 17–12d. Conductors 17–12a, 17–12c and 17–12d represent elements 1, 3 and 4 of the code combinations, and with paths extended to these conductors, as above described, the code combination set up on the distributor contacts will have elements 1, 3 and 4 of marking nature and elements 2 and 5 of spacing nature, and this is the code combination for the letter "F" which is the priority start code for transmitter 1–51 at station 1–07.

With relay 15SE released, as previously described, the energizing circuit for relay 10SNA is interrupted and this relay releases after a short delay interval which results from its slow-release characteristic. Relay 10SNA interrupts the energizing circuit for relay 10SNB, which also releases. Relay 10SNB reestablishes the energizing circuit for relay 10S1, the circuit being traced from battery through the winding of that relay, conductors 10–26 and 10–27, armature 7 and back contact of relay 10SNB, conductor 10–28, armature 4 and front contact of relay 16CSS, conductor 16–14 and armature 10 and front contact of relay 17ST to ground.

Relay 10S1 again connects ground over a path previously traced, including conductor 17–19, extending to the outgoing line circuit 17–7 to energize the distributor clutch release magnet 17–20 of the transmitter distributor. In the cycle initiated by this operation the distributor transmits the code combination for the letter "F." Shortly after the distributor begins its cycle the distributor auxiliary contacts 17–25 close and complete the circuit of relay 10S3A, as previously described in connection with the transmission of the code for the letter U, the relay locking as before. This relay again connects resistor 17–23 in parallel with resistor 11–1 and disconnects ground from the grid of tube 11–06 to initiate the 5-second timing operation. Relay 10S3A also interrupts the energizing circuit for the distributor clutch release magnet 17–20 which releases and arrests the distributor at the end of the cycle. Before the distributor comes to rest the distributor auxiliary contacts 17–25 open, interrupting the energizing circuit for relay 10S3A, but it remains operated over its locking circuit.

*Station control circuits respond to second priority start signal*

Monitoring selector units 6–04, 7–04 and 8–04 respond to the code for the letter F, but only the monitoring selector unit 6–04 has transmitter start contacts responsive to that signal, these being the contacts 6–23 which close and connect ground supplied through the Blank-Pause contacts 6–06, which have remained closed, and through contacts 6–23, conductors 6–24 and 6–26, armature 4 and front contact of relay 12T2, armature 1 and front contact of relay 12P2, winding of relay 12M2 and back contact of armature 3 of relay 12EM to battery and the relay 12M2 operates. Contacts 6–23 are closed only momentarily, but relay 12M2 locks in a path traced through its front contact and armature 4, front contact and armature 4 of relay 12P2 and in parallel therewith, armature 6 and front contact of relay 12T2, conductors 12–13 and 12–14, break contacts controlled by the upper armature of relay 12SPA to ground, this relay having been released upon operation of relay 12SP in response to the space code combination as previously described. At its armature 1 and front contact, relay 12M2 completes the circuit of relay 12M2A which performs operations that will be described later. Relay 12M2 establishes a shunt around the acknowledgment signal transmitting contacts 6–14, the path being traced from the left-hand spring of those contacts over conductor 6–16, front contact and armature 4 of relay 12M2, conductors 12–09, 12–08 and 6–17 to the right-hand spring of contacts 6–14. Thus, although the clutch for driving the cam which operates contacts 6–14 is tripped incident to the reception of the code combination for the character "F," the acknowledgment signal will not be impressed on transmission channel 1–02. Relay 12M2 also completes the circuit for distributor clutch magnet 18–04 of transmitter 1–51, the circuit being traced from ground through the winding of that magnet, conductor 18–14, armature 2 and front contact of relay 12M2, front contact and armature 2 of relay 12T2 to battery. Transmitter 1–51 thus is set in operation to transmit the message addressed to station 1–09.

*Response of switching center to incoming transmission*

As hereinbefore stated, the message transmitted from a station of the party line is preferably preceded by a plurality of letters signals. As previously described in connection with the response of the incoming line circuit to the acknowledgment signal, the code combination for the character H, the receiving relay 21L operates to spacing in response to the start pulse, repeats the start pulse to the selector magnet 22–01 of reperforator 22–02 and operates relay 21SP to spacing, that relay locking in the spacing condition through its lower winding. Relay 21SP opens the operating circuit for relay 21A5 which has a slow release characteristic and remains operated. In its spacing condition relay 21SP completes the circuit of relay 21A1 which operates. Relay 21A1 operates relay 21T and this relay connects ground over conductor 21–04 and conductor 17–26 to the winding of relay 17BS. Relay 17BS operates, and locks over the path previously traced. Relay 21T interrupts, at the break contact controlled by its lower armature, the locking circuit for the lower winding of relay 21SP, thereby enabling that relay to follow signals received by relay 21L. Relay 21T also closes, at the make contacts controlled by its upper armature, the filament circuit for electron discharge tube 21–19, but the relay 21A, at its upper armature and front contact, grounds the grid of the tube thereby discharging condenser 21–21 and preventing tube 21–19 from being activated.

In response to the first marking impulse in the letters signal the receiving relay 21L operates to marking, and repeats the signal to relay 21SP and to reperforator selector magnet 22–01, the relay and the selector magnet thereafter responding to the pulses of the code combination. In the marking condition relay 21SP reestablishes the energizing circuit for slow release relay 21A5 thus holding that relay operated. It opens the energizing circuit for relay 21A1 which holds operated because of its slow release characteristic. Relay 21HH does not become operated as it did in the case of the reception of the H signal, because the signal now being received is a letters signal. The incoming line circuit thus does not call upon the transmitter start circuit to transmit another transmitter start signal because message transmission from a party line station has been started.

It was previously stated that relay 17BS operates under the control of relay 21T and locks. Relay 17BS connects resistor 17–27 in parallel with resistor 11–11 and initiates a 300-millisecond timing operation of tube 11–06. When the timing circuit has timed out, relay 11T is operated by tube 11–06 and completes an energizing circuit for relay 17BSA traced from battery through the winding of that relay, back contact and armature 8 of relay 17NB, front contact and armature 2 of relay 17BS, conductor 17–34, armature 7 and front contact of relay 10S3A, back contact and armature 6 of relay 10S4 and conductors 11–17 and 11–16 to the armature of relay 11T which engages its grounded front contact. Relay 17BSA locks in a circuit traced through its front contact and armature 5, conductor 17–32 and the front contact and armature 6 of relay 17BS to ground.

Relay 17BSA completes an energizing circuit for relay 15PF, the circuit being traced from battery through the winding of that relay, break contacts controlled by the stepping magnet 15–11 of stepping switch 9PF, conductor 15–12, back contact and armature 4 or relay 16SW, conductor 16–22, armature 4 and front contact of relay 17BSA and front contact and armature 12 of relay 17ST to ground. At its single front contact the relay 15PF energizes stepping magnet 15–11 which operates its stepping pawl in preparation for advancement of the conductors of stepping switch 9PF on the backstroke, when stepping magnet 15–11 is released, and upon being energized the stepping magnet interrupts the energizing circuit of relay 15PF which releases. This permits the stepping magnet 15-11 to release, thereby advancing the contactors of stepping switch 9PF one step and reestablishing the energizing circuit for relay 15PF. Since the relay 15PF again operates stepping magnet 15-11 which in turn releases relay 15PF, the contactors of stepping switch 9PF are subject to advancement under the mutually interruptive and restorative circuit control of relay 15PF and stepping magnet 15-11 until an external condition intervenes. A path is traced from the battery terminal of the winding of relay 15PF, which is the right-hand terminal, over conductor 15-13, armature 3 and front contact of relay 17BSA, conductor 17-36, the conductor 15-08 to the contactor associated with the sixth contact bank of stepping switch 9PF. As in the case of stepping switch 9RF, only the first, fifth and sixth contact banks are used. There are duplicate sets of ten connections from the contacts of contact bank 6 of stepping switch 9PF to corresponding contacts of contact bank 6 of stepping switch 9RF and of contact bank 6 of stepping switch 9SE. It has been assumed that stepping switch 9SE has advanced one step and, accordingly, when stepping switch 9PF has advanced one step, the path traced to the sixth contactor of stepping switch 9PF will be extended through corresponding contacts of the sixth contact banks of stepping switches 9PF and 9SE and from the contactor associated with the sixth contact bank of switch 9SE over conductor 17-17, armature 3 and back contact relay 17SCS, conductor 17-37 and front contact and armature 12 of relay 17ST to ground. It follows from this that, upon the first release of stepping magnet 15-11 and consequent advancement of the contactors of stepping switch 9PF, a path to ground shunting the winding of relay 15PF is established so that that relay does not reoperate upon the reclosure of the break contacts of stepping magnet 15-11. Thus, the contactors of stepping switch 9PF will be advanced under the cooperative control of relay 15PF and stepping magnet 15-11 only until the contactors have been advanced to a position corresponding to that of the contactors of stepping switch 9SE.

Relay 17BSA also completes the circuit of relay 10S4, the path being traced from ground through the front contact and armature 2 of relay 17ST, conductors 16-17, 10-36 and 10-48, winding of relay 10S4, conductors 10-49 and 10-51, armature 2 and front contact of relay 10S3A, conductor 10-52 and armature 2 and front contact of relay 17BSA to battery through resistor 17-53. Relay 10S4 connects ground through its front contact and armature 8, armature 2 and back contact of relay 10S5A, conductor 10-16, back contact and armature 2 of relay 11HD and conductor 11-14 to condenser 11-08 and the grid of tube 11-07 to cut off tube 11T and discharge the condenser. Relay 10S4 also connects conductor 10-39, which is connected to the ground termination for outgoing transmission channel 1-03 in the outgoing line circuit 17-07, through the front contacts and armatures 2, 3, 4, 5 and 7 of relay 10S4, and conductors 16-18, 10-53, 10-54, 10-56 and 10-57 respectively to the group of five conductors 17-12 which extend to the distributor contacts of the outgoing line transmitter, the effect of this being to set up the letters signal comprising a marking condition of each of the five significant elements of the code combination. At its front contact and armature 11, the relay 10S4 connects ground through the armature 1 and back contact of relay 10S5A, conductors 10-58 and 10-31, armature 3 and front contact of relay 17ST to conductor 17-19 which is the distributor clutch magnet control path so that the distributor in the outgoing line circuit is set in operation to transmit the letters signal set up on the distributor contacts. During the rotation of the distributor, the distributor auxiliary contacts 17-25 close to complete the circuit of relay 10S4A, the circuit being traced from battery through the winding of that relay, front contact and armature 10 of relay 10S4, back contact and armature of relay 10S5, conductor 17-22, armature 9 and front contact of relay 17ST and conductor 17-21 to ground through the distributor auxiliary contacts.

Relay 10S4A extends the same ground connection through its armature and front contact and the winding of relay 10S5 to conductor 10-48 which is supplying ground to hold relay 10S4 operated. Relay 10S5 thus has ground on both terminals of its winding and remains unoperated until the distributor auxiliary contacts 17-25 open and disconnect ground from the armature of relay 10S4A, at which time that relay locks through its armature and front contact and the winding of relay 10S5, the latter relay operating. Neither the relay 10S4A nor 10S5 disturbs the energizing circuit for the distributor clutch magnet completed at the front contact and armature 11 of relay 10S4 and the distributor is not arrested at the end of one cycle, but enters upon a second cycle in which it repeats the transmission of the letters signal.

During the rotation of the distributor, the distributor auxiliary contacts 17-25 close and extend ground over conductors 17-21 and 17-22, and over the armature and front contact of relay 10S5 to the winding of relay 10S5A which operates and locks through its armature 4 and front contact and over conductor 10-33 to ground through armature 1 and front contact of relay 17ST. Relay 10S5A interrupts, at its armature 1, the energizing circuit for the distributor clutch magnet 17-20, which releases and arrests the distributor at the end of transmission of the second letters signal. Before the distributor is arrested the distributor auxiliary contacts 17-25 open.

Relay 10S5A, operated, changes the timing constants of the charging circuit for condenser 11-08 by establishing a path from the lower terminal of resistor 11-11 over conductors 11-13, 10-09 and 10-59, armature 5 and front contact of relay 10S5A, conductor 10-61, resistor 16-23 and in parallel therewith through armature 1 and back contact of relay 16ESA and resistor 16-24, conductors 16-26, 10-03 and 11-07 to the upper terminal of resistor 11-11. With resistors 16-23 and 16-24 connected in parallel with resistor 11-11, the tube 11-06 requires an interval of 340 milliseconds to become conductive.

At the end of that interval relay 11T operates and connects ground over conductors 11-16, 11-17 and 10-17, armature 3 and front contact of relay 10S5A, conductor 10-62 and the winding of relay 11TA to battery and this relay operates. It completes the energizing circuit for relay 11RLS, the path being traced from battery through the winding of that relay, the front contact and armature of relay 11TA, conductors 11-24, 10-63 and 16-27, front contact and armature 8 of relay 17BSA, conductor 17-38, armature 7 and back contact of relay 16SW, conductor 16-28, the contactor associated with the fifth contact bank of stepping switch 9PF and the corresponding contact associated with the fifth contact bank of stepping switch 9SE, these two switches now being in corresponding positions, conductor 11-03, back contact and armature 2 of relay 11HDT, conductors 11-02 and 17-06 and armature 1 and the front contact of relay 17BS to ground, the latter relay being operated at this time, so that relay 11RLS operates. At its inner armature, the relay 11RLS connects ground over conductors 11-26, 11-18 and 11-14 to discharge condenser 11-08 and thereby release relay 11T by cutting off tube 11-06. At its outer armature, the relay 11RS interrupts the locking circuit for relay 17ST. This releases all of the relays of the transmitter start circuit thus far described as having been operated and not described as having been released, with the exception of relays 17BS and 17BSA which are held under the control of the incoming line circuit in Figs. 21 and 22. Specifically, the relays, which relay 17ST releases, are relays 10S1, 10S1A, 10S2, 10S2A, 10S3, 10S3A, 10S4, 10S4A, 10S5, 10S5A, 11TA, 11RLS and 16CSS.

*Station control circuits respond to letters signal originating in transmitter start circuit*

The letters signals originating in the transmitter start circuit are repeated by the receiving relays 6–01, 7–01 and 8–01 to their respective monitoring selector units 6–04, 7–04 and 8–04. In the monitoring selector unit 6–04 the first letters signal causes the unlocking of the blank-pause contacts 6–06 and the space contacts 6–09 and these contacts release. Similarly, the contacts 7–06 and 7–09 in monitoring selector unit 7–04 and the contacts 8–06 and 8–09 in the monitoring selector unit 8–04 are released. The priority and non-priority transmitter start contact operating selectable members are blocked as a result of reception of the letters signal and release of the blank-pause and space contacts so that the transmitter start contacts shall not be operable in response to signals occurring in the body of a message. Blank-pause contacts 6–06, upon releasing, interrupt the energizing circuit of relay 12BP which releases. This relay reestablishes at its armature 4 and back contact the shunt across acknowledgment signal transmission contacts 6–14 to prevent those contacts from interfering with message transmission to the switching center. At its armature 2 and back contact, the relay 12BP reconnects front contacts of relays 6S1 and 6S2 to the armature of receiving relay 6–01 to reconnect in receiving relation to relay 6–01 teletypewriters that may have been receiving a message prior to transmission of the transmitter start signals and that were disconnected to prevent them from responding to those signals. It was initially assumed that there was no such transmission.

With contacts 6–09 released, the relay 12SP releases and reestablishes the circuit of relay 12SPA which operates. Relay 12SPA locks the previously operated relay 12M2A, the circuit being traced through the front contact and armature 2 of that relay to the lower armature of relay 12SPA.

The station control circuit remains in the condition it has attained at this point, with relays 12T2, 12P2, 12M2 and 12M2A operated and distributor clutch release magnet 18–04 operated.

*End of transmission of priority message*

It will be assumed that the complete message for station 1–09 has been transmitted to the switching center before completion of the handling of the message at the switching center, involving seizure, under the control of the address code CD, of one of the reperforators associated with outgoing line circuit 17–07, transmission of the message cross-office to the seized reperforator and retransmission of the message preceded by the address code CD over the outgoing channel 1–03 of the multistation line.

Transmitter 1–51 at station 1–07 proceeds with the transmission of the message addressed to station 1–09 and completes the message transmission by transmitting the disconnect signal comprising figures, H and letters, followed by the end-of-transmission signal comprising the signals, H and letters. As previously stated, the tape containing the message was severed from the tape in the reperforator, and the distributor 18–08 steps the tape out of the transmitter, permitting tape contacts 18–03 to open. These contacts disconnect ground from conductor 18–07, thereby interrupting the locking circuit of relay 12P2, which included its armature 1 and front contact, and also interrupting the energizing circuit for relay 12T2 which also releases. Relay 12T2 interrupts the energizing circuit of transmitter clutch magnet 18–04 which releases, arresting distributor 18–08. With relays 12T2 and 12P2 released, the locking circuit of relay 12M2 is interrupted and that relay releases, removing one of the shunts around the H transmitting contacts 16–14 in the monitoring selector unit 6–04. Contacts 16–14 remain shunted at the armature 4 and back contact of relay 12BP. In this way the transmitting apparatus at station 1–07 is restored to normal.

*Response of switching center to disconnect and end-of-transmission signals*

In response to the figures code combination, the figures contacts 22–08 close and connect ground over conductor 22–09, back contact and armature 3 of relay 21A, the upper winding of relay 21FG, conductor 21–22, resistor 21–14, conductors 21–16 and 21–17 and upper winding of relay 21UN to negative battery. The energization of the upper winding of relay 21UN in this path holds the armature in that relay in engagement with the left-hand contact, to maintain a locking path for relay 21FG, traced from battery through its lower winding, break contacts associated with armature 2 of relay 21FH, front contact and lower armature of relay 21FG and left-hand contact and armature of relay 21UN to ground. At its outer upper armature the relay 21FG prepares an energizing circuit for relay 21FH. At its inner upper armature it completes an energizing circuit for relay 21DA traced from battery through the winding of that relay, conductors 21–23 and 21–24, back contact and armature 3 of relay 21FH, conductor 21–26, and inner upper armature and front contact of relay 21FG to ground. Relay 21DA interrupts at its lower armature a possible operating circuit for relay 21HH, and at its break contacts controlled by the upper armature a possible energizing path for relay 21A. Before the reperforator 22–02 completes its cycle of operation in response to the figures signal, contacts 22–08 reopen but relay 21FG remains locked.

The next code combination in the disconnect signal is the H code which causes the closure of reperforator contacts 22–03, extending ground over conductor 22–04, armature 1 and back contact of relay 21A, conductor 21–11, outer upper armature and front contact of relay 21FG, upper winding of relay 21FH, and over the path previously traced to the upper winding of relay 21UN and over that winding to battery. At its armature 1 and front contact relay 21FH establishes a shunt across the outer upper armature and front contact of relay 21FG, and locks in a path traced from battery through its lower winding, its front contact and armature 3, conductors 21–26, 21–27, 21–28 and 21–29, front contact and upper armature of relay 21DA, conductors 21–31 and 21–32 and back contact and armature 3 of relay 21HH to ground. At break contacts associated with its armature 2 the relay 21FH interrupts the locking circuit of relay 21FG which releases, relay 21FH remaining operated through the shunt established across the upper armature and front contact of relay 21FG and also through the locking circuit previously traced. At its armature 3 and back contact the relay 21FH interrupts the locking circuit for relay 21DA which releases, thereby interrupting the previously traced locking circuit for relay 21FH. Before the end of the cycle of reperforator 22–02 in response to the H signal, contacts 22–03 reopen, interrupting the holding circuit for relay 21FH which releases.

In response to the letters signal which follows the H signal, contacts 22–11 in reperforator 22–02 close, connecting ground over conductor 22–12, back contact and armature 1 of relay 21AA, conductor 21–33, break contacts controlled by the upper armature of relay 21DA, conductor 21–34, break contacts associated with armature 4 of relay 21AA, conductor 21–36 and conductor 21–17 to the upper winding of relay 21UN, from which the circuit is completed to battery. This causes the armature 1 of relay 21UN to remain in engagement with its left-hand contact, while the circuit of the lower winding is closed through universal contacts 22–06.

The next signal received is the signal for the character H representing the end of transmission. The operation of the circuit upon closure of contacts 22–03 in response to the H signal, the figures relay 21FG being unoperated, is the same as that previously described with reference to response of the incoming line circuit to the H signal as a "no-traffic" response of an outlying station to its transmitter start pattern. This includes operation of relay 21HH, which results in the release of relay 21T.

Relay 21SP returns to and remains in the marking condition after the H signal has been received, releasing relay 21A1 after its characteristic delay interval. Relay 21A1 had remained operated during reception of the message from station 1–07 because of repetitious engagement of the armature of relay 21SP with its spacing contact as that relay followed the signals repeated by line relay 21L.

Upon the release of relay 21A1, ground is disconnected from conductor 17–41 thereby opening the locking circuit for relay 17BS which releases. This relay interrupts at its front contact an darmature 6 the locking circuit for relay 17BSA which also releases. Relay 17BSA, upon releasing, completes the energizing circuit for relay 10STA, the circuit being traced from battery through the winding of that relay, conductor 10–01, back contact and armature 7 of relay 16ESA, conductor 16–01, armature 3 and back contact of relay 17BS, armature 1 and back contact of relay 17BSA, conductor 17–01, armature 5 and back contact of relay 11HDT, back contact and armature 7 of relay 11HD, conductor 11–01, armature 5 and back contact of relay 16PX, conductor 16–02, make contacts of key 9–01, conductor 9–03, conductor 16–03 and armature 5 and back contact of relay 17ST to ground. Relay 10STA operates and initiates the sequence of operations previously described for generating transmitter start codes to be transmitted over the multistation line. These operations include the energization of relay 15SE to cause the stepping of the contactors of switch 9SE to the next contact, which is the third contact of the first set of connections to the several contact banks of that stepping switch. It will be remembered that the contactors of the switch 9PF were advanced to the contact corresponding to the one occupied by the contactors of switch 9SE, namely, the second contact of the first set of connections to the several contact banks, in response to the incoming message received from station 1–07.

With the contactors of switch 9SE engaging the third contact of the first set of connections to the several contact banks, a path is traced from conductor 10–44 over conductor 9–12 to distributor conductor 17–12b. A path is extended from conductor 10–43 over conductor 9–13 to distributor conductor 17–12c. A path is extended over conductor 16–21 to conductor 9–14 which is connected to conductor 17–12d. Conductors 17–12b, 17–12c and 17–12d represent elements 2, 3 and 4 of the code combinations, and with paths extended to these conductors as above described, the code combination set up on the distributor contacts will have elements 2, 3 and 4 of marking nature and elements 1 and 5 of spacing nature, and this is the code combination for the letter C which is the priority start code for the transmitter 1–52 at station 1–07. In the manner hereinbefore described, the transmitter start circuit will cause the transmission of the transmitter start pattern comprising the signals blank and space with an intervening pause, the code combination for the letter C, whereupon the transmitter start circuit will await the beginning of message transmission from station 1–08 or reception of the code signal for the letter H indicating that station 1–08 has no message material awaiting transmission. It will be assumed that the station has no message to be transmitted, in which case the contactors of stepping switch 9SE will be stepped to the next position.

With the contactors of switch 9SE advanced one step, conductor 10–44 is connected through conductor 9–11 to conductor 17–12a, conductor 10–43 is connected through conductor 9–14 to conductor 17–12d and conductor 16–21 is connected through conductor 9–16 to conductor 17–12e. Conductors 17–12a, 17–12d and 17–12e represent elements 1, 4 and 5 of the code combinations, and with paths extended to these conductors as above described, the code combination set up on the distributor contacts will have elements 1, 4 and 5 of marking nature and elements 2 and 3 of spacing nature, and this is the code combination for the letter B which is the priority start code for transmitter 1–53 at station 1–09. As set forth in the description of the starting of the transmitter at station 1–07, following reception of the no-response code resulting from the transmission of the transmitter start pattern including the priority code signal U for transmitter 1–12 at station 1–06, the transmitter start circuit does not repeat the entire transmitter start pattern comprising the signals blank and space with an intervening pause, but merely transmits the single code combination for the character B.

It will be assumed that station 1–09 also has no message tape awaiting transmission so that it responds to its transmitter start pattern by returning the no-traffic response which is the code combination for the character H. The incoming line circuit receives the no-response signal and calls upon the transmitter start circuit to transmit the next transmitter start signal. The contactors of stepping switch 9SE are advanced to the next contact, which is the fifth contact of the first set of connections to the several contact banks. It will be assumed that the transmitter skip key 9–09 for that station, which is the middle one of the three skip keys shown in Fig. 9, has been operated to prevent the transmission of transmitter start signals for that station, perhaps because the station is shut down or is out of order. The make contact, engageable by the lowermost swinger of the middle one of the keys 9–09, is connected by conductor 9–17 to the front and back contacts associated with armature 7 of relay 9PL1. The significance of the dual connection to the front and back contacts associated with that armature is that the station, corresponding to the particular skip key, is assigned priority and non-priority transmitter start codes, and that the station will be skipped during priority and non-priority roll calls of the transmitters when the skip key is operated. When a transmitter is assigned only a non-priority start signal the contact engageable by the lower spring of its skip key will be connected only to a front contact of relay 9PL1 or 9PL2, and the back contact associated with the same armature of the relay will be grounded. Such a circuit arrangement is shown in association with armature 7 of relay 9PL2. When a transmitter has only a priority start code the contact, engageable by its lower spring, will be connected to a back contact of the relay 9PL1 or 9PL2 and the front contact associated with the same armature of the relay will be grounded.

With the middle one of the three skip keys 9–09 operated, a circuit previously identified and traced is completed from ground through conductor 9–17, back contact and armature 7 of relay 9PL1, conductor 9–18, conductor 9–19, fifth connected contact in the first group of contacts of contact bank 1 of stepping switch 9SE and its contactor, conductor 10–24, armature 3 and front contact of relay 10SNB, which is operated and locked when the transmitter start circuit is in the process of calling the roll of transmitters, conductor 16–16, armature 6 and back contact of relay 16PNB, conductor 17–18, back contact and armature 1 of relay 17SCS, conductor 15–04, break contacts of stepping magnet 15–03, conductor 17–16, back contact and armature 6 of relay 17NB, conductor 15–02 and upper winding of relay 15SE to battery. This causes relay 15SE to operate, in turn completing the operating circuit of stepping magnet 15–03, which prepares to step the contactors of stepping switch 9SE to the next position and interrupt at its break contacts the energizing circuit of the upper winding of relay 15SE. This causes the interruption of the circuit of stepping magnet 15–03 which releases, advancing the contactors to the next contact.

If the skip key for the next station in the roll call is operated, ground will again be applied through a contact of contact bank 1 of stepping switch 9SE to the contactor to cause the advancement of the contactors of that switch to the next position. If no station is assigned the priority transmitter start code represented by any of the contacts of stepping switch 9SE, there will be a direct ground on the back contact of the armature, corresponding to that transmitter start code, of relay 9PL1 or 9PL2, which will have the same effect as the application of ground through an operated skip key, namely the immediate reoperation of relay 15SE to cause the advancement of the contactors of stepping switch 9SE another step.

As the single code combination representing the priority transmitter start code of any transmitter is transmitted by the transmitter start circuit, the station control circuit with which the called transmitter is associated will initiate operation of the transmitter if it has a message tape awaiting transmission, or will return to the switching center the normal no-traffic response which is the signal for the character H.

Each time a called station responds by beginning the transmission of a message, the transmission of transmitter start codes will be suspended, in the manner previously described, and the contactors of stepping switch 9PF will be advanced under the cooperative control of relay 15PF and stepping magnet 15–11 until the contactors have been brought to rest in a position corresponding to the position occupied by the contactors of stepping switch 9SE. The contactors of stepping switch 9PF mark the last station at which priority message transmission was initiated, and these contactors remain at rest as long as priority start codes are being transmitted, one after another, seeking to initiate message transmission at one of the outlying stations. Whenever message transmission has been initiated and completed, and the incoming line circuit responds to the end-of-transmission signal, which is the code combination for the character H following the disconnect signal, the calling of the roll of transmitters for the purpose of reinitiating transmission from another station is begun by transmitting the preliminary signals of the transmitter start code, namely the code combinations for blank and space with an intervening pause. These signals do not precede the single code combinations representing transmitter selecting signals transmitted one after another in response to the normal no-traffic response from the stations in succession.

*Transmission of non-priority transmitter start signal*

It will be assumed that none of the stations called has a priority message awaiting transmission, that the contactors of stepping switch 9SE are advanced from the last connected contacts of the first group, to the next position at which the contactor associated with conact bank 1 receives ground and causes the immediate advancement of the contactors to the next position in the same manner that any grounded contact of contact bank 1 of stepping switch 9SE causes the advancement of the contactors, and that the contactors of stepping switch 9SE come into the position corresponding to the contactors of stepping switch 9PF. For convenience, it will be assumed that none of the other stations had any priority traffic awaiting transmission following the transmission of the message from station 1–07 directed to station 1–09, and that the contacts of stepping switch 9PF are therefore engaging the second connected contacts of the first group when the contactors of stepping switch 9SE come into engagement with the second connected contacts of the second group of stepping switch 9SE.

At this time the following relays in the transmitter start circuit are operated: 10S1, 10S1A, 10S2, 10S2A, 10S3, 10S3A, 17ST and 16CSS. With the contactors of stepping switches 9SE and 9PF in corresponding positions, ground on the front contact associated with armature 8 of relay 17ST is extended through the armature, conductors 17–42, 17–02 and 17–04, back contact and armature 1 of relay 17BS, conductors 17–06 and 11–02, armature 2 and back contact of relay 11HDT, conductor 11–03, contactor associated with contact bank 5 of stepping switch 9SE and the contact engaged thereby, corresponding contact of contact bank 5 of stepping switch 9PF and its contactor, conductor 16–28, back contact and armature 7 of relay 16SW, conductor 17–38, armature 8 and back contact of relay 17BSA to the front contact associated with armature 3 of relay 17NB. Upon the response of the incoming line circuit to the no-traffic response character H, a sequence of operations, including the operation of relay 21HH followed by the operation and locking of relay 17NB, occurs. Relay 17NB effects several operations including the energization of relay 15SE and stepping magnet 15–03, the operation and locking of relay 11TSA, all as previously described and, in addition, the ground connection traced to the front contact associated with armature 3 of relay 17NB is extended through the associated armature 3, conductor 17–43, armature 1 and back contact of relay 16SW, armature 1 and front contact of relay 16CSS which is operated, conductors 16–29, 16–31 and 16–32 and winding of relay 16PNB to battery and that relay operates. At its armature 1 relay 16PNB completes energizing circuits for relays 9PL1 and 9PL2 from battery through their respective windings and over conductor 9–21 and front contact and armature 1 of relay 16PNB to ground, and relays 9PL1 and 9PL2 operate. As previously set forth, the back contacts of these relays provide ground either directly, in the case of unassigned transmitter start codes, or indirectly from skip keys for suppressing the transmission of start codes by causing the advancement of the contactors of stepping switch 9SE. The front contacts of these relays provide direct or indirect ground connections for similarly suppressing the transmission of start codes in the roll call of transmitters for regular or non-priority message traffic. Relay 9PL2 interrupts, at its armature 2 and back contact, the circuit of priority lamp 9–08, thereby extinguishing that lamp.

At the break contacts controlled by its armature 3, relay 16PNB interrupts the locking circuit of relay 16CSS which releases. Relay 16CSS completes the circuit of relay 17SCS, traced from the winding of that relay over conductor 17–13, armature 2 and back contact of relay 16CSS, conductor 16–04, front contact and armature 4 of relay 17ST, conductor 17–14 and armature 5 and back contact of relay 16ES to ground. Relay 16CSS releases relay 10S1 by interrupting the energizing circuit thereof at its armature 4 and front contact. Relay 16CSS completes the operating circuit of relay 16SW, in a path traced from battery through the winding of that relay, armature 5 and front contact of relay 16PNB, armature 5 and back contact of relay 16CSS and conductor 16–14 through armature 10 and front contact of relay 17ST to ground. Relay 16SW locks through its front contact and armature 5 and over conductor 16–14 to the ground supplied through armature 10 of relay 17ST. Relay 16SW, operated, opens, at its armature 3, the path over conductor 16–21 to the contactor of contact bank 4 of stepping switch 9SE. As set forth in the description of activation of the transmitter start circuit in response to operation of switch 9–01 and operation in response to the no-traffic acknowledgment signal for the character H, relay 15SE, now operated by relay 17NB, operates relay 10SNA in a circuit traced from battery through the winding of relay 10SNA, conductors 10-21 and 16-06, armature 1 and front contact of relay 15SE to ground. Relay 10SNA operates relay 10SNB which locks over conductor 10-22 and branching paths, one including conductor 16-07 and the front contact of armature 4 of relay 15SE and the other including conductor 16-33 and the front contact of armature 3 of relay 11TSA. Relay 10SNB, at its armature 2 and back contact, interrupts the locking circuit for relay 10S3A which releases. With relay 10S3A released, the grid of tube 11-06 is held at ground potential. Relay 10SNB also locks relay 9PL1 and 9PL2 from the windings of those relays through armature 4 and front contact of relay 9PL1, conductor 9-22 and front contact and armature 8 of relay 10SNB to ground. An additional locking path is traced from the junction of conductor 9-22 over conductor 10-64 and armature 8 and front contact of relay 17BS to ground. At the same armature relay 10SNB breaks the locking circuit of relay 17NB which releases.

Relay 10SNB again completes, over conductor 15-06, an energizing path for stepping magnet 15-03 that is interruptable by relay 15SE at its armature 2 and front contact, and relay 17NB, released, interrupts the alternate energizing circuit for stepping magnet 15-03 over conductor 15-09. Relay 17NB also releases relay 11TSA.

With relay 17NB released, there begins the stepping of the contactors of stepping switch 9SE under the mutual interruptive circuit control of relay 15SE and stepping magnet 15-03. The circuit is traced from battery through the upper winding of relay 15SE, conductor 15-02, armature 6 and back contact of relay 17NB, conductor 17-16, break contacts of stepping magnet 15-03, conductor 15-04 and armature 1 and front contact of relay 17SCS to ground. Advancement of switch 9SE will continue until relay 17SCS releases or relay 17NB operates or the circuit through the lower winding of relay 15SE is completed. That circuit could be completed independently of the armature 3 and front contact of relay 15SE over conductor 15-07, or through that armature and front contact over conductor 10-23. The path including conductor 15-07 is traced through the front contact and armature 3 of relay 17SCS and conductor 17-17 to the contactor of contact bank 6 of stepping switch 9SE. From there it may be extended only through the contactor of the sixth contact bank of stepping switch 9PF or 9RF. Conductor 15-08, connected to the sixth contactor of stepping switch 9PF, is traced over conductor 16-08 to a back contact of relay 16SW, which is now energized, and over conductor 17-36 to a front contact of relay 17BSA which is now released. No ground is available on either path. From the contactor of the sixth contact bank of stepping switch 9RF, a path is traced over conductors 9-23 and 16-34, front contact and armature 6 of relay 16SW, conductor 16-09 and armature 2 and front contact of relay 17SCS to ground. Accordingly, the contactors of stepping switch 9SE will be advanced until a circuit is completed for energizing the lower winding of relay 15SE upon arrival of the contactors of switch 15SE into correspondence with the contactors of stepping switch 9RF.

The position of the contacts of switch 9RF indicates the regular or non-priority start code last sent. It will be assumed that their position happens to be that shown in the drawings, engaging the first contact of the first group of connections. It was assumed that only station 1-07 transmitted a message in the roll call of transmitters for priority traffic and, therefore, that the priority roll call ended with the contactors of switch 9SE engaging the second contacts of the second set of connections. Had it been the first contact of the second set of connections there would have been no advancement of switch 9SE because relay 15SE would not have released upon release of relay 17NB, since the circuit of its lower winding would have been completed over a path including the contactors of the sixth contact bank of switches 9SE and 9RF upon operation of relays 16SW and 17SCS. Since the position of the contactors of switch 9SE has been assumed to be one step beyond the position at which advancement of the switch would have been prevented, the contactors will be advanced until they come into engagement with the first contacts of the first group of connections. When they have reached that position the energization of the lower winding of relay 15SE will prevent the release of that relay in response to the interruption of the energizing circuit for the upper winding by the break contacts of stepping magnet 15-03. At the same time, the ground connection of the lower winding will be extended over the armature 3 and front contact, conductor 10-23, front contact and armature 4 of relay 10SNB, conductor 16-12, varistor 16-11, break contacts controlled by armature 3 of relay 16CSS and winding of that relay to battery and the relay operates, locking in a path traced through its front contact and armature 3, front contact and armature 2 of relay 16SW, conductor 16-14 and armature 10 and front contact of relay 17ST to ground.

At its armature 2 and back contact relay 16CSS interrupts the energizing circuit of relay 17SCS which releases. Relay 17SCS interrupts at its armature 2 and front contact the circuit of the lower winding of relay 15SE and this relay releases, interrupting the circuit of stepping magnet 15-03 which advances the contactors of switch 9SE to the second contacts of the first set of connections.

It will be assumed that the second contacts of the first group of connections of switch 9SE represent a transmitter start code which is assigned and that the skip key for that transmitter is not operated. Under that circumstance, ground will not be applied through a front contact of relay 9PL1 to the second connected contact of the first set of connections of the first contact bank of stepping switch 9SE, and relay 15SE will not be reenergized as a result of the stepping of the contactors to that position. Each time that relay 15SE has released during the advancement of the contacts of switch 9SE to the presently assumed position, it has interrupted the locking circuit for relay 10SNA. That relay has a slow-release characteristic and has remained operated during the released intervals of relay 15SE. With relay 15SE remaining released the relay 10SNA releases, in turn releasing relay 10SNB. Relay 10SNB reoperates relay 10S1 over a path traced from battery through the winding of that relay, conductors 10-26 and 10-27, armature 7 and back contact of relay 10SNB, conductor 10-28, armature 4 and front contact of relay 16CSS and conductor 16-14 to ground on the front contact associated with armature 10 of relay 17ST. Relay 10S1, at its armature 6, extends a ground connection through the associated front contact, armature 1 and front contact of relay 10S1A, armature 6 and front contact of relay 10S2, upper armature and front contact of relay 10S2A, front contact and armature 4 of relay 10S3, armature 1 and back contact of relay 10S3A, back contact and armature 1 of relay 10SNB, conductor 10-31, armature 3 and front contact of relay 17ST and conductor 17-19 to distributor clutch magnet 17-20 of outgoing line circuit 17-07. As previously described, this ground connection operates the distributor clutch release magnet of the transmitter-distributor which has had its distributor contacts extended into the transmitter start circuit by way of conductors 17-12. Because of the fact that relays 10S1A, 10S2, 10S2A and 10S3 have remained operated the preparatory portions of the transmitter start pattern, namely the blank signal followed, after a pause, by the space signal, are not retransmitted preceding the first regular or non-priority start code. With relay 10S3 operated, conductor 10-39 which is connected to ground in the outgoing line circuit, is connected over the front contact and armature 3 of relay 10S3, conductor 10-44, contactor associated with contact bank 2 of stepping switch 9SE, second contact of the first connected group of contacts and conductor 9–11 to conductor 17–12a. Ground is extended from conductor 10–39 over the front contact and armature 2 of relay 10S3, conductor 10–43, contactor associated with the contact bank 3 of switch 9SE, second contact of the first group of connections to that contact bank and conductor 9–13 to conductor 17–12c. A path, traced to the contactor associated with contact bank 4 of stepping switch 9SE during the description of transmission of the priority start codes, is now open at the back contact and armature 3 of relay 16SW so that no ground connection is applied through the second connected contact of the fourth contact bank of stepping switch 9SE to conductor 17–12d, as it was in the case of the priority start code transmitted with the contactors of stepping switch 9SE in this position. With ground connected only to conductors 17–12a and 17–12c, the code combination set up on conductors 17–12 has elements 1 and 3 of marking nature and elements 2, 4 and 5 of spacing nature and is the code combination for the character S. The priority start code transmitted with the contactors in the same position was the code combination for the character F having elements 1, 3 and 4 of marking nature and elements 2 and 5 of spacing nature. The code for the non-priority transmitter start thus differs from the priority start code for the same position of the contactors by having one less marking element than the priority start code. The connections of the contacts of the second, third and fourth contact banks of stepping switch 9SE to conductor 17–12 are such that each priority start code comprises three marking elements and two spacing elements, and the non-priority codes comprise two marking elements and three spacing elements, due to the elimination of contact bank 4 as a factor in the setting up of the non-priority codes. During the cycle of the distributor in which the code combination for the character S is transmitted, relay 10S3A operates and locks. This relay interrupts the energizing circuit for the distributor clutch magnet 17–20 so that the distributor will be arrested at the end of the cycle, and starts tube A timing an interval of five seconds.

Assuming that station 1–07 has no regular message awaiting the transmission, upon the response of the monitoring selector 6–04 to the transmitter start character S, contacts 6–27 will close momentarily, connecting ground over conductors 6–28 and 6–30 to the armature 4 of relay 12T2. This relay will not be energized because tape-out contacts 18–02 will not have been closed and the H sending contacts 6–14 will not be shunted. Accordingly, the monitoring selector will respond to the transmitter start signal by returning the code combination for the character H, which is the normal no-traffic acknowledgment. In response to that signal the incoming line circuit at the switching center will activate the transmitter start circuit, advancing the contactors of stepping switch 9SE to the next position. As in the case of the transmission of priority transmitter start signals, the preparatory codes for blank and pause with an intervening pause are not repeated for each transmitter selecting code combination transmitted, and are transmitted only once for each roll call of transmitters. The priority code for the next station in the sequence, the station 1–08 is the code for the letter C, having elements 2, 3 and 4 of marking nature and elements 1 and 5 of spacing nature. The connection from the third contact of the fourth contact bank of switch 9SE is to conductor 17–12d, the same as the connection from the second contact so that only the elements 2 and 3 will be of marking nature for the non-priority code combination, this being the code for the letter I. If a non-priority message is awaiting transmission from transmitter 1–52 in response to the transmitter start signal I, message transmission will be initiated and in response thereto the transmitter start circuit will be cause to suspend the roll call of transmitters as in the case of initiation of transmission of a priority message.

Otherwise the roll call will continue. In connection with the deactivation of the transmitter start circuit, at whatever point in the roll call, and upon the operation and locking of relay 17BSA, the circuit of relay 15RF will be completed in a path traced from battery through the winding of that relay, break contacts controlled by stepping magnet 15–14 of stepping switch 9RF, conductors 15–16 and 15–17, front contact and armature 4 of relay 16SW, conductor 16–22, armature 4 and front contact of relay 17BSA, and front contact and armature 12 of relay 17ST to ground. Upon each energization of relay 15RF it completes the circuit of stepping magnet 15–14 which in turn interrupts the energizing circuit of relay 15RF which releases, in turn releasing the stepping magnet and thereby causing the contactors of stepping switch 9RF to advance one step. When the contactors of stepping switch 9RF reach a position corresponding to the contactors of switch 9SE a shunt across the winding of relay 15RF is established, traced from the right-hand terminal of the winding of the relay, over conductor 15–18, armature 9 and front contact of relay 17BSA, conductor 17–44, conductor 9–23, contactor associated with contact bank 6 of stepping switch 9RF, the contact then engaged by that contactor, the corresponding contact of the sixth contact bank of switch 9SE, the contactor associated with that bank, conductor 17–17, armature 3 and back contact of relay 17SCS, conductor 17–34 and front contact and armature 12 of relay 17ST. The completion of the shunting circuit just traced prevents the reenergization of relay 15RF and the contactors of stepping switch 9RF come to rest to mark the transmitter from which normal message transmission has been initiated.

In addition to causing the advancement of the contactors of stepping switch 9RF into correspondence with the contactors of switch 9SE, the transmitter start circuit also transmits two letters signals for restoring the station control circuits to conditions of unresponsiveness of the transmitter start code contacts to their individual transmitter selecting signals and to reassociate with the receiving channel 1–01 any teletypewriter recorders that may have been receiving a message. Thus far there has been no description of outgoing message transmission from the switching center to any of the receiving stations of the multistation line. Finally the relay 10S5A operates as previously described, incident to the transmission of the second letters signal, to cause tube 11–06 to time an interval of 340 milliseconds and at the end of that interval tube 11–06 operates relay 11T which in turn operates relay 11TA in a circuit through the armature 3 and front contact of relay 10S5A. Relay 11TA operates relay 11RLS which interrupts the locking circuit of relay 17ST and grounds the grid of tube 11–06, thereby releasing relay 11T. Relay 17ST releases all of the relays except relays 17ES and 17BSA. Specifically, the relays which relay 17ST releases are the relays 10S1, 10S1A, 10S2, 10S2A, 10S3, 10S3A, 10S4, 10S4A, 10S5, 10S5A, 16SW, 16PNB, 9PL1, 9PL2, 11TA and 11RLS. This places the transmitter start circuit in the same condition that it has during the reception of a priority message. When the end-of-transmission signal is received and the transmitter start circuit is reactivated, it will begin a roll call of transmitters for priority business because relays 9PL1 and 9PL2 have been released.

It will be apparent at this point that the transmitter start circuit does not begin a roll call of transmitters for regular message traffic until it has made a complete roll call of transmitters for priority traffic without finding such traffic. When the transmitter start circuit is reactivated following reception by the incoming line circuit of an end-of-transmission signal, the transmitter start circuit will initiate a roll call of transmitters for priority traffic, whether the transmission just completed has been priority message transmission or regular message transmission.

*Completion of roll call for non-priority traffic*

It may happen that the transmitter start circuit completes a complete roll call of transmitters for priority message transmission followed by a complete roll call of transmitters for non-priority traffic without finding either type of message awaiting transmission. The condition of the transmitter start circuit immediately following the transmission of the last regular transmitter start code is that tube 11-06 is timing a five-second interval and the following relays of the transmitter start circuit are operated: 10S1, 10S1A, 10S2, 10S2A, 10S3, 10S3A, 17ST, 16CSS, 16PNB, 16SW, 9PL1 and 9PL2. If the last station called has no non-priority traffic awaiting transmission, it will return the no-traffic acknowledgment signal. In response to this the incoming line circuit completes the circuit of relay 17BS in the manner previously described, and this relay starts a 300-millisecond timing cycle of tube 11-06. The incoming line circuit also completes the circuit of relay 17NB which operates and locks.

Relay 17NB completes an energizing circuit for relay 10RNB traced from battery through the winding of that relay, conductor 10-66, back contact and armature 1 of relay 11HD, conductor 11-27, armature 6 and front contact of relay 16CSS, front contact and armature 4 of relay 16PNB, front contact and armature 1 of relay 16SW, conductor 17-43, armature 3 and front contact of relay 17NB, back contact and armature 8 of relay 17BSA, conductor 17-38, armature 7 and front contact of relay 16SW, conductor 16-37, contactor of contact bank 5 of stepping switch 9RF which should be engaging a contact corresponding to the one engaged by the contactor associated with contact bank 5 of stepping switch 9SE because the latter switch, having completed a roll call of transmitters for regular traffic, should have advanced from its initial position in one of the sets of connections to a corresponding position in the other set of connections and, therefore, into a position to extend the path just traced over conductor 11-03, back contact and armature 2 of relay 11HDT, conductors 11-02 and 17-06, armature 1 and front contact of relay 17BS to ground. Relay 10sNB locks in a path traced from its winding through its armature 4 and front contact, conductors 10-47 and 16-14 and armature 10 and front contact of relay 17ST to ground. In the manner previously described, in connection with the shift from priority roll call to regular roll call, relay 17NB also energizes relay 15SE, stepping magnet 15-03, relay 11TSA, which locks and releases relay 17BS, and grounds the grid of tube 11-06.

Relay 10RNB operates relay 11HD in a path traced from battery through the winding of relay 11D, conductor 11-28 and front contact and armature 5 of relay 10RNB to ground. Relay 11HD locks through its front contact and armature 4, the back contact and armature of relay 11RST, conductor 11-29 and back contact and armature 4 of relay 16TSB to ground.

Relay 10RNB also operates relay 10S4 in a circuit traced from ground through the front contact and armature 2 of relay 17ST, conductors 16-17, 10-36 and 10-48, winding of relay 10S4, conductors 10-49 and 10-67, armature 3 and front contact of relay 10RNB, conductor 10-68 and conductor 16-38 to battery through resistor 17-53.

Relay 11HD operates relay 11HDT in a circuit from battery through the winding of the latter relay, armature 6 and front contact of relay 11HD, conductor 11-31, and back contact and armature 6 of relay 10S5A to ground.

In the manner previously described, relay 10S4 sets up the code combination for letters on the contacts of the transmitter in outgoing line circuit 17-07 and energizes the distributor clutch magnet 17-20 which causes the letters signal to be transmitted over outgoing channel 1-03 to the monitoring selector mechanisms associated with that channel. During the transmission of the letters signal the distributor auxiliary contacts 17-25 associated with the distributor close momentarily, operating relay 10S4A.

In the manner described in connection with the shift from priority start signal transmission to regular start signal transmission, the relay 15SE, operated by relay 17NB, operates relay 10SNA which in turn operates relay 10SNB which locks. Relay 10SNB releases relay 17NB which releases relays 15SE and 11TSA. Relay 15SE releases stepping magnet 15-03, causing the contactor associated with the first contact bank of stepping switch 9SE to engage a contact on which there is no ground connection. If the particular contact engaged by that contactor has a ground connection, relay 15SE and stepping magnet 15-03 will cooperate to effect advancement of the contactors until an ungrounded contact is engaged. Following the stopping of the contactors of stepping switch 9SE, relay 10SNA releases after its delay interval, releasing relay 10SNB.

It was previously stated that relay 10S4A operated upon the closure of the distributor auxiliary contacts during the transmission of the letters signal. The closure of those contacts is momentary, and upon their reopening the relay 10S4A locks and relay 10S5 operates. This is a repetition of the cycles of operations in the transmitter start circuit that occur when incoming traffic is received in response to a transmitter start signal as previously described. The distributor clutch release magnet 17-20 remains operated and initiates the transmission of a second letters signal. The distributor auxiliary contacts 17-25 close during the transmission of that signal and complete the operating circuit for relay 10S5A through the front contact and armature of relay 10S5. Relay 10S5A locks over a circuit previously traced and interrupts the energizing circuit for the distributor clutch release magnet, thus arresting the transmitter at the end of transmission of the second letters signal. Relay 10S5A also interrupts at its armature 6 and back contact the previously traced energizing circuit for relay 11HDT and associates resistors with the charging circuit for condenser 11-08 to initiate a 340-millisecond timing interval.

The two letters signals are effective, in the manner previously described, to restore the transmitter start signal responsive portions of the monitoring selector mechanism associated with outgoing channel 1-03 to their normal or unselected conditions and to reassociate with channel 1-03 any receiving teletypewriter that may have been in the process of receiving a message when channel 1-03 was seized by the transmitter start circuit for the purpose of transmitting transmitter start signals.

At the end of the 340-millisecond timing interval, tube 11-06 becomes conductive and operates relay 11T. The sequence of operations resulting has been previously described, namely operation of relay 11TA which in turn operates relay 11RSL which releases start relay 17ST and which grounds the grid of tube 11-06. Relay 11T releases relay 11TA which in turn releases relay 11RLS.

At the time of reception of the no-traffic response signal for the character H from the last station polled for regular message transmission, the following relays were in the operated condition: 10S1, 10S1A, 10S2, 10S2A, 10S3, 10S3A, 17ST, 16CSS, 16PNB, 16SW, 9PL1 and 9PL2. Relays which have become operated during the subsequent operations are the relays 10RNB, 10S4, 11HD, 10S4A, 10S5 and 10S5A. Relay 17ST releases all of the relays enumerated above, those that had been operated and those that became operated and remained operated, with the exception of relay 11HD which remains locked to ground on the armature 4 of relay 16TSB. With relay 10S5A released and relay 11HD operated, an energizing circuit for relay 11HDT is established as previously traced, from battery through its winding, armature 6 and front contact of relay 11HD, conductor 11-31 and back contact and armature 6 of relay 10S5A to ground, and relay 11HDT reoperates. It opens at its armature 5 and back contact the path over which relay 10STA is energizable, so that that relay cannot operate.

With relays 11HD and 11HDT operated, a ground connection is removed from the grid of tube 11–06, at the armature 2 of relay 11HD and armature 1 of relay 11HDT, to permit condenser 11–08 to charge through resistor 11–11 alone. This resistor provides a two-minute timing cycle for tube 11–06, to cause a two-minute waiting period before the transmitter start circuit is reactivated to test the outlying transmitters for message traffic waiting transmission. In the event that outgoing channel 1–03 is not carrying any transmission to an outlying station at this time, a ground connection will be applied through break contacts of relays 17–30 and 17–35 in outgoing line circuit 17–07 to conductor 17–46 and through armature 3 and front contact of relay 11HDT, which is now operated, and winding of relay 11T1 to battery, and relay 11T1 will be operated. At its single armature and front contact, the relay 11T1 connects resistor 11–32 in parallel with resistor 11–11 to reduce the timing cycle to one minute. It will be understood that the transmitter start circuit gains access to outgoing channel 11–03 for the purpose of transmitting transmitter start signals by interrupting outgoing message transmission over that channel, if there is such transmission. Outgoing transmission thus may be suspended briefly each time transmitter start signals are transmitted. However, when there is no outgoing transmission from the outgoing line circuit on channel 1–03, it is expedient to utilize that channel more frequently for testing outlying stations for traffic awaiting transmission than when there is outgoing message transmission. This is the reason for reducing the waiting interval of the transmitter start circuit when there is no outgoing message transmission.

When tube 11–06 times out, whether the interval is two minutes or one minute, relay 11T operates and completes the circuit of relay 11RST from ground through the armature of relay 11T, conductors 11–16 and 11–33, front contact and armature 4 of relay 11HDT which is now operated, conductor 11–34, armature 5 and front contact of relay 11HD and winding of relay 11RST to battery. Relay 11RST interrupts the locking circuit for relay 11HD which releases, grounding the grid of tube 11–06 and releasing relay 11HDT. With tube 11–06 cut off by the grounding of its grid relay 11T is released, in turn releasing relay 11RST. Relay 11HDT, released, completes a previously traced circuit for relay 10STA which operates to initiate another roll call of transmitters for traffic, beginning with priority transmitter start signals.

The waiting interval may be terminated at any time by an operator by operating key 9–01 to the stop position and then restoring it to the go position. The operation of the key to the stop position results in the completion, through the upper break contacts of the key, of the circuit of relay 16TSB. This relay upon operating, interrupts the locking circuit of relay 11HD, thereby causing the release of relay 11HDT and the grounding of the grid of tube 11–06. The reoperation of key 9–01 to the go position causes the activation of the transmitter start circuit in the manner previously described.

*Search for traffic when all priority skip keys are operated*

It may sometimes happen that all of the skip keys pertaining to priority transmitter start codes are operated. The operation of the transmitter start circuit in this circumstance will now be described on the basis that there is no transmitter start cycle in progress and that the tube 11–06 is timing the two-minute interval.

When all of the priority skip keys are operated, a circuit is traced from ground through the inner upper make contacts of the first skip key 9–09, corresponding make contacts in series, of other operated keys, strap across the corresponding contacts of any key that is not assigned for priority transmitter start, as in the case of the lowermost of the keys 9–09, and conductor 9–24 and winding of relay 16PX to battery. This relay will thus be operated.

At the end of the timing interval, assumed to be two minutes, tube 11–06 will operate relay 11T which initiates a previously described sequence of operations involving the operation of relay 11RST, the release of relay 11HD, the release of relay 11HDT, the release of relay 11RST, the cutting off of tube 11–06 and the release of relay 11T. Relay 11HDT reoperates relay 10STA which operates relay 10STB and suspends outgoing transmission on channel 1–03 preparatory to transmitting transmitter start signals. Relay 10STA also initiates a 300-millisecond timing cycle of tube 11–06. At the end of that cycle tube 11–06 operates relay 11T which operates relay 17ST. This relay operates and locks. As in the case of the initially described operation of relay 17ST, it operates relay 17SCS, releases relay 10STA and lights priority lamp 9–08. Because of the fact that relay 16PX is operated, the relay 17ST operates relay 16PNB in a circuit traced from battery through the winding of the latter relay, conductors 16–32, 16–39 and 16–41, back contact and armature 4 of relay 10S1, conductor 10–69, front contact and armature 2 of relay 16PX, conductors 16–13 and 16–14 and armature 10 and front contact of relay 17ST to ground, and relay 16PNB operates. At the time that relay 17ST operated it completed a locking circuit for relay 16PX traced from battery through the upper winding of that relay, its armature 3 and front contact, conductor 16–42 and over the path just traced including conductor 16–41 and the back contact and armature 4 of relay 10S1 to ground on the front contact associated with armature 10 of relay 17ST.

Relay 16PNB, operated, performs the functions previously described for it, namely the operation of relays 9PL1 and 9PL2, the latter of which cuts off priority lamp 9–08, and the operation of relay 16SW through the armature 5 and front contact of relay 16PNB and the armature 5 and back contact of relay 16CSS which at this time is released. Relay 16PNB also interrupts the path to the contactor associated with the fourth contact bank of stepping switch 9SE.

In the meantime relay 17SCS, operated by relay 17ST, has operated relay 15SE which operates relay 10SNA, which in turn operates relay 10SNB which locks. Relay 10SNB locks the relays 9PL1 and 9PL2. Relay 10SNB also operates stepping magnet 15–03 of stepping switch 9SE which releases relay 15SE if the contacts engaged by the contactors of stepping switch 9SE do not correspond to the contacts engaged by the contactors of stepping switch 9RF. If this is the case, relay 15SE will release and release stepping magnet 15–03 which will reoperate relay 15SE, this sequence of operations occurring until the contactors of stepping switch 9SE engage contacts corresponding to those engaged by the contactors of stepping switch 9RF. When this occurs, relay 15SE will not be released by stepping magnet 15–03 but will be energized through its lower winding, completing the circuit of relay 16CSS and reoperating stepping magnet 15–03. This sequence of operations corresponds to those set forth in the description of the initial activation of the transmitter start circuit except for the fact that stepping switch 9SE has been brought into correspondence with stepping switch 9RF instead of with stepping switch 9PF. Relay 16CSS locks and releases relay 17SCS. Relay 17SCS releases relay 15SE which in turn releases stepping magnet 15–03, advancing the contactors of stepping switch 9SE one step. If no ground is encountered by the contactor associated with the first contact bank of switch 9SE, indicating that the transmitter represented by that contact is neither unassigned nor skipped, the contactors will advance no further. If there is a ground connection, the relay 15SE and stepping magnet 15–03 will cooperate to advance the contactors until an ungrounded contact of the first contact bank is found. When relay 15SE releases and remains released, relay 10SNA will release slowly, in turn releasing relay 10SNB. The operation of relay 10S1 in a circuit previously traced results from the release of relay 10SNB to initiate a sequence of operations including the transmission of the blank and space signals, separated by a pause, the space signal being followed by the regular transmitter start signals one after another until regular message transmission has been initiated or all of the transmitters have been polled for regular message traffic and none has been found.

It may happen that the condition of all priority start skip keys operated may occur while a priority start cycle is in progress. It will be assumed that the operation of a priority start skip key causes the completion of the circuit of relay 16PX under that circumstance. Other relays that will be in the operated condition at that time are the relays 10S1, 10S1A, 10S2, 10S2A, 10S3, 10S3A, 16CSS and 17ST. It will be assumed that tube 11-06 is timing the five-second interval following transmission of the priority start code of an unskipped transmitter. It will also be assumed that the code transmitted is assigned to a station that has no priority traffic awaiting transtransmission, and that the station returns the no-traffic acknowledgment. As previously described, the relay 17BS operates and locks, and relay 17NB operates and locks. Relay 17NB operates relay 15SE, the stepping magnet 15-03, operates and locks relay 11TSA, which releases relay 17BS, and grounds the grid of tube 11-06.

Because relay 16PX is operated, the relay 17NB operates relay 16PNB, in a circuit traced from battery through the winding of the latter relay, conductors 16-32, 16-31 and 16-43, front contact and armature 2 of relay 17NB, conductor 17-47, front contact and armature 1 of relay 16PX and conductors 16-13 and 16-14 and armature 10 and front contact of relay 17ST to ground. Relay 16PNB locks over a circuit previously traced to the ground on the front contact associated with armature 10 of relay 17ST.

Relay 16PNB, operated, performs the operations previously enumerated in the description of the shift to the transmission of regular transmitter start signals, namely the release of relay 16CSS and the operation of relays 9PL1 and 9PL2. With relay 16CSS released the relays 17SCS and 16SW operate, the latter locking, and relay 10S1 releases. When relay 16SW operates, the path from the contactor associated with the fourth contact bank of stepping switch 9SE is interrupted.

The same sequence of operations also previously described results from the operation of relay 15SE, namely the operation of relay 10SNA, the operation and locking of relay 10SNB, the locking of relays 9PL1 and 9PL2 and the release of relays 17NB and 10S3A, by relay 10SNB, the maintenance of ground on the grid of tube 11-06 with relay 10S3A released, the release of relay 11TSA by relay 17NB, and the release of relay 15SE, also by relay 17NB, the relay 15SE and stepping magnet 15-03 cooperatively energizing and releasing to advance the contactors of stepping switch 9SE into correspondence with the contactors of stepping switch 9RF. When this correspondence of the positions of the contactors has been achieved relay 15SE operates relay 16CSS which releases relay 17SCS, the latter relay releasing relay 15SE which releases stepping magnet 15-03 to permit advancement of the contactors of stepping switch 9SE to the next contact. Relay 15SE remains released if ground is not encountered on the contact by the contactor associated with the first contact bank of stepping switch 9SE and releases relay 10SNA which releases slowly and in turn releases relay 10SNB which reoperates relay 10S1. Relay 10S1 operates the distributor clutch magnet 17-20 of the transmitter in the outgoing line circuit that the transmitter start circuit has seized for use, and the regular transmitter start code corresponding to the position of the contactors of stepping switch 9SE is transmitted. Because a transmitter start cycle was in progress at the time the shift to the regular start pattern cycle occurred, the preliminary cycles of the transmitter start pattern, comprising blank and space separated by a pause, have been transmitted and the code transmitted after the shift is the actual transmitter selecting signal represented by the position of the contactors of stepping switch 9SE. The regular start pattern cycle then proceeds in the manner previously described.

The operation of the transmitter start circuit when all of the priority skip keys are operated has been described previously. The operation will now be described upon the basis that the end of a priority transmitter start cycle is reached and all of the regular skip keys are operated. The following relays are in the operated condition during the priority cycle: 10S1, 10S1A, 10S2, 10S2A, 10S3, 10S3A, 17ST and 16CSS. With all of the regular transmitter skip keys operated, a circuit for relay 16RX will be completed from ground through the outer upper make contacts of the first skip key, corresponding make contacts of intermediate skip keys and the corresponding contacts of the last skip key, conductor 9-26 and lower winding of relay 16RX. It should be remembered taht any skip key may represent the skipping of a transmitter in the priority cycle or in the non-priority cycle, or both. Any key which is assigned to represent only a priority transmitter will have a shunting strap across its inner upper contacts so that the closure of the continuity circuit for operating the relay 16RX will not be dependent upon the operation of the particular key. Similarly, any key which is assigned only to a regular transmitter will have a shunting strap across its outer upper make contacts so that the completion of the circuit for relay 16PX will not be dependent upon the operation of that key. Relay 16RX locks over the same locking path used by relay 16PX.

As previously described, when the priority cycle is completed, and the response of the last-called transmitter is the no-traffic acknowledgment signal H, relay 17BS operates and locks, in turn operating relay 17NB which also locks. Relay 17NB operates relay 16PNB, which in turn operates relays 9PL1 and 9PL2 and releases relay 16CSS. Relay 16CSS operates relays 17SCS and 16SW, the latter relay locking, and relay 16CSS also releases relay 10S1. Relay 17NB also operates relay 11TSA which locks and releases relay 17BS.

Another operation resulting from the energization of relay 17NB is the operation of relay 15SE and stepping magnet 15-03. As in the descriptions of previous occurrences of operation of relay 15SE by relay 17NB the relay 10SNA operates, in turn operating relay 10SNB. The latter relay locks relays 9PL1 and 9PL2, operated by relay 16PNB and releases relay 17NB. This relay releases relay 11TSA and relay 15SE and thereupon begins the advancement of the contactors of stepping switch 9SE under the joint control of relay 15SE and stepping magnet 15-03. This advancement continues until the contactors of stepping switch 9SE occupy positions corresponding to those of the contactors of stepping switch 9RF. Upon the occurrence of the condition of correspondence, relay 15SE becomes operated through its lower as well as its upper windings and operates relay 16CSS, also operating stepping magnet 15-03.

With relay 16CSS operated an energizing circuit for relay 10RNB is completed, the circuit being traced from battery through the winding of that relay, conductor 10-66, back contact and armature 1 of relay 11HD, conductor 11-27, armature 6 and front contact of relay 16CSS, front contact and armature 4 of relay 16PNB, front contact and armature 1 of relay 16SW, conductor 16-44, armature 3 and front contact of relay 10S3A, conductor 10-71, front contact and armature 3 of relay 16RX which is operated as previously stated because all of the regular transmitters are skipped, conductors 16-42, 16-39 and 16-32, armature 3 and front contact of relay 16PNB and conductors 16-13 and 16-14 and armature 10 and front contact of relay 17ST to ground. Relay 10RNB locks through its front contact and armature 4 and conductors 10-47 and 16-14 to the same ground connection.

Relay 16CSS, having operated, releases relay 17SCS which in turn releases relay 15SE. Relay 15SE releases stepping magnet 15–03 and also relay 10SNA. The latter relay, upon releasing, releases relay 10SNB which reoperates relay 10S1. The contactors of stepping switch 9SE are advanced one step by the release of stepping magnet 15–03.

As in the case of completion of a roll call of stations for regular traffic without initiating transmission, relay 10RNB operates relay 11HD which locks and operates relay 11HDT. Relay 10RNB also operates relay 10S4 which sets up the letters signal on the contacts of the distributor in the outgoing line circuit and initiates operation of that distributor to transmit the letters signal. The distributor auxiliary contacts 17–25 close during the transmission of the letters signal, completing the circuit of relay 10S4A which operates. Upon the reopening of the distributor auxiliary contacts relay 10S5 operates and relay 10S4A locks. The distributor clutch magnet 17–20 remains operated because relay 10S4 is operated and initiates the transmission of another letters signal. During the transmission of that signal the distributor auxiliary contacts complete the circuit of relay 10S5A which operates and locks, releasing relay 11HDT and the distributor clutch magnet, and removing ground from the grid of tube 11–06 to initiate the 340-millisecond timing interval. With the distributor clutch magnet released, the distributor comes to rest at the end of transmission of the second letters signal.

At the end of the 340-millisecond interval, tube 11–06 becomes conductive and operates relay 11T which in turn operates relay 11TA. Relay 11TA operates relay 11RLS to ground the grid of tube 11–06 and to interrupt the locking circuit of relay 17ST. With tube 11–06 cut off and relay 17ST released, all of the relays release except the relay 11HD and the relay 16RX, the latter being energized because all of the skip keys for regular transmitter start codes are operated. With relay 11HD operated, relay 11HDT reoperates upon the release of relay 10S5A and initiates the timing of the two-minute waiting interval before the priority roll call cycle will again be initiated.

The operation of the transmitter start circuit under various conditions has been described upon the assumption that the outlying stations properly respond to transmitter start signals by initiating message transmission or returning the no-traffic acknowledgment signal for the character H. It may happen, however, that because of a trouble condition no response whatever will be received following the transmission of the start signal for a particular transmitter. The transmission of the start code for any transmitter is accompanied by the operation and locking of relay 10S3A which initiates a five-second timing cycle of tube 11–06. It has been previously described that the reception of the no-traffic response or of normal traffic will result in the operation of relay 17BS. In case no signals are received tube 11–06 times the five-second interval and operates relay 11T. This relay completes an operating circuit for alarm relay 17AL in a circuit traced from ground through the front contact and armature of relay 11T, conductors 11–16 and 11–17, armature 6 and back contact of relay 10S4, front contact and armature 7 of relay 10S3A, conductor 17–34, armature 2 and back contact of relay 17BS, conductor 17–48 and winding of alarm relay 17AL to battery, and that relay operates. It connects ground through its armature 2 and front contact to conductor 17–49 extending to an alarm circuit (not shown) to operate audible or visual alarms, or both. At its armature 3 it connects ground over conductor 17–51 to lamp 9–27 to light the lamp, indicating that no response has been received. It also prepares an operating circuit for relay 15SE to the skip key corresponding to the station that has failed to respond.

As previously set forth, each time a transmitter start signal is transmitted one of the transmitter lamps, such as the lamp 9–07, is lighted to indicate the particular transmitter that has been called. An attendant, noting that the no-response alarm has been given, may clear out the tie-up by operating the skip key corresponding to the transmitter lamp that is lighted. Assuming it is the lamp 9–07 that is lighted, the operator operates skip key 9–09 connecting ground through the lower make contacts of that key, back contact and armature 1 of relay 9PL1, assuming that the transmitter starting cycle in progress is a priority cycle, in which case relay 9PL1 would be unoperated, the first contact in either of the groups of connected contacts of the first contact bank of stepping switch 9SE, conductor 10–24, conductor 10–72, front contact and armature 1 of alarm relay 17AL which is operated, conductor 17–52, conductor 16–46, armature 6 and back contact of relay 16PNB, conductors 16–47 and 17–18, back contact and armature 1 of relay 17SCS, conductor 15–04, break contacts controlled by stepping magnet 15–03, conductor 17–16, back contact and armature 6 of relay 17NB, conductor 15–02 and winding of relay 15SE to battery, and that relay operates. This does not immediately cause the operation of stepping magnet 15–03 because ground for operating the stepping magnet is supplied through the front contact and armature 6 of relay 10SNB which is unoperated. However, relay 15SE does operate relay 10SNA in a path from battery through the winding of that relay, conductors 10–21 and 16–06 and armature 1 and front contact of relay 15SE to ground, and the relay 10SNA operates, operating and locking relay 10SNB. Relay 10SNB interrupts at its armature 2 and back contact the locking circuit for relay 10S3A which releases. Relay 10S3A in turn interrupts the energizing circuit for relay 17AL which releases, restoring the alarm circuit by disconnecting ground from conductor 17–49 and extinguishing the no-response lamp 9–27.

Relay 10SNB also completes the energizing circuit for stepping magnet 15–03 which interrupts the circuit of relay 15SE. This relay releases, releasing stepping magnet 15–03 which advances the contactors of stepping switch 9SE to the next assigned and unskipped position. Relay 15SE also releases slow-release relay 10SNA which in turn releases relay 10SNB. The latter relay reestablishes the circuit for the distributor clutch magnet 17–20 of the distributor in the outgoing line circuit that is being used by the transmitter start circuit and the transmission of the next transmitter start code is initiated.

It will be noted that the ground connection assumed to have been supplied from skip key 9–09 through the back contact and armature 1 of relay 9PL1 will also be applied to the contactor associated with the first contact bank of stepping switch 9PF if the position of the contactors of switch 9PF corresponds to the position of the contactors of switch 9SE. The ground connection would then be extended over conductor 9–28, back contact and armature 4 of relay 16PX, conductor 16–48, back contact and armature 4 of relay 9PL1, assumed to be released, conductor 9–29, break contacts controlled by stepping magnet 15–11 and winding of relay 15PF to battery and that relay would operate, operating stepping magnet 15–11 of stepping switch 9PF which would interrupt the energizing circuit of relay 15PF, thereby releasing stepping magnet 15–11 which would advance stepping switch 9PF one step. If the contactors of stepping switch 9PF were not in position corresponding to those of stepping switch 9SE, the circuit of relay 15PF would not be completed and stepping switch 9PF would not be advanced. Similarly, if the transmitter start cycle in progress were a regular or non-priority cycle, in which case relay 9PL1 would be operated, and assuming that skip key 9–09 represented a transmitter having both priority and non-priority codes, the ground would have been extended through the front contact and armature 1 of relay 9PL1 and would, nevertheless be applied to the same contacts of the first contact bank of stepping switch 9PF that receive the ground connection through the armature 1 and back contact of relay 9PL1. The ground connection is also applied, in either case, to the corresponding contacts of the first contact bank of stepping switch 9RF. Even though the contactors of switch 9PF occupied the position corresponding to the contactors of stepping switch 9SE, relay 15PF would not be operated because its energizing circuit was traced through the back contact and armature 3 of relay 9PL1. If the contactors of stepping switch 9RF should be occupying positions corresponding to those of stepping switch 9SE, the ground connection would be extended through the contactor of the first contact bank of stepping switch 9RF and conductor 9-31, back contact and armature 6 of relay 16RX, conductor 16-49, front contact and armature 1 of relay 9PL2 which will be operated if relay 9PL1 is operated, conductors 9-32 and 15-16, break contacts of stepping magnet 15-14 and winding of relay 15RF to battery. Contactors of stepping switch 15RF would be advanced one step in the same manner as described with reference to stepping switch 9PF.

The operator may clear out the alarm and tie-up resulting from failure of the called transmitter to return any response by restoring and reoperating stop-go key 9-01 instead of by operating the appropriate skip key. With key 9-01 restored to the condition shown in Fig. 9, ground is reconnected through its upper break contacts and conductor 9-02 to the winding of relay 16TSB to operate that relay. Relay 16TSB completes an energizing circuit for relay 16TSC traced from battery through the winding of the latter relay, armature 3 and front contact of relay 16TSB, conductor 16-51 and front contact and armature 4 of alarm relay 17AL to ground. Relay 16TSC completes an energizing circuit for relay 10S4, the circuit being traced from battery in Fig. 17 through resistor 17-53, conductors 16-38 and 16-52, front contact and armature 2 of relay 16TSC, conductors 16-53, 16-54, 10-67 and 10-49, winding of relay 10S4, conductors 10-48, 10-36 and 16-17 and armature 2 and front contact of relay 17ST to ground. Relay 10S4 interrupts at its back contact and armature 6 the energizing circuit for relay 17AL which releases, cutting off the no-response lamp 9-27 and restoring the alarm circuits. Relay 10S4 performs additional operations previously described for it, namely the grounding of the grid of tube 11-06 to cause the release of relay 11T, the setting up of the letters code combination on the contacts of the distributor and the operation of the distributor clutch magnet to initiate the transmission of the code combination. During the transmission of the code combination the distributor auxiliary contacts 17-25 complete the circuit of relay 10S4A, and upon the reopening of the distributor auxiliary contacts the relay 10S4A locks and the relay 10S5 operates over a path prepared by relay 10S4A. The distributor clutch magnet 17-20 remains energized and initiates another cycle of the distributor to cause the transmission of a second letters signal. During the transmission of that signal the distributor auxiliary contacts 17-25 complete the circuit of relay 10S5A which operates and locks. The relay 10S5A interrupts the energizing circuit for the distributor clutch magnet which causes the arrestment of the distributor at the end of the second letters signal. This sequence of operations has been previously described and the appropriate circuits have been traced.

With relay 10S5A operated, a ground connection which was supplied through the front contact and armature 8 of relay 10S4, armature 2 and back contact of relay 10S5A, conductor 10-16, back contact and armature 2 of relay 11HD and conductor 11-14 to the grid of tube 11-06, is disconnected from that grid. As in the case of the previously described operation of relay 10S5A, it connects resistors 16-23 and 16-24 in parallel with resistor 11-11 in a circuit traced from the junction of resistors 11-12 and 11-11, conductors 11-13, 10-09 and 10-59, armature 5 and front contact of relay 10S5A, conductor 10-61, resistor 16-23 and in parallel therewith a path including armature 1 and back contact of relay 16ESA and resistor 16-24, the path from these two parallel branches continuing over conductors 16-26, 10-03 and 11-07 to the junction of resistor 11-11 and condenser 11-08, the grid of tube 11-06 being connected to this junction. The timing constants of this network permit tube 11-06 to become conductive in 340 milliseconds to operate relay 11T. This relay operates relay 11TA which in turn operates relay 11RLS which releases relay 17ST. Relay 11RLS grounds the grid of tube 11-06, releasing relay 11T which in turn releases relay 11TA, the latter relay releasing relay 11RS. Relay 17ST releases all of the operated relays in the transmitter start circuit, these being the relays 10S1, 10S1A, 10S2, 10S2A, 10S3, 10S3A, 10S4, 10S4A, 10S5, 10STA, 16CSS and 16TSC. Relay 10TSB does not release because it is held operated directly by key 9-01. Resumption of operation of the transmitter start circuit is initiated by reoperation of key 9-01 to its off-normal condition, the key releasing relay 16TSB and operating relay 10TSA to initiate a priority roll call of stations. The roll call does not begin with the station which failed to respond and caused the no-response tie-up, because a priority transmitter start cycle always begins with the station next after the one which previously transmitted or next after the one at which the shift to a non-priority cycle occurred; in other words, a renewed roll call begins with the next start code after the one at which the previous roll call was suspended.

A mode of operation of the transmitter start circuit will now be described under the special condition that there is only one unskipped priority station and that that station fails to respond to its transmitter start signal. As in the case of the previously described failure of a station to respond, alarm relay 17AL operates. The operator then operates the skip key corresponding to the station which has failed to respond as indicated by the lighted transmitter lamp, such as the lamp 9-07. The operation of the skip key corresponding to the one unskipped priority station establishes the condition of all priority stations skipped and results in the operation of relay 16PX and relay 15SE. Relay 15SE operates relay 10SNA which operates relay 10SNB, the latter relay locking. Relay 10SNB operates stepping magnet 15-03 and releases relay 10S3A, these being operations described as occurring under the control of relay 10SNB in the previously described clearing of a no-response tie-up of the transmitter start circuit. Relay 10S3A releases alarm relay 17AL and grounds the grid of tube 11-06 which cuts off the tube and releases relay 11T.

Relay 10SNB also interrupts, at its armature 7 and back contact, the circuit of relay 10S1, and because relay 16PX is operated the circuit of relay 16PNB is completed from battery through the winding of that relay, conductors 16-32, 16-39 and 16-41, back contact and armature 4 of relay 10S1, conductor 10-69, front contact and armature 2 of relay 16PX and conductors 16-13 and 16-14 and armature 10 and front contact of relay 17ST to battery. Relay 16PNB releases relay 16CSS which operates relays 16SW and 17SCS and operates relays 9PL1 and 9PL2, relay 9PL1 locking both of those relays.

With the stepping magnet 15-03 operated by relay 10SNB as previously described, the stepping magnet and relay 15SE cooperate to effect the advancement of the contactors of stepping switch 9SE until they come into correspondence with those of stepping switch 9RF. When this occurs, relay 15SE becomes operated on both its windings, holding stepping magnet 16-03 operated and operating relay 16CSS which locks. Relay 16CSS releases relay 17SCS which in turn releases relay 15SE, the latter relay permitting the stepping magnet to release and advance the contactors of stepping switch 9SE of the next unskipped regular station. Relay 10SNA releases under the control of relay 15SE after its characteristic delay interval and releases relay 10SNB. With relay 10SNB released the circuit of relay 10S1 is reestablished and this relay reoperates, operating the distributor clutch magnet 17-20 in the outgoing line circuit to initiate transmission of the regular transmitter start code corresponding to the position of the contactors of stepping switch 9SE. This code is not preceded by the preliminary transmitter start pattern signals comprising blank and space with an intervening pause, because those were transmitted before the priority start code of the one unskipped priority station that failed to respond. The transmitter start circuit then proceeds with a regular transmitter start cycle in the manner previously described.

A companion condition to the one just described is a regular transmitter start cycle in which there is only one unskipped station, and that station fails to respond to its call. The following relays are operated at the time of occurrence of such a condition: 10S1, 10S1A, 10S2, 10S2A, 10S3, 10S3A, 17ST, 16CSS, 16SW, 16PNB, 9PL1 and 9PL2. Following the transmission of the regular start code for the one unskipped station, the tube 11-06 times an interval of five seconds and, not being deactivated by the incoming line circuit, since no response is received from the station, the tube times out and operates relay 11T which in turn operates alarm relay 17AL. The operator notes the occurrence of the alarm and the transmitter lamp that has been lighted in connection therewith and operates the skip key corresponding to that lamp. With all of the skip keys operated that are allotted to assigned regular transmitter start signals, the circuit of relay 16RX is completed as previously described, and that relay operates and locks. Relay 16RX provides a locking circuit for relay 10S3A traced from battery through the upper winding of the latter relay, conductors 10-46 and 10-73, varistor 16-56, front contact and armature 4 of relay 16RX, conductors 16-42, 16-39 and 16-32, armature 3 and front contact of relay 16PNB, conductors 16-13 and 16-14 and armature 10 and front contact of relay 17ST to ground. Relay 16RX also completes an energizing circuit for relay 10RNB traced from battery through the winding of that relay, conductor 10-66, back contact and armature 1 of relay 11HD, conductor 11-27, armature 6 and front contact of relay 16CSS, front contact and armature 4 of relay 16PNB, front contact and armature 1 of relay 16SW, conductor 16-44, armature 3 and front contact of relay 10S3A, conductor 10-71, front contact and armature 2 of relay 16RX and over conductor 16-42 and the remainder of the path traced in the preceding sentence to ground through armature 10 and front contact of relay 17ST.

As previously described relay 10RNB operates relays 10S4 and 11HD, the latter locking and operating relay 11HDT. Relay 10S4, in the manner previously described, connects ground to the grid of tube 11-06 to effect the release of relay 11T, sets up the letters signal on the distributor contacts in the outgoing line circuit and initiates the transmission of the letters signal. During the transmission of the signal the relay 10S4A operates upon the closure of the distributor auxiliary contacts 17-25 and prepares a circuit for the operation of relay 10S5, which operates upon the reopening of the distributor contacts, the relay 10S4 locking. The distributor clutch magnet 17-20 remains energized and initiates the transmission of the second letters signal. During the transmission of that signal relay 10S5A operates and locks in response to the closure of the distributor auxiliary contacts. It releases relay 11HDT and initiates a 340-millisecond timing cycle of tube 11-06. It also interrupts the energizing circuit for the distributor clutch magnet 17-20 which releases to arrest the distributor at the end of transmission of the second letters signal.

At the end of the timing cycle tube 11-06 operates relay 11T which in turn operates relay 11TA, the latter relay operating relay 11RLS. Relay 11RLS grounds the grid of tube 11-06 to effect the release of relay 11T, relay 11TA and relay 11RLS in succession, and also interrupts the locking circuit of relay 17ST. Relay 17ST unlocks and releases all of the operated relays except 16RX and 11HD. If all of the priority skip keys are operated the relay 16PX will be locked in the operated condition also. With relay 11HD operated a two-minute timing cycle of tube 11-06 is initiated. The release of relay 10S5A by relay 17ST results in the reoperation of relay 11HDT in a circuit traced from ground through the armature 6 and back contact of relay 10S5A, conductor 11-31, front contact and armature 6 of relay 11HD and winding of relay 11HDT to battery.

It will now be supposed that the two-minute interval is being timed following the clearing out of a no-response tie-up by operating the skip key of the one unskipped regular station and that all of the priority stations are skipped so that relays 16RX and 16PX will be locked operated and relays 11HD and 11HDT will be operated. At the end of the two-minute interval tube 11-06 operates relay 11T, and because relays 11HD and 11HDT are operated relay 11T completes the circuit of relay 11RST. Relay 11RST releases relay 11HD which in turn releases relay 11HDT and grounds the grid of tube 11-06, releasing relay 11T which releases relay 11RST. Relay 11HDT, upon releasing, seeks to complete the circuit of relay 10STA which is traced from battery through the winding of the latter relay, conductor 10-01, back contact and armature 7 of relay 16ESA, conductor 16-01, armature 3 and back contact of relay 17BS,, armature 1 and back contact of relay 17BSA, conductor 17-01, armature 3 and back contact of relay 11HDT, back contact and armature 7 of relay 11HD, conductor 11-01 to armature 5 of relay 16PX and armature 5 of relay 16RX. It having been assumed that both of these relays are operated, the path ends at those armatures, which have no connected front contacts, and thus the relay 10STA cannot be operated to initiate a transmitter start cycle as long as all skip keys are operated. Upon the release of one skip key, relay 16PX or 16RX will release and the circuit of relay 10STA will be completed to initiate a roll call of stations either for priority traffic or regular traffic, depending upon whether relay 16PX or 16RX is released. In all probability an operating condition in which all skip keys are operated would be abnormal and an operator would deactivate the transmitter start circuit merely by restoring key 9-01 to the normal condition. However, in the event that the operator fails to take that action, idle operation of stepping switch 9SE will be precluded by preventing the energization of relay 10STA when relays 16PX and 16RX are both operated.

*Emergency stop*

An emergency stop key 9-33 is provided for interrupting and suspending incoming transmission from a transmitter. For the description of this feature it will be assumed that an outlying transmitter has been started under the control of the transmitter start circuit and that the message is being received by the incoming line circuit. Relays 17BS and 17BSA are operated in this condition of the transmitter start circuit and relay 17ST is unoperated. In order to interrupt incoming transmission and prevent transmission of the next transmitter start signal the operator restores key 9-01 to the normal condition and momentarily operates emergency stop key 9-33. With key 9-01 restored to normal the energizing circuit of relay 16TSB is established at the upper break contacts of the key and that relay operates. During the interval that emergency stop key 9-33 is closed, an energizing circuit for relay 16ES is completed, the circuit being traced from battery through the winding of that relay, armature 4 and back contact of relay 16TSC, armature 2 and front contact of relay 16TSB, conductor 16-57, closed key 9-33, lower break contacts of key 9-01, conductors 9-03 and 16-03 and armature 5 and back contact of relay 17ST to ground. Relay 16ES locks through its front contact and armature 3, armature 1 and front contact of relay 16TSB, conductors 16-58 and 17-09 and back contact and outer armature of relay 11RLS to ground. At its armature 2 and front contact it completes an energizing circuit for relay 10STA traced from battery through the winding of that relay, conductor 10-01, back contact and armature 7 of relay 16ESA, front contact and armature 2 of relay 16ES, conductor 16-03, armature 5 and back contact of relay 17ST to ground. Relay 10STA operates relay 10STB, as previously described, disconnects ground from the grid of tube 11-06 and initiates a 300-millisecond timing cycle of the tube and interrupts outgoing transmission over channel 1-03 if there is such transmission, seizing a distributor in the outgoing line circuit for use by the transmitter start circuit. At the end of the timing cycle of tube 11-06 relay 11T operates and completes the circuit of relay 17ST which operates and locks to relay 11RLS. Relay 17ST interrupts the previously traced energizing circuit for relay 10STA and that relay releases, grounding the grid of tube 11-06 and releasing relay 11T. Relay 10STA interrupts the circuit of relay 10STB which has a slow-release characteristic. Upon its release the relay 10STB completes the circuit of relay 10S1 traced from battery through the winding of that relay, conductors 10-26 and 10-74, front contact and armature 6 of relay 16ES, conductor 16-59, back contact and armature of relay 10STB, conductor 10-76 and conductors 16-13 and 16-14 to ground through armature 10 and front contact of relay 17ST.

Relay 10S1 completes the circuit of relay 16ESA, traced from battery through the winding of that relay, front contact and armature 1 of relay 16ES, conductor 16-61, armature 3 and front contact of relay 10S1, conductors 10-77, 16-58 and 17-09 and back contact and outer armature of relay 11RLS and relay 16ESA operates. It locks through its armature 3 and front contact to the locking circuit for relay 16ES. At its armatures 4, 5 and 6 the relay 16ESA interconnects through the associated front contacts the conductors 17-12a, 17-12d and 17-12e and extends a connection from them over conductor 16-62 to the front contact associated with armature 4 of relay 10S2. A path is also traced from that front contact over conductor 10-38, back contact and armature 5 of relay 10S3 and conductors 10-37 and 16-18 to conductor 17-12c, so that conductor is interconnected with conductors 17-12a, 17-12c and 17-12d. These connections are established in preparation for the coding of the code combination for the character X which has its first, third, fourth and fifth elements of marking nature and element 2 of spacing nature. Conductors 17-12a, 17-12c, 17-12d and 17-12e extend to the transmitter in the outgoing line circuit and represent the first, third, fourth and fifth elements of permutation code combinations, as previously described. The actual application of the code combination for the character X to the contacts of the distributor awaits the operation of relay 10S2.

Relay 10S1 performs additional operations as previously described, namely the disconnection of ground from the grid of tube 11-06 and the association of resistor 10-29 in parallel with resistor 11-11 to establish a 500-millisecond timing cycle of tube 11-06. Relay 10S1 also energizes the distributor clutch magnet 17-20 to initiate the transmission of the code combination coded on the distributor contacts. The condition of the conductors 17-12 is that there is no connection from any of them to conductor 10-39, which is grounded in the outgoing line circuit and represents one side of the transmission circuit, so that as the distributor operates no marking elements will be generated and the code combination transmitted will be a blank combination, as in the initiation of any transmitter start cycle. During the transmission of the blank code combination relay 10S1A operates in response to the closure of the distributor auxiliary contacts 17-25, and interrupts the circuit of the distributor clutch magnet 17-20 so that the distributor will be arrested at the end of transmission of the blank signal. Relay 10S1A locks operated.

At the end of the 500-millisecond timing interval tube 11-06 operates relay 11T over a previously traced circuit and this relay operates relay 10S2 which locks, grounds the grid of tube 11-06 to release relay 11T, and reenergizes the distributor clutch magnet. With relay 10S2 operated conductor 10-39 is connected through the armature 4 and front contact of the relay to distributor code conductors 17-12a, 17-12c, 17-13d and 17-12e to code the character X on the distributor contacts. With the clutch magnet 17-20 energized the distributor transmits the code for the character X. Relay 10S2A operates during the transmission of the X signal in response to the closure of the distributor auxiliary contacts 17-25. At its upper armature relay 10S2A interrupts the circuit of the distributor clutch magnet 17-20 to cause the arrestment of the distributor at the end of transmission of the X signal. Upon the opening of the distributor auxiliary contacts ground is disconnected from the energizing circuit of relay 10S2A and a circuit for locking relay 10S2A and for operating relay 10S4 in series therewith is activated, the circuit being traced from the winding of relay 10S2A through its lower armature and front contact, conductor 10-41, armature 4 and front contact of relay 16ES, conductors 16-50, 16-54, 10-67, 10-49, winding of relay 10S4, conductors 10-48, 10-36 and 16-17 and armature 2 and front contact of relay 17ST to ground. It will be noted that because relay 16ES is now operated the operation of relay 10S4 is not dependent upon the operation of relays 10S3 and 10S3A.

As in the previous descriptions of operation of relay 10S4 it sets up the letters code combination and initiates operation of the distributor by completing the circuit of the distributor clutch magnet 17-20. During the transmission of the letters signal relay 10S4A operates in response to closure of the distributor auxiliary contacts. Upon the reopening of those contacts relay 10S5 operates in series with relay 10S4A through the armature and front contact of that relay, the operating circuit of relay 10S5 also being the locking circuit for relay 10S4A. The distributor clutch magnet remains operated and initiates the transmission of the second letters signal. With relay 10S5 operated relay 10S5A operates under the control of the distributor auxiliary contacts, interrupting the circuit of the distributor clutch magnet which arrests the distributor at the end of the second letters signal. Relay 10S5A locks operated and initiates a timing cycle of tube 11-06 having a duration of 1.10 seconds. At the end of that interval tube 11-06 operates relay 11T which operates relay 11TA which in turn operates relay 11RLS. Relay 11RLS causes the release of all of the relays in the transmitter start circuit except relays 17BS, 17BSA and 16TSB.

It will be assumed that the emergency stop signal comprising the code combinations for blank and X with an intervening pause of 500 milliseconds, and followed by two letters signals, is transmitted by the transmitter start circuit during the transmission of the message from station 1-07 addressed to station 1-09. The condition of the station control circuit contained in Figs. 6 and 12 is that relays 12T2 and 12P2 are operated and locked. Relays 12M2 and 12M2A are also operated and locked. These are the relays that are involved in initiating transmission from transmitter 1-51.

In response to the blank signal followed by the pause the contacts 6-06 close, completing the circuit of relay 12BP which operates. As previously described relay 12BP disconnects from the armature of receiving relay 6-01 the transmission paths to the receiving teletypewriters in Fig. 18 to prevent the response thereof to the signals which follow and comprise the emergency stop signal, if either of the receiving teletypewriters had been connected through to the armature of receiving relay 6-01 and was receiving a message. Following the pause the monitoring selector unit 6-04 responds to the signal for the character X and emergency stop contacts 6-29 close and lock in response to that code combination, the selectable member which operates contacts 6-29 having been unblocked in response to the blank signal. Contacts 6-29 connect ground over conductors 6-31, armature 1 and front contact of relay 12M2A, conductors 12-16 and 12-17 and winding of relay 12EM to battery and this relay operates. Relay 12EM locks through its armature 1 and front contact, conductor 12-18 and lower break contacts of alarm release key 6-32 to ground. At its armature 2 the relay 12EM interrupts the locking circuit for relay 12M2 by disconnecting battery from the winding of the latter relay, thereby releasing it. Relay 12M2 interrupts at its armature 2 the previously traced energizing circuit for start magnet 18-04 of transmitter 1-51, thereby suspending transmission from that transmitter. At its armature 4 relay 12EM connects ground over conductors 12-19 and 12-21, front contact and armature 3 of relay 12M2A, conductor 12-22 and emergency stop lamp 6-33 to battery and that lamp lights, indicating that transmission has been stopped on an emergency basis and that the transmitter 1-51 had been in operation. If transmitter 1-12 had been in operation instead the circuit of lamp 6-34 would have been completed through the front contact and armature 3 of relay 12M1A.

At its armature 6 and front contact relay 6 connects ground over conductor 12-23 to the winding of relay 6AL and that relay operates, locking through its armature 1 and front contact and the upper break contacts of key 6-32 to ground. At its armature 2 and front contact relay 6AL lights alarm lamp 6-36 to indicate that alarm relay 6AL has operated. At its armature 3 and front contact relay 6AL connects battery through the back contact and upper armature of relay 6CO, interrupter contacts of buzzer 6B, the winding of the buzzer to ground. This results in the giving of an audible alarm as well as the visual alarm provided by the lamp 6-36.

The buzzer may be silenced by the operation of the buzzer release key 6-37 which completes the energizing circuit of buzzer cut-off relay 6CO. This relay interrupts the circuit of buzzer 6B at its upper armature and back contact and locks through its front contact and lower armature and armature 4 and front contact of relay 6AL to ground.

Following the signal for the character X the monitoring selector unit 6-04 receives the first of the two letters signals. The response of the unit to the letters signal results in the unlocking of emergency stop contacts 6-29 which open. It will be remembered that when the space signal was received following the pause in the transmitter start pattern, it caused the operation of contacts 6-09 and the operating member for those contacts became latched in the operated condition and latched the operating member for the blank pause responsive contacts 6-06. As previously described, the contacts 6-06 were operated by a mechanical timing mechanism that was tripped off for a timing cycle in response to the blank code combination. The length of the dwell on the cam that closes contacts 6-06 is such, in relation to its angular velocity, that contacts 6-06 remain closed for a minimum interval of 1.5 seconds. Since the space signal which causes the latching of those contacts is received less than 1.5 seconds after the closure of contacts 6-06 and latches those contacts, they remain closed after the dwell on the cam passes out of controlling relation to the contacts. The operating member for the contacts 6-06 does not become latched operated in response to the emergency stop signal which causes the closure of contacts 6-29, and is the code combination representing the character X, so that contacts 6-06 open under the control of their operating cam 1.5 seconds after they closed. Upon the opening of these contacts relay 12BP releases, restoring the transmission paths over which line relay 6-01 may repeat signals on transmission channel 1-03 to either of the teletypewriter receivers in Fig. 18.

The operation of the alarm lamp 6-36 and buzzer 6B serves as a directive to the operator or attendant at station 1-07 to reset the tape in transmitter 1-51 for the retransmission of the message from the beginning. The alarm relay 6AL may be restored by momentarily operating alarm release key 6-32. This key interrupts the locking circuit for relay 12EM which releases. It extinguishes lamp 6-33 and interrupts the energizing circuit of relay 6AL, which, having its locking circuit interrupted at the upper break contacts of alarm release key 6-32, releases. Relay 6AL extinguishes the alarm lamp 6-36 and stops the operation of buzzer 6B, or if the buzzer had been disabled by the operation of cut-off relay 6CO, the relay 6AL unlocks the cut-off relay and it releases.

*Routing of received message through switching center*

As previously set forth, messages incoming over channel 1-02 from the multistation line are repeated by line relay 21L to select magnet 22-01 of reperforator unit 22-02. The message, preceded by signals including the call directing code, such as the signals for the characters CD in the case of the message heretofore assumed to have originated at station 1-07 directed to station 1-09, is recorded in the form of perforations in tape 22-16. The tape emerging from reperforator 22-02 enters a tape sensing mechanism 22-17 in which the code combinations are sensed by tape sensing levers 22-18 under the control of transmitter cam shaft 22-19. Cams carried by shaft 22-19 cause the marking or spacing character of the signal elements of the code combinations to be registered in slides 22-21. Slides 22-21 control sets of contact assemblies, some of which are connected to decode certain of the code combinations, such as the end-of-message signal comprising the code combinations for figures and H, which cause a disconnect function, and certain signals that are to be discarded. The extreme left-hand pair of contacts in each assembly or set of contacts is connectable through director circuit 22-22 to normally open distributor contacts 22-23 which are closable in timed succession by distributor cams carried by distributor shaft 22-24.

Figure 2:
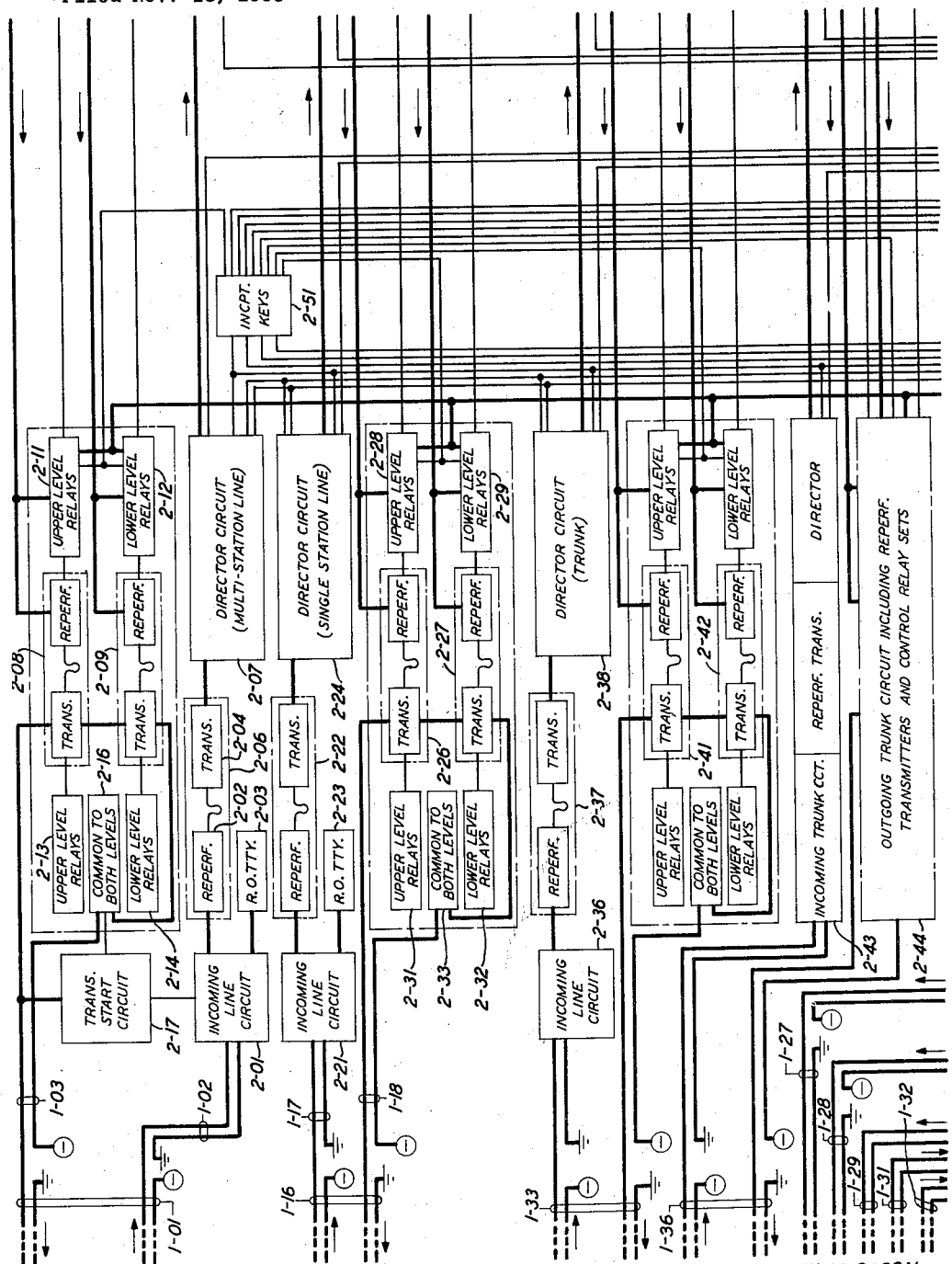

Director circuit 22-22 has the function of decoding the address code preceding a message for the purpose of routing the message to the proper outgoing channel over which the message is to be transmitted to the addressed station. It is represented in Fig. 22 merely by a labeled rectangle and the corresponding director circuit is indicated in Fig. 2 by labeled rectangle 2-07. Referring to Figs. 2 to 5, inclusive, director circuit 2-07, having decoded the address code CD, seeks access to the crossbar switch contained in Figs. 3 and 5 under the control of sequence circuit 4-01. Upon obtaining from the sequence circuit permission to use the crossbar switch, it operates select magnet 3-01 and tests the outgoing line circuit for outgoing channel 1-03 of the multistation line to determine whether either of the reperforator-transmitter units 2-08 and 2-09 is idle. Upon finding that one of them is idle, the director circuit causes the operation of the corresponding hold magnet 5-01 or 5-16 to establish a transmission connection from distributor contacts 22-23 to the select magnet of the reperforator of reperforator-transmitter unit 2-08 or 2-09. Thereupon the message, preceded by the address code CD and followed by the disconnect signal figures and H, is transmitted by contacts 22-23 to the connected reperforator, and the message is recorded in tape in that reperforator.

Figure 17:
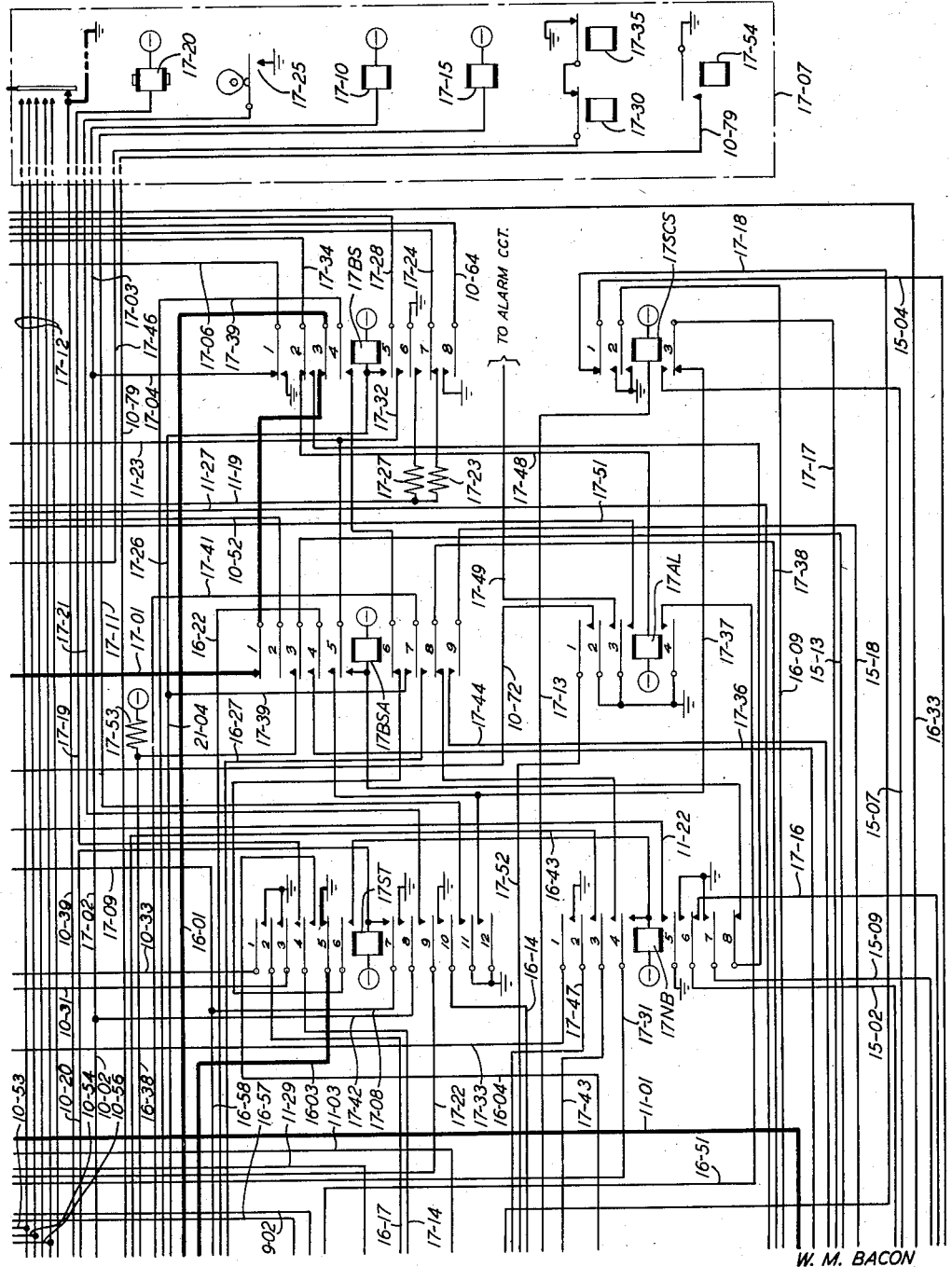

The transmitters of reperforator-transmitter units 2-08 and 2-09 are given access to outgoing channel 1-03 alternately for the transmission of messages contained in the perforated tapes produced by their associated reperforator units. The transmitter 17-07 in Fig. 17 is representative of the transmitter of one of the reperforator-transmitter units 2-08 and 2-09 by which messages are transmitted over outgoing channel 1-03. The transmitter start circuit has access to either of the transmitters for transmitting the transmitter start signals and will interrupt outgoing message transmission for the purpose of sending transmitter start signals, as previously described. In this connection, it should be noted that in the hereinbefore identified copending application of Bacon et al., it is set forth that the seizure of a transmitter by the transmitter start circuit should be precluded when the transmitter is in the process of transmitting certain sequences of code combinations. For example, if the transmitter start circuit should attempt to seize a transmitter which is in the process of transmitting the end-of-message sequence comprising figures and H, the seizure will be delayed until the transmission of that sequence of code combinations has been completed, because the insertion of the transmitter start pattern between the signals for figures and H would result in faulty operation of the station control circuit. That feature is present in the system herein disclosed also, specifically in conductor 10-79 extending from the battery terminal of the winding of relay 10STA to trasmitter 17-07 where it may receive ground connection through armatures and front contacts of several combinations of relays, represented by the single relay 17-54. When the outgoing line transmitter is in the process of transmitting any of the crticial sequences of code combinations, conductor 10-79 will be grounded, thereby shunting the winding of relay 10STA and preventing its operation for the purpose of initiating a transmitter start cycle until the ground on conductor 10-79 shall have been removed.

*Reception of message at station control circuits*

Consideration will now be given to the operations that result from retransmission of a message from the switching center. It will be assumed that the message is preceded by the address code CD and is the message that originated at station 1-07, the station identified by the address code CD being the station 1-09. Since the message addressed to station 1-09 was assumed to be a single message or the first of a group of messages to be transmitted in succession, the address code CD was preceded by letters signals, the end-of-message signal comprising a figures signal and an H signal and one or more letters signals to assure that the switching apparatus at the switching center would be in the proper condition to make a selection in response to the address code. The letters signals and the disconnect signals that preceded the address code CD in the tape as produced by reperforator 22-02 were discarded by director circuit 22-22 (2-07) so that the first signals received by the monitoring selector units are the signals comprising the address code. Each of the monitoring selector units 6-04, 7-04 and 8-04 is assumed to have been placed in the activate condition by the disconnect signal terminating the message last previously received, whereby the monitoring selector units are mechanically conditioned to interpret received character code combinations as address codes, the conditioning involving the disabling of a blocking member for the various selectable elements that are selectable to prepare for or effect the operation of switching contacts. The manner in which the monitoring selector units are placed in the active condition and the nature of that condition is fully described in the previously identified copending application of W. M. Bacon et al. The blocking member which is disabled in the activate condition is shown in Fig. 25 of the drawings accompanying the present specification as will be more specifically described hereinafter. In response to the code combination for the character C, which is the first of the two signals comprising the address code of station 1-09, the first of two sequentially selectable members associated with each of the code contacts having the character C as the first character of their assigned address codes in monitoring selectors 6-04, 7-04 and 8-04 operates to unblock the second of the sequentially selectable elements. The code contacts that are so assigned and that have their first selectable elements thus selected are the contacts 6-38, 6-39, 6-41, 6-42, 7-11, 7-12, 8-11, 8-12 and 8-13.

Following the code combination for the character C, the code combination for the character D is received. Contacts 6-42 in the monitoring selector unit 6-04 and contacts 8-13 in monitoring selector 8-04 will be closed in response to the code combination because their operated selectable members are responsive to the code combination and have been unlatched by the associated selectable members that responded to the code combination for the character C. All others of the contacts enumerated above, namely contacts 6-38, 6-39, 6-41, 7-11, 7-12, 8-11 and 8-12 will not be operated because the selectable elements that operate them are responsive to the signals for characters other than the character D. Moreover, the selectable members that preparatorily unblocked, in response to the code for the character C, the selectable members for operating those contacts, and that became latched in the operated condition, will be released and restored in response to the code for the character D, because the monitoring selector units are arranged to restore selectable elements that operate in response to the first of a sequence of two codes when the next received code is not the second code of the sequence.

With contacts 8-13 operated and latched, ground is connected over conductor 8-14 and winding of relay 8S1 to battery and that relay operates. With relay 8S1 operated, a path is traced from the armature of line relay 8-01 over conductor 8-16, the lower break contacts of key 8-17, conductor 8-18, back contact and armature 2 of relay 14BP, conductor 14-01, front contact and armature of relay 8S1, conductor 8-19 and operating winding of repeating relay 20-01 of teletypewriter 1-52 at station 1-09. The armature of relay 20-01 is connected to battery and the marking contact is connected through the winding of selector magnet 20-02 of the receiving teletypewriter to ground. Relay 20-01 is thus rendered responsive to the operation of line relay 8-01 and the transmission is on an inverse neutral basis, relay 20-01 being biased to marking and the operating winding of relay 20-01 being energized to interrupt the circuit of selector magnet 20-02 when line relay 8-01 responds to spacing. In this way relay 8S1 has connected the receiving teletypewriter at station 1-09 to line relay 8-01 in response to the address code CD. The transmission path from relay 8-01 to station 1-09 has been traced through a back contact and armature of relay 14BP. It is at that armature and back contact that the relay 14BP, upon being energized in response to the blank pause sequence of the transmitter start pattern, will disconnect the receiving teletypewriter at station 1-09 from line relay 8-01 so that the teletypewriter will not respond to the remaining signals of the transmitter start pattern. Because of the inverse neutral mode of transmission to relay 20-01, the relay remains in the marking condition when it is disconnected from line relay 8-01.

Reference is made to the fact that contacts 6-42, also coded to respond to the address code CD, operated in response to that address code when contacts 8-13 in monitoring selector unit 8-04 operated. The reason for the closure of contacts 6-42 will be described hereinafter.

The signals that follow the address code CD are, as set forth earlier in this specification, a letters signal, a carriage return signal and line feed signal, a letters signal followed by signals representing the destination of the message in text form and the body of the message. The letters signal following the address code CD provides a time interval for completion of the switching operation in the station control circuit but performs no specific function. In response to the carriage return and line feed signals the previously mentioned blocking member for the selectable elements that control the code contacts is moved into blocking relation to those selectable elements, this being the deactivation of the monitoring selector unit to prevent the response of station connecting code contacts to signals contained in the body of the message. Contacts 8–13 remain operated during the interval in which the monitoring selector unit is in the deactivate condition, thereby maintaining relay 8S1 operated and receiving teletypewriter 1–52 connected to line relay 8–01.

The teletypewriter 1–52 remains connected until the disconnect signal comprising the code combinations for figures H and letters is received. In response to this sequence of code combinations the latch for holding contacts 8–13 is disabled and those contacts open, releasing relay 8S1 and thereby disconnecting teletypewriter 1–52 from line relay 8–01. The disconnect signal is also the activate signal for the monitoring selector unit and is effective to unblock the selectable elements for the codes so that signals thereafter received, except those pertaining to the starting of transmitters or the emergency stopping of transmitters will, if they are in the proper sequences, cause the connection of teletypewriter printers to receive messages that follow the address codes.

*Monitoring all address codes*

The monitoring selector units 6–04, 7–04 and 8–04 are provided with deactivate contacts 6–07, 7–07 and 8–07, respectively, that are selectively operated in response to the line feed signal of the deactivate sequence which is carriage return line feed, and these contacts latch-operated and remain operated until the disconnect signal, which is also the activate signal for the monitoring selector units, is received. Referring to monitoring selector unit 8–04, contacts 8–07 connect ground over conductor 8–21 and winding of relay 8LF to battery, and that relay operates. With relay 8LF unoperated, a path is traced from the armature of line relay 8–01, over conductor 8–16, the break contacts of key 8–17, conductor 8–18, back contact and armature 2 of relay 14BP, conductor 14–01, back contact and armature of relay 8LF, back contact and armature of relay 8S1 and conductor 8–19 to the operating winding of repeating relay 20–01 of teletypewriter 1–52. This path represents a feature of the invention, namely that the receiving teletypewriter 1–52 is connected to the line relay 8–01 when the monitoring selector unit 8–04 is in the activate condition, for the purpose of enabling teletypewriter 1–52 to record all address codes transmitted over channel 1–03, whether or not the messages following such address codes are addressed to station 1–09. Upon the operation of relay 8LF in response to the deactivate signal, this path is opened at the armature and back contact of the relay and station 1–52 will not record the message unless it has been specifically selected by its code contacts. There may be various circumstances under which it may be desirable for one or more stations to monitor all address codes transmitted, and this arrangement provides for such monitoring reception of address codes. The alternative condition which is that a receiving teletypewriter shall not monitor address codes nor, in fact, record the address code by which it may be selected is indicated, with reference to the other receiving teletypewriter in Fig. 20, controlled by monitoring selector unit 8–04, in that the armature of relay 8S2 is not provided with a back contact connected to the armature of relay 8LF. When the disconnect signal is received contacts 8–07 are unlatched and relay 8LF releases.

*Preventing loss of messages with garbled address codes*

It was stated previously that contacts 6–42 close in response to the address code CD at the same time that contacts 8–13 close in monitoring selector unit 8–04. The closure of contacts 6–42 results in the connection of ground to conductor 6–43. It will be noted that the closure of contacts 6–39, 6–41, 6–44, 6–46, 6–47 or 6–48 also results in the connection of ground to conductor 6–43. Contacts 6–39 are responsive to the address code CF as are contacts 7–11 of monitoring selector unit 7–04. Contacts 6–41 are responsive to address code CC as are contacts 8–12 in monitoring selector unit 8–04. Contacts 6–44 are responsive to address code GA as are contacts 7–13 in monitoring selector unit 7–04. Contacts 6–46 are responsive to address code GX as are contacts 7–14 in monitoring selector unit 7–04. Contacts 6–47 are responsive to address code BR as are contacts 7–16 in monitoring selector unit 7–04. Contacts 6–48 are responsive to address code GJ as are contacts 8–22 in monitoring selector unit 8–04. In other words, monitoring selector unit 6–04 has code contacts responsive to address codes, both individual and group, of stations served by all other monitoring selector units associated with channel 1–03. This duplication of code contacts relates to a feature of the invention now to be described, in accordance with which a message transmitted over channel 1–03 preceded by an address code which is not assigned to any of the stations associated with channel 1–03, and which may be presumed to have resulted from garbling of a valid address code, since the message was routed in the switching center to the outgoing line circuit serving channel 1–03, will not be lost but will be recorded by one of the receiving teletypewriters served by monitoring selector unit 6–04.

Consideration will first be given to the response of monitoring selector unit 6–04 to a valid address code representing a station served by one of the other monitoring selector units, namely the response of the contacts 6–42 to the address code CD. The ground connection is extended over conductor 6–43 to relay 6CK which operates. The transmission path from the armature of line relay 6–01 is traced over conductor 6–51, break contacts of key 6–12, conductor 6–13, back contact and armature 2 of relay 12BP, conductor 12–02, back contact and upper armature of relay 6CK, armature 2 and back contact of relay 6S2 to the front contact associated with armature 3 of relay 6LF. This armature is connected through the back contact and lower armature of relay 6S1 to conductor 6–52 which extends to the operating winding of receiving relay 18–16 of receiving teletypewriter 1–11. Conductor 12–02 is connected through armature 2 and back contact of relay 6LF and back contact and lower armature of relay 6S1 to conductor 6–52 so that teletypewriter 1–11 will receive any address codes transmitted over channel 1–03, as in the case of the address code monitoring arrangement described with reference to relay 8LF in Fig. 8. With relay 6CK operated a transmission path to teletypewriter 1–11 that would be completed through the front contact and armature 3 of relay 6LF, upon the operation of that relay in response to the deactivate signal, is interrupted at the upper armature of relay 6CK, so that teletypewriter 1–11 will not respond to a message preceded by an address code which causes the operation of relay 6CK. The contacts which completed the energizing circuit for relay 6CK latch in the operated condition and those contacts thus remain closed until the activate signal, which is also the disconnect signal, is received. However, when signals are received while the monitoring selector units are in the activate condition, which do not represent a valid address code of any station associated with channel 1–03, relay 6CK will not be operated. Upon the response of relay 6LF to the deactivate signal the transmission path to teletypewriter 1–11 that is interrupted at the armature 2 and back contact of that relay is reestablished through its armature 3 and front contact, so that teletypewriter 1–11 will receive the message. When teletypewriter 1–11 is selected in response to its own address code by the operation of relay 6S1 the transmission path is established through the front contact and lower armature of that relay from conductor 12–02 to conductor 6–52, and the alternative path including the upper armature of relay 6CK, armature 2 of relay 6S2 and armature 3 of relay 6LF is interrupted at the lower armature and relay 6S1. When teletypewriter station 1–56 is selected in response to one of its assigned address codes by the operation of relay 6S2 the path is interrupted at the armature 2 and back contact of relay 6S2. Thus teletypewriter 1–11 receives any message transmitted over channel 1–03 when relays 6S1, 6S2 and 6CK are unoperated and relay 6LF is operated.

With the relays in this condition, a path is traced from ground through the armature 1 and front contact of relay 6LF, back contact and upper armature of relay 6S1, armature 1 and back contact of relay 6S2, back contact and lower armature of relay 6CK and conductors 6–53 and 12–23 to alarm relay 6AL which operates, lighting lamp 6–36 and operating buzzer 6B. The bringing in of the alarm in conjunction with response of teletypewriter receiver 1–11 to a message serves as notice to an operator to investigate and take appropriate steps to have the message retransmitted to its proper destination. This may be done by reading the address that is in text form, preparing a new tape containing the message preceded by the proper address code and inserting it into transmitter 1–12 for transmission.

Selection of stations by group codes

The address code CQ which causes the operation of contacts 6–38 in monitoring selector unit 6–04, contacts 7–12 in monitoring selector unit 7–04 and contacts 8–11 in monitoring selector unit 8–04, is a group code. It is assigned to select all of the receiving teletypewriters served by each monitoring selector unit. Similarly, the address code CF which causes the closure of contacts 7–11 to select both receiving teletypewriters served by monitoring selector unit 7–04 is a group code. Upon the operation of group code contacts, such as the contacts 6–38 in monitoring selector unit 6–04, ground is connected over conductor 6–54 to the winding of relay 6G which operates. Contacts 6–38, upon closing, latch in the operated condition until the activate signal is received. Relay 6G connects ground through its two armatures to the windings of relays 6S1 and 6S2 to cause those relays to operate just as if they had been operated through their individual code contacts 6–56 and 6–57, respectively. Not only may a plurality of stations be selected by group codes, but also by individual address codes to receive a single message. A plurality of address codes preceding a message will cause the operation and latching of the corresponding code contacts in the individual monitoring selector units to cause the connection of the corresponding receiving teletypewriter to the line relay. The address codes preceding a message may be individual address codes or group address codes or both.

Reperforator tape feed-out mechanism

Receiving teletypewriter 1–16 served by monitoring selector unit 7–04 has been indicated as a typing reperforator. It is selectable by the operation of relay 7S2 controlled by monitoring selector 7–04. When messages are recorded on a typing reperforator it is frequently desirable to feed out automatically a length of tape following the disconnect signal at the end of the message in order that the last significant signals of the message shall be fed out of the punch block of the reperforator and in order that they may be advanced out of a transmitter when the tape is placed therein for retransmission. An automatic arrangement for accomplishing this is contained in Fig. 13. When relay 7S2 is operated to establish a transmission connection to typing reperforator 1–16 ground is extended through its outer lower armature and front contact and over conductor 7–17, break contacts controlled by key 7–18, conductor 7–19 and winding of relay 13C to battery and that relay operates. Relay 13C completes the circuit of relay 13B through armature 2 and front contact of the former relay. It also grounds the grid of electron discharge tube 13–01. Relay 13B locks through its armature 3 and front contact and break contacts of relay 13A2. At its armature 1 and front contact relay 13B completes the filament circuit for tube 13–01.

At the end of the message being transmitted to typing reperforator 1–16, the disconnect signal causes the release of relay 7S2 which in turn releases relay 13C. With the latter relay released a circuit is traced from ground through the upper armature and back contact of relay 13D, the upper armature and back contact of relay 13C, armature 2 and front contact of relay 13B, conductor 13–02 and winding of tape feed-out magnet 19–01 of the typing reperforator to battery. Tape feed-out mechanism 19–01 initiates a tape feeding operation in the manner described in the Bacon et al. application hereinbefore identified. With relay 13C released ground is disconnected from the grid of tube 13–01 and condenser 13–03 begins to charge. Upon the charging of the condenser sufficiently to render tube 13–01 conductive, the discharge current in that tube operates relay 13A2, interrupting at its break contacts the locking circuit for relay 13B which releases. Relay 13B interrupts the circuit of tape feed-out mechanism 19–01, which suspends the tape feeding operation and also opens the filament circuit of tube 13–01 thereby causing the release of relay 13A2.

It may happen that during the tape feeding operation another message is received for typing reperforator 1–16. It is necessary to suspend the tape feeding operation in order that the reperforator shall be in the proper condition to record received signals. Moreover, there is no necessity for feeding out additional tape under the control of tape feed-out magnet 19–01, because the tape will be fed as received signals are recorded. When the monitoring selector unit 7–04 responds to the first character code of the transmission, universal contacts 7–08 will close momentarily, extending ground over a path including armature 1 and back contact of relay 7LF, conductor 7–21 and winding of relay 13D to battery and this relay will operate. At its lower armature the relay 13D discharges condenser 13–03. At its upper armature it interrupts the energizing circuit of tape feed-out magnet 19–01, which releases and suspends the tape feed-out operation. Relay 13D is a slow-release relay so that it does not immediately reestablish an energizing circuit for tape feed-out magnet 19–01. Typing reperforator 1–16 is selectable by the operation of relay 7S2 in response to the closure and locking of contacts 7–14 or 7–16. As in the case of the previously described operation of relay 7S2, relay 13C operates but relay 13B has remained locked. When the carriage return, line feed and letters signal are received following the address code, the deactivate contacts 7–07 close and lock, completing the circuit of relay 7LF which operates. Relay 7LF interrupts the circuit of relay 13D so that that relay cannot be reoperated. The tape feed-out control circuit is now in the condition as previously described during the reception of a message by typing reperforator 1–16, that condition being one of preparedness for initiating a tape feed-out operation following the disconnect signal.

A different operation occurs when signals are received for a different station while a tape feed-out operation is taking place in reperforator 1–16. The first received code signal will cause the operation of relay 13D as previously described, causing the discharge of condenser 13–03 and the release of tape feed-out magnet 19–01. Relay 7S2 will not be operated because the message is not addressed to typing reperforator 1–16. Upon the operation of the deactivate contacts 7–07 following the address codes, relay 7LF will be operated, thereby disabling relay 13D. With relay 13D released, the circuit of tape feed-out magnet 19-01 is reestablished at the upper armature and back contact of relay 13D. Relay 13B has remained locked because relay 13A2 has not yet operated. Relay 13C will not have operated because relay 7S2 has not operated, and with the shunt around condenser 13-03 removed at the lower armature and front contact of relay 13D that condenser begins to recharge and a full tape feed-out cycle is added to the partial cycle that was interrupted by the operation of relay 13D. When condenser 13-03 has become charged, tube 13-01 conducts and operates relay 13A2 thereby suspending the tape feed-out operation in the manner previously described.

*Line release delay circuit*

Fig. 12 contains a circuit for delaying the release of transmitting channel 1-02 by a transmitter for a timed interval following the completion of transmission of a message from a tape which included an end-of-message signal but not at end-of-transmission signal. The purpose of the delay circuit is to provide an interval in which an attendant could insert another message tape and initiate transmission of the message following the previous message and without waiting for transmission to be initiated in the next regular turn of the transmitter under the control of the transmitter start circuit at the swiching center. The circuit comprises relay 12A1 and electron discharge tube 12-24.

It will be assumed that transmitter 1-06 has been transmitting and has completed transmission of the message, and that relays 12T1 and 12P1 release as a result of the opening of contacts 18-17 when the tape runs out of transmitter 1-12. With relay 12T1 released, a shunt across condenser 12-26 is removed, the shunting path being traced over conductor 12-27 and armature 3 and front contact of relay 12T1 to battery. This permits condenser 12-26 to charge through resistor 12-28 to ground. Condenser 12-26 is connected to the grid of tube 12-24 and in approximately 20 seconds the tube is rendered conductive to operate relay 12A1. This relay interrupts the holding circuit for relay 12M1, traced from ground through the back contact and armature 3 of relay 12BP, the armature and back contact of relay 12A1 and conductors 12-29, 12-31 and 12-32 and armature 4 and front contact of relay 12M1 to the winding of that relay. Relay 12M1 interrupts the shunt across the H sending contacts 6-14 and interrupts the filament circuit of tube 12-24 which causes relay 12A1 to release. As set forth previously, the final operation in the restoration of a transmitter control circuit to normal following the feeding of the tape out of the transmitter is the release of relay 12M1 or 12M2. If within the 20-second interval an operator had placed another tape in the transmitter, causing the closure of contacts 18-17 and the operation of relay 12T1, relay 12M1 would have been held operated by relay 12T1 and would not have released.

In the event that a transmitter loses control of the transmission channel by the timing out of the line release delay circuit, the incoming line circuit at the switching center will not receive an end-of-transmission signal. That circuit is provided with a timing circuit for timing an interval during which there is no incoming transmission and the incoming line condition is steadily marking. At the end of 45 seconds the timing circuit times out and activates the transmitter start circuit to begin a roll call of stations for priority transmission, as if the end-of-transmission signal had been received. The timing circuit that accomplishes this is described in the previously identified copending application of Bacon et al.

Figure 7:
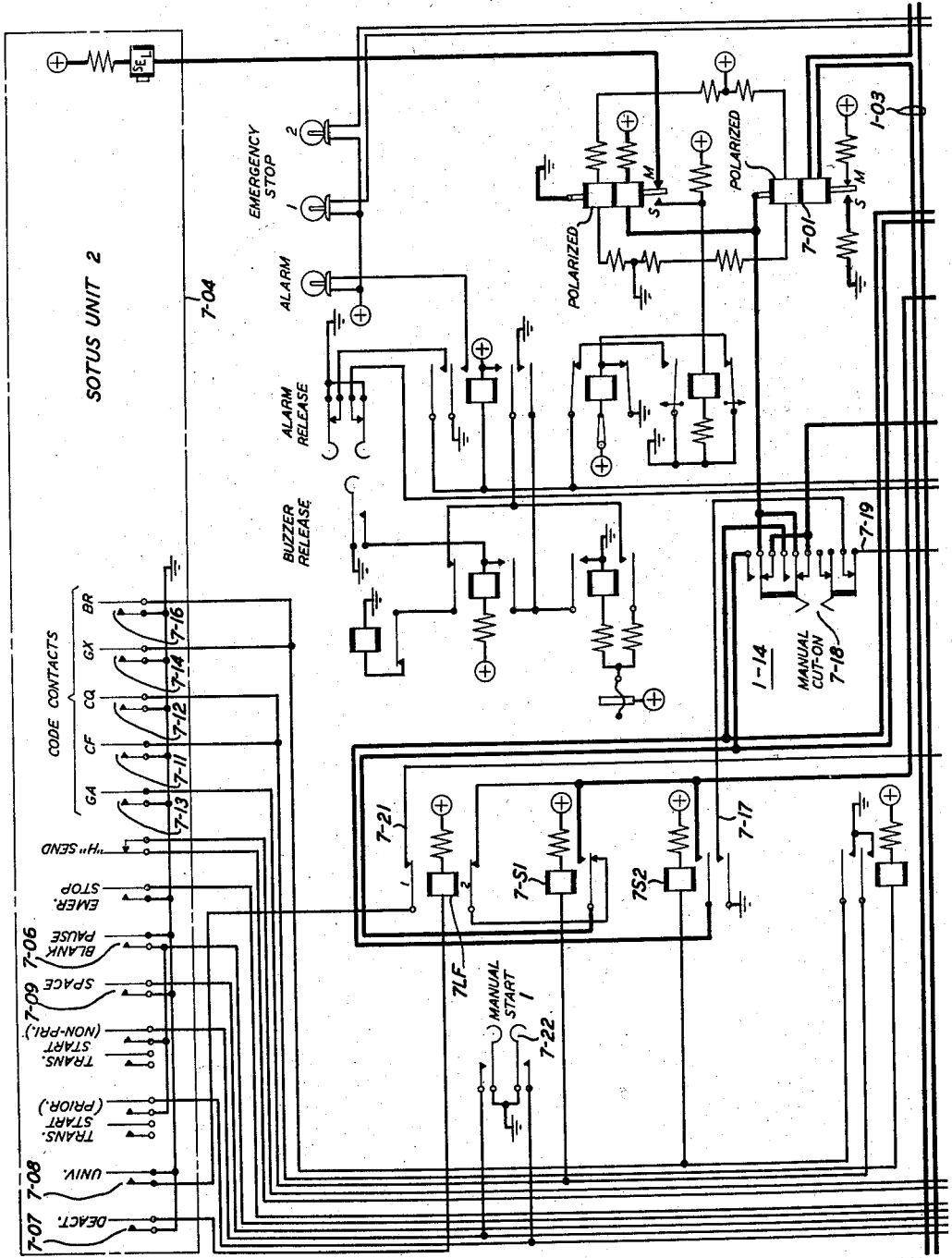

Each station control circuit is provided with a manual cut-on key, designated 6-12, 7-18, 8-17 in Figs. 6, 7 and 8, respectively, for establishing a transmission connection from transmission channel 1-03 to the receiving teletypewriters served by that station control circuit independently of the selecting relays, such as relays 6S1 and 6S2, 7S1 and 7S2, and 8S1 and 8S2. Thus manual cut-on key 6-12, which is a locking key, connects transmission conductor 6-51 associated with the armature of line relay 6-01 directly to conductor 6-52 which extends to repeating relay 18-16 and to the companion conductor that operates the repeating relay of receiving teletypewriter 1-56. Key 7-18 includes break contacts for disabling the energizing circuit of relay 13C in the tape feed-out circuit.

Similarly, there are provided manually operable start keys for the transmitters, such as the keys 6-58 and 6-59 in Fig. 6, key 7-22 in Fig. 7, and keys 8-23 and 8-24 in Fig. 8. Key 6-58 connects ground to conductor 6-22 for operating relay 12M1 when relays 12T1 and 12P1 are both operated, the path being traced through armature 4 and front contact of relay 12T1 and frame 1 and front contact of relay 12P1. Key 6-58 also connects ground over conductor 6-18 to operate relay 12M1 when only the relay 12T1 is operated, the path including armature 2 and front contact of relay 12T1 and armature 3 and back contact of relay 12P1. Relay 12M1 will initiate transmission from either of the transmitters in Fig. 18 that has had a message tape placed therein, causing the closure of contacts 18-02 or 18-17. If the priority key has been operated, the corresponding relay 12P1 or 12P2 will be operated, otherwise only the relay 12T1 or 12T2 will be operated. The transmitter at station 1-10 in Fig. 20 is not provided with priority contacts. Accordingly, if there is no path for operating relay 14P2 that relay will always remain released. The manual start key 8-24 for starting the transmitter at station 1-10 has only a single pair of make contacts for completing the circuit of relay 14M2 through the armature 3 and front contact of relay 14T2 and the armature 3 and back contact of relay 14P2.

Figs. 25 to 28, inclusive, show mechanical details of the monitoring selector mechanism, and particularly the arrangement for operating the H sending contacts, such as contacts 6-14. Fig. 25 duplicates, in part, apparatus shown in Fig. 187 and described in the specification of copending application of Bacon et al., and also disclosed in Patent 2,502,654 granted April 4, 1950 to G. G. Keyes and Patent 2,543,174 granted February 27, 1951 to G. G. Keyes et al. A disclosure of a monitoring selector mechanism of the type shown in Figs. 25 to 28, and including apparatus for operating the H sending contacts, is contained in application Serial No. 318,494, filed November 3, 1952 by G. G. Keyes. The disclosures of the Keyes patents and pending application are incorporated herein by reference as part of the present specification.

Referring to Fig. 25, the monitoring selector unit is provided with a series of five selector vanes 11 and a sixth vane 12. Vanes 11 are selectively rocked to clockwise or counterclockwise position in accordance with the code elements of the five-unit code. The sixth vane 12 is rocked to its extreme clockwise or counterclockwise position in response to the disconnect signal and the end-of-address signals, to establish the activate and deactivate conditions, respectively, of the monitoring selector unit. A plurality of selector levers 13 are pivotally mounted on a pivot shaft 14 and each is provided with a removably mounted coded element 16 containing notches and lugs permutationally arranged to be selected in response to predetermined code combinations. Levers 13 are biased clockwise by individual springs 17 against a bail member 18 also pivotally carried on shaft 14. Bail 18 is operable by a toggle mechanism, only a fragment 19 of which is shown, to permit coded elements 16 to test the setting of vanes 11 and 12 and to subsequently lift coded elements 16 carried by levers 13 clear of the vanes 11 and 12.

Each of the levers 13 is provided with a depending portion 21 having a latching shoulder 22 so that the shoulder of a lever 13 that rocks clockwise to its fully selected position will engage the upper hooked end of a pull bar 23. When the levers 13 are lifted by bail 18 to their extreme counterclockwise positions, a pull bar 23 that has been latched on the shoulder 22 of its associated lever 13 will be lifted, and will impart counterclockwise movement to a lever 24 to which it is articulated, the lever being pivoted on pivot shaft 26.

The present description is particularly concerned with four of the selector levers 13 and their associated levers 24, these being the four that operate the four sets of transmitter start contacts of any monitoring selector unit, two being allocated to the priority start codes, the other two being allocated to the non-priority start codes. The contacts are closable by the levers 24.

Each of the levers 24 that is assigned to transmitter start contact operation is provided with a leftwardly extending arm 27 terminating in a finger 28. As shown in Figs. 25 and 27, fingers 28 of the levers 24 are disposed above a bail member 29 that is fixed to a rock shaft 31. Upon the operation of bail 29 by one of the levers 24 in counterclockwise direction as viewed in Fig. 25, the bail imparts through spring 32 counterclockwise movement to a bail 33 pivotally supported on shaft 31. Bail 33 is provided with blade 34 which moves into blocking relation to lugs 36 of the four levers 13 that are responsive to the transmitter start signals. The reason for the blocking of these four selector levers will be set forth hereinafter.

Rock shaft 31 has secured thereto a latching arm 37 which normally latches a laterally extending projection 38 of arm 39 of a lever 41 pivoted at 42. Lever 41 has an arm 43 disposed adjacent to one of the springs of contacts 44 which are the H sending contacts such as those designated 6–14 in Fig. 6, and are normally closed.

Lever 41 is also provided with a finger 46 which engages a cam 47 carried by the main operating shaft 48 of the monitoring selector unit. The periphery of the cam 47 has a contour such that in one revolution of a cam the start-stop code combination representing the character H will be generated, that signal comprising a start element of spacing nature, first and second code elements of spacing nature, third code element of marking nature, fourth code element of spacing nature, fifth code element of marking nature and stop element of marking nature. Latching arm 37 normally prevents contact operating lever 41 from following cam 47 and generating the code signal. The disengagement of latching arm 37 from contact operating lever 41 does not immediately place lever 41 under the control of cam 47 because lever 41 is secondarily latched by a latching lever 49 which has a latching shoulder normally disposed in blocking relation to laterally extending projection 38 of arm 39 of lever 41. Secondary latching lever 49 is pivotally mounted on rock shaft 31 and is provided with follower arm 51 that cooperates with the periphery of cam 47.

As previously stated, cam 47 is part of the main cam assembly of the monitoring selector unit. As disclosed in the applications and patents hereinbefore identified, the main cam assembly is driven through a clutch from a continuously driven shaft, the shaft 48 in Figs. 25 and 26, and the clutch is tripped for one revolution in connection with each signal receiving cycle of the selector unit. Cam 47 rocks secondary latching lever 49 counterclockwise each time that the main cam assembly operates, but contact operating lever 41 is not thereby permitted to engage and follow cam 47 because it is normally latched by primary latching arm 37. When primary latching arm 37 has been disengaged from lever 41 by bail 29, secondary latching lever 49 releases contact operating lever 41 in timed relation to the rotation of cam 47 so that code signal elements of the proper length and of the character hereinbefore identified will be generated.

As previously stated, the main cam assembly is tripped in connection with each receiving cycle, and it is this cam assembly which causes the operation of bail 18 to permit the selection of a selector lever and to lift the selector lever through its associated pull bar 23. Accordingly, the main cam assembly will have nearly completed a cycle of operation by the time it has rocked the lever 24 and through it the bail 29 to disengage primary latching arm 37 from contact operating lever 41. An additional cycle of the main cam assembly is necessary to effect the transmission of the H signal by contacts 44 under the control of lever 41 after the primary latching arm 37 has been operated. As disclosed in the hereinbefore identified Keyes application the four levers 24 that are operated in response to the transmitted start signals are arranged to operate a clutch tripping member which causes an extra cycle of the main cam assembly, and it is during this cycle that secondary latching lever 49 disengages from contact operating lever 41 and permits lever 41 to follow the cam. Bail 18, being operable by the main cam assembly, drops away from selector levers 13 in any cycle of the main cam assembly to permit the levers 13 to test the setting of selector vanes 11 and 12. Since the last signal received by the monitoring selector unit was a transmitter start code that caused the selection of one of the four transmitter start selector levers, the vanes 11 have remained in the position corresponding to that code. Bail blade 34, now presented in blocking relation to these four selector levers by bail 33, prevents reselection of the one that would otherwise operate to the selected position under the control of bail 18. At the end of the extra cycle of the main cam assembly lever 49 is restored to latching relation to contact operating lever 41, and the lever 24 that operated bail 29 is restored to normal position, permitting primary latching lever 37 to move into blocking relation to contact operating lever 41 and moving bail blade 34 out of blocking relation to the four selector levers 13. It will be apparent from the foregoing that contact controlling lever 41 is unlatched to cause the operation of contacts 44 to generate the H signal incident to selection of any one of the four selector levers 13 that are allocated to the transmitter start signals. It will be remembered that in the event that a message transmitter is started in response to reception of the transmitter start signal, there will be a shunt across contacts 44 so that contacts 44, being opened and closed by cam 47, will not garble the message that is being transmitted. When no transmitter is started, there will be no shunt across contacts 44 and the H signal will be transmitted.

Although a specific embodiment of the invention has been shown in the drawings and described in the foregoing specification, it will be understood that the invention is not limited to the specific embodiment disclosed but is capable of modification, rearrangement and substitution of parts and elements without departing from the spirit of the invention.

What is claimed is:

1. In a telegraph system, a principal station, a plurality of outlying transmitters, a transmission channel common to said transmitters and incoming to said principal station, roll call signal transmission means at said principal station for inviting message transmission over said channel by said transmitters individually, acknowledgment signal generating means operable in response to each roll call signal, and means effective upon message transmission response of a transmitter to its roll call signal for suppressing transmission of said acknowledgment signal.

2. In a telegraph system, a principal station, a plurality of outlying transmitters, a transmission channel common to said transmitters and incoming to said principal station, roll call signal transmission means at said principal station for inviting message transmission over said channel by said transmitters individually, acknowledgment signal generating means operable in response to each roll call signal, means effective upon message transmission response of a transmitter to its roll call signal for suppressing transmission of said acknowledgment signal, and means responsive to message transmission from a transmitter for suspending operating of said roll call signal transmission means.

3. In a telegraph system, a principal station, a plurality of outlying transmitters, a transmission channel common to said transmitters and incoming to said principal station, roll call signal transmission means at said principal station for inviting message transmission over said channel by said transmitters individually, acknowledgment signal generating means operable in response to each roll call signal, means effective upon message transmission response of a transmitter to its roll call signal for suppressing transmission of said acknowledgment signal, means responsive to message transmission from a transmitter for suspending operation of said roll call signal transmission means, and means responsive to said acknowledgment signal when not suppressed for causing said roll call signal transmitting means to progress with its roll call.

4. In a telegraph system, a principal station, a plurality of outlying transmitters, a transmission channel common to said transmitters and incoming to said principal station, roll call signal transmission means at said principal station for inviting message transmission over said channel by said transmitters individually, means responsive to cessation of message transmission from one of said transmitters for initiating operation of said roll call signal transmitting means, acknowledgment signal generating means operable in response to each roll call signal, means effective upon message transmission response of a transmitter to its roll call signal for suppressing transmission of said acknowledgment signal, and means responsive to said acknowledgment signal when not suppressed for causing said roll call signal transmitting means to progress with its roll call.

5. In a telegraph system, a principal station, a plurality of subordinate stations having transmitters controlled by stored message material, a common transmission channel incoming to said principal station from all of said subordinate stations, means associated with each transmitter and operable selectively for conditioning said transmitter for operation according to one of two priority classifications of said message material, roll call signal transmission means at said principal station for inviting message transmission over said channel by said transmitters individually, said roll call transmission means including a stepping switch operable step-by-step for determining the selective characteristics of said roll call signals, and selectively responsive means for initiating operation of a conditioned transmitter only in response to one of two roll call signals representing for said transmitter said two prior classifications.

6. In a telegraph system, a principal station, a plurality of subordinate stations having transmitters controlled by stored message material, a common transmission channel incoming to said principal station from all of said subordinate stations, means associated with each transmitter and operable selectively for conditioning said transmitter for operation according to one of two priority classifications of said message material, roll call signal transmission means at said principal station for inviting message transmission over said channel by said transmitters individually, said roll call transmission means including a stepping switch operable step-by-step for determining the selective characteristics of said roll call signals selectively responsive means for initiating operation of a conditioned transmitter only in response to one of two roll call signals representing for said transmitter said two priority classifications, and means for precluding transmission of roll call signals representing, for any transmitter, a particular one of said priority classifications as long as any transmitter is conditioned according to the other of said priority classifications.

7. In a telegraph system, a principal station, a plurality of subordinate stations each having a single individual transmitter controlled by stored message material, a common transmission channel incoming to said principal station from all of said subordinate stations, roll call signal transmission means at said principal station having the capability of transmitting either of two different roll call signals for each of said transmitters, said roll call transmission means including a stepping switch operable step-by-step for determining the selective characteristics of said roll call signals, and means individual to each of said stations and operable in either of two ways for conditioning said individual transmitter thereat to begin transmitting in response to one or the other of their roll call signals.

8. In a telegraph system, a principal station, a plurality of independent and separate outlying message transmitters adapted to transmit to said principal station one at a time, means operable selectively in either of two ways for conditioning said independent and separate transmitters for operation, roll call signal transmission means at said principal station for inviting message transmission from any transmitter conditioned according to a particular one of said ways, said roll call transmission means including a stepping switch operable step-by-step for determining the selective characteristics of said roll call signals, means responsive to initiation of operation of one of said transmitters for suspending operation of said roll call signal transmission means, and means effective when no message transmitter responds to said roll call for causing said roll call signal transmission means to invite message transmission from any transmitter conditioned according to the other of said ways.

9. In a telegraph system, a principal station, a plurality of remote message transmitters adapted to transmit to said principal station one at a time, roll call signal transmission means at said principal station adapted to transmit first one and then another of two sequences of codes each including a code representative of each transmitter whereof the two codes representing any one transmitter are different, means for conditioning any transmitter to be set in message transmitting operation in response to one or the other of its assigned codes, and means precluding transmission of said other sequence of codes except upon failure of any transmitter to be set in operation in response to its assigned code in said first sequence.

10. In a telegraph system, a principal station, a plurality of remote message transmitters adapted to transmit to said principal station one at a time, roll call signal transmission means at said principal station adapted to transmit first one and then another of two sequences of codes each including a code representative of each transmitter whereof the two codes representing a transmitter are different, means for conditioning any transmitter to be set in message transmitting operation in response to one or the other of its assigned codes, means for transmitting an acknowledgement signal to said principal station in response to each roll call signal failing to effect the starting of a transmitter, and means for causing advancement through either sequence of codes to be dependent upon repetitious reception of said acknowledgment signal.

11. In a telegraph system, a principal station, a plurality of outlying transmitters, a transmission channel common to said transmitters and incoming to said principal station, roll call signal transmission means at said principal station for inviting message transmission over said channel by said transmitters individually, acknowledgment signal generating means operable in response to each roll call signal, means effective upon message transmission response of a transmitter to its roll call signal for suppressing transmission of said acknowledgment signal, means responsive to message transmission from a transmitter for suspending operation of said roll call signal transmission means, and means effective when neither message transmission nor acknowledgment signal is received for suspending operation of said roll call signal transmission means.

12. In a telegraph system, a principal station, a plurality of outlying transmitters, a transmission channel common to said transmitters and incoming to said principal station, roll call signal transmission means at said principal station for inviting message transmission over said channel by said transmitters individually, means responsive to cessation of message transmission from one of said transmitters for initiating operation of said roll call signal transmitting means, acknowledgment signal generating means operable in response to each roll call signal, means effective upon message transmission response of a transmitter to its roll call signal for suppressing transmission of said acknowledgment signal, means responsive to said acknowledgment signal when not suppressed for causing said roll call signal transmitting means to progress with its roll call, and means effective when neither message transmission nor acknowledgment signal is received for suspending operation of said roll call transmitting means.

13. In a telegraph system, a principal station, a plurality of outlying transmitters, a transmission channel common to said transmitters and incoming to said principal station, roll call signal transmission means at said principal station for inviting message transmission over said channel by said transmitters individually, acknowledgment signal generating means operable in response to each roll call signal, means effective upon message transmission response of a transmitter to its roll call signal for suppressing transmission of said acknowledgment signal, means responsive to message transmission from a transmitter for suspending operation of said roll call transmission means, timing means activated incident to transmission of each roll call signal and deactivatable in response to message transmission or said acknowledgment signal, and means controlled by said timing means upon timing a predetermined interval without deactivation for suspending operation of said roll call transmission means.

14. In a telegraph system, a principal station, a plurality of outlying transmitters, a transmission channel common to said transmitters and incoming to said principal station, roll call signal transmission means at said principal station for inviting message transmission over said channel by said transmitters individually, acknowledgment signal generating means operable in response to each roll call signal, means effective upon message transmission response of a transmitter to its roll call signal for suppressing transmission of said acknowledgment signal, means responsive to message transmission from a transmitter for suspending operation of said roll call signal transmission means, means effective when neither message transmission nor acknowledgment signal is received for suspending operation of said roll call signal transmission means, manually operable means for causing the deletion of any roll call signal from the roll call, and means operable by the roll call signal deletion means pertaining to the roll call signal causing roll call suspension under the last-mentioned condition for effecting resumption of operation of said roll call signal transmission means.

15. In a telegraph switching system, a principal station, a plurality of independent and separate transmitters adapted to transmit to said principal station one at a time, means associated with each transmitter and selectively operable for conditioning said transmitter for operation according to the priority classification of messages to be transmitted, roll call signal transmission means at said principal station automatically settable into operation at the end of message transmission from any of said transmitters for inviting message transmission from a transmitter conditioned according to a particular priority classifications and in a predetermined order among the transmitters, said roll call transmission means including a stepping switch operable step-by-step for determining the selective characteristics of said roll call signals, means effective when no transmitter responds to said roll call for causing said roll call signal transmission means to invite transmisison from a transmitter conditioned according to a different priority classification and in a predetermined order among said transmitters, and means responsive to message transmission from one of the transmitters conditioned according to said different priority classification for registering an indication of the last roll call signal transmitted, for suspending operation of said roll call signal transmission means and for causing the next operation of said roll call signal transmission means to begin with the roll call for transmitters conditioned according to said particular priority classification.

16. In a telegraph switching system, a principal station, a plurality of remote transmitters adapted to transmit to said principal station one at a time, means selectively operable in either of two ways for conditioning said transmitters for operation, roll call signal transmission means at said principal station automatically settable into operation at the end of message transmission from any of said transmitters for inviting message transmission from a transmitter conditioned according to a particular one of said ways and in a predetermined order among the transmitters, means effective when no transmitter responds to said roll call for causing said roll call signal transmission means to invite message transmission from a transmitter conditioned according to the other of said ways and in a predetermined order among said transmitters, and means effective when no transmitter responds to the second-mentioned roll call for suspending operation of said roll call transmisison means and for causing the next operation of said roll call signal transmission means to begin with the roll call for transmitters conditioned according to said particular one of said ways.

17. In a telegraph system, a switching center, a plurality of outlying telegraph receivers, a single transmission channel outgoing from said switching center to all of said receivers, a plurality of outlying transmitters, a single transmission channel incoming from all of said transmitters to said switching center, a transmitter at said switching center adapted to transmit messages preceded by address codes over said outgoing channel, roll call signal generating means adapted to cooperate with the transmitter at said switching center to transmit a roll call of said outlying transmitters for inviting incoming transmission therefrom individually, signal responsive selector mechanisms associated with said receivers and outlying transmitters for connecting said receivers to said outgoing channel in response to their respective address codes and for controlling said outlying transmitters in response to their roll call signals, means associated with said signal responsive selector mechanisms for causing one of said telegraph receivers to record all address codes transmitted over said outgoing channel in addition to the text of any message accompanying an address code specifically identifying said one telegraph receiver, means responsive to incoming transmission of predetermined nature from said outlying transmitters for causing said roll call transmission means to progress with said roll call, and means responsive to incoming transmission of a different nature for suspending said roll call and for relinquishing the transmitter at said switching center to the service of message transmission.

18. In a telegraph system, a switching center, a plurality of outlying telegraph receivers, a single transmission channel outgoing from said switching center to all of said receivers, a transmitter at said switching center adapted to transmit messages preceded by address codes over said outgoing channel, signal responsive selector mechanisms associated with said receivers for connecting the receivers to said outgoing channel in response to their respective address signals, means associated with said signal responsive selector mechanisms for causing one of said telegraph receivers to be connected to said outgoing channel during transmission thereover of address codes, and means for disconnecting said one telegraph receiver before message text transmission unless an address code preceding said message text specifically identifies said receiver.

19. In a telegraph system, a principal station, a plurality of outlying transmitters, a transmission channel common to said transmitters and incoming to said principal station, roll call signal transmission means at said principal station for inviting message transmission over said channel by said transmitters individually, signal responsive selector mechanisms for controlling said transmitters in response to said roll call signals, acknowledgment signal generating means operable by said signal responsive selector mechanisms in response to roll call signals designating transmitters served by the respective signal responsive selector mechanisms, and means effective upon message transmission response of a transmitter to its roll call signal for suppressing transmission of aid acknowledgment signal.

20. In a telegraph system, a principal station, a plurality of outlying message transmitters adapted to transmit to said principal station one at a time, means manually operable in either of two ways for conditioning said transmitters for operation, roll call signal transmission means at said principal station for inviting message transmission from any transmitter conditioned according to a particular one of said ways, said roll call signal transmission means including a stepping switch operable step by step for determining the selective characteristics of said roll call signals, means responsive to initiation of operation of one of said transmitters for suspending advancement of said stepping switch, a second stepping switch for registering the last roll call signal that resulted in the starting of a transmitter, and means effective following suspension of advancement of said first-mentioned stepping switch for advancing said second-mentioned stepping switch into correspondence with the first-mentioned stepping switch.

21. In a telegraph system, a principal station, a plurality of outlying message transmitters adapted to transmit to said principal station one at a time, means manually operable in either of two ways for conditioning said transmitters for operation, roll call signal transmission means at said principal station for inviting message transmission from any transmitter conditioned according to a particular one of said ways, said roll call signal transmission means including a stepping switch operable step by step for determining the selective characteristics of said roll call signals, means responsive to initiation of operation of one of said transmitters for suspending advancement of said stepping switch, a second stepping switch for registering the last roll call signal that resulted in the starting of a transmitter, and means responsive to advancement of said first-mentioned stepping switch through a complete cycle and into correspondence with said second-mentioned stepping switch for initiating roll call signal transmission inviting message transmission from any transmitter conditioned according to the other of said two ways.

22. In a telegraph system, a principal station, a plurality of outlying message transmitters adapted to transmit to said principal station one at a time, means manually operable in either of two ways for conditioning said transmitters for operation, roll call signal transmission means at said principal station for inviting message transmission from any transmitter conditioned according to one or the other of said two ways, said roll call signal transmission means including a stepping switch operable step by step for determining the selective characteristics of said roll call signals for selecting transmitters conditioned either way, a second stepping switch for registering the last roll call signal that resulted in the starting of a transmitter, and means responsive to advancement of said first-mentioned stepping switch through a complete cycle in which the roll call signals have selective characteristics for selecting transmitters conditioned one of said ways and into correspondence with said second-mentioned stepping switch for changing to the selective characteristics of roll call signals for selecting transmitters conditioned the other of said ways and for initiating another cycle of said first-mentioned stepping switch.

23. A system in accordance with claim 22 having a third stepping switch for registering the last roll call signal that resulted in the starting of a transmitter conditioned the other of said ways.

24. A system in accordance with claim 22 having a third stepping switch for registering the last roll call signal that resulted in the starting of a transmitter conditioned the other of said ways, means responsive to initiation of operation of one of said transmitters conditioned according to the other of said ways for suspending advancement of said first-mentioned stepping switch, and means effective following suspension of advancement of said first-mentioned stepping switch for advancing said third-mentioned stepping switch into correspondence with said first-mentioned stepping switch.

25. A system in accordance with claim 22 having a third stepping switch for registering the last roll call signal that resulted in the starting of a transmitter conditioned the other of said ways, and means responsive to advancement of said first-mentioned stepping switch to completion of said other cycle and into correspondence with said third-mentioned stepping switch for suspending further operation of said first-mentioned stepping switch for a timed interval.

References Cited in the file of this patent

UNITED STATES PATENTS

| 2,444,078 | Weaver | June 29, 1948 |
| 2,456,533 | Preston | Dec. 14, 1948 |
| 2,574,774 | Baughman | Nov. 13, 1951 |
| 2,666,095 | Zenner | Jan. 12, 1954 |
| 2,667,533 | Zenner | Jan. 26, 1954 |
| 2,703,338 | Stiles | Mar. 1, 1955 |
| 2,752,414 | Przysiecki | June 26, 1956 |
| 2,805,283 | Stiles | Sept. 3, 1957 |